(12) United States Patent
Bernatz et al.

(10) Patent No.: US 8,778,466 B2
(45) Date of Patent: Jul. 15, 2014

(54) LIQUID-CRYSTAL DISPLAY

(75) Inventors: Georg Bernatz, Darmstadt (DE); Andreas Taugerbeck, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 1372 days.

(21) Appl. No.: 11/907,325

(22) Filed: Oct. 11, 2007

(65) Prior Publication Data

US 2008/0090026 A1 Apr. 17, 2008

(30) Foreign Application Priority Data

Oct. 12, 2006 (DE) .................. 10 2006 048 274

(51) Int. Cl.
*C09K 19/00* (2006.01)
*C09K 19/02* (2006.01)
*C09K 19/52* (2006.01)
*G02F 1/13* (2006.01)
*G02F 1/1333* (2006.01)

(52) U.S. Cl.
USPC ..... 428/1.1; 428/1.3; 252/299.01; 252/299.6; 252/299.62; 252/299.63; 349/1; 349/56; 349/182

(58) Field of Classification Search
USPC ............ 428/1.1; 430/20; 252/299.01, 299.62, 252/299.63
See application file for complete search history.

(56) References Cited

U.S. PATENT DOCUMENTS

| | | | |
|---|---|---|---|
| 3,814,700 A | 6/1974 | Aviram et al. | |
| 3,953,491 A | 4/1976 | Steinstrasser et al. | |
| 4,001,279 A * | 1/1977 | Cram ........................ | 549/348 |
| 4,011,173 A | 3/1977 | Steinstrasser | |
| 4,077,900 A | 3/1978 | Pohl et al. | |
| 4,130,502 A | 12/1978 | Eidenschink et al. | |
| 4,136,053 A | 1/1979 | Steinstrasser et al. | |
| 4,237,026 A | 12/1980 | Eidenschink et al. | |
| 4,868,341 A | 9/1989 | Eidenschink et al. | |
| 5,013,478 A | 5/1991 | Petrzilka | |
| 5,744,057 A | 4/1998 | Meyer et al. | |
| 5,780,629 A | 7/1998 | Etzbach | |
| 5,886,242 A | 3/1999 | Etzbach et al. | |
| 7,060,200 B1 | 6/2006 | Farrand et al. | |
| 7,413,782 B2 * | 8/2008 | Kato et al. ................ | 428/1.1 |
| 7,440,160 B2 * | 10/2008 | Heckmeier et al. ........... | 359/322 |
| 7,527,837 B2 * | 5/2009 | Shundo et al. ............... | 428/1.3 |
| 2003/0006398 A1 | 1/2003 | Yumoto | |
| 2003/0098443 A1 | 5/2003 | Manabe et al. | |
| 2004/0011996 A1 | 1/2004 | Klasen-Memmer et al. | |
| 2004/0135119 A1 | 7/2004 | Taugerbeck | |
| 2004/0191428 A1 | 9/2004 | Tsuda et al. | |
| 2005/0179005 A1 | 8/2005 | Kato et al. | |
| 2006/0054859 A1 | 3/2006 | Shundo | |
| 2006/0066793 A1 | 3/2006 | Ohmuro et al. | |
| 2006/0103804 A1 | 5/2006 | Hirosawa | |
| 2006/0172090 A1 | 8/2006 | Syundo | |
| 2007/0122565 A1 | 5/2007 | Shundo | |

FOREIGN PATENT DOCUMENTS

| | | | |
|---|---|---|---|
| CN | 1509280 | 6/2004 | |
| DE | 886907 | * 8/1953 | ............... C07C 1/26 |
| DE | 2 209 127 | 9/1973 | |
| DE | 2 240 864 A1 | 2/1974 | |
| DE | 2 338 281 | 2/1974 | |
| DE | 2 321 632 | 11/1974 | |
| DE | 24 50 088 A1 | 4/1976 | |
| DE | 26 36 684 A1 | 2/1978 | |
| DE | 26 37 430 A1 | 2/1978 | |
| DE | 28 53 728 A1 | 7/1980 | |
| DE | 33 21 373 A1 | 12/1984 | |
| DE | 43 42 280 A1 | 6/1995 | |
| DE | 195 20 704 A1 | 12/1996 | |
| DE | 102 24 046 A1 | 1/2003 | |
| EP | 0 122 389 A2 | 10/1984 | |
| EP | 0 364 538 B1 | 5/1992 | |
| EP | 0 964 035 A1 | 12/1999 | |
| EP | 1 170 626 A2 | 1/2002 | |
| EP | 1215195 | 6/2002 | |
| EP | 1 249 483 A1 | 10/2002 | |
| EP | 1 306 418 A1 | 5/2003 | |
| EP | 1 498 468 A1 | 1/2005 | |
| EP | 1 378 557 B1 | 2/2007 | |
| GB | 2 298 202 A | 8/1996 | |
| GB | 2 328 436 A | 2/1999 | |
| GB | 2 398 569 A | 8/2004 | |
| JP | 10-036847 A | 2/1998 | |
| JP | 2001-066431 A | 3/2001 | |
| JP | 2005/015473 | 1/2005 | |
| JP | 2005-170934 A | 6/2005 | |
| JP | 2005-171235 A | 6/2005 | |
| WO | WO 02/06195 A1 | 1/2002 | |
| WO | WO 02/34739 | 5/2002 | |
| WO | WO 02/094805 A1 | 11/2002 | |

OTHER PUBLICATIONS

Basic Principles of Organic Chemistry, Second Edition,(1977) pp. 117-119. John D. Roberts, Institute Professor of Chemistry, California Institute of Technology and Marjorie C. Caserio, Professor of Chemistry,University of California, Irvine. Publisher: W.A. Benjamin, Inc. Menlo Park, California.
Organic Chemistry, Fourth Edition. (1983); p. 135. Robert Thornton Morrison and Robert Neilson Boyd of New York University; Publisher: Allyn and Bacon, Inc. Boston, London, Sydney, Toronto.
Advanced Organic Chemistry Reactions, Mechanisms, and Structure, Fourth Edition (1992) p. 95. Jerry Mar., Professor of Chemistry, Adelphi University. A Wiley-Interscience Publication. John Wiley & Sons, New York, Chichester, Brisbane, Toronto, Singapore.
First Office Action in CN Patent Application No. 201210114131.3. Issued Sep. 26, 2013. Title of Invention: Liquid-Crystal Display. Applicant: Merck Patent GmbH. (Language of Chinese).
English Translation of First Office Action in CN Patent Application No. 201210114131.3. Issued Sep. 26, 2013. Title of Invention: Liquid-Crystal Display. Applicant: Merck Patent GmbH.

* cited by examiner

*Primary Examiner* — Geraldina Visconti
(74) *Attorney, Agent, or Firm* — Millen, White, Zelano & Branigan, P.C.

(57) ABSTRACT

The present invention relates to a liquid-crystal display of the PSA (polymer sustained alignment) type, and to novel liquid-crystal media and novel polymerizable compounds for use in PSA displays.

32 Claims, No Drawings

LIQUID-CRYSTAL DISPLAY

The present invention relates to a liquid-crystal display of the PSA (polymer sustained alignment) type, and to novel liquid-crystal media and novel polymerizable compounds for use in PSA displays.

The liquid-crystal displays (LC displays) used at present are mostly those of the TN (twisted nematic) type. However, these have the disadvantage of a strong viewing-angle dependence of the contrast. In addition, so-called VA (vertical alignment) displays are known which have a broader viewing angle. The LC cell of a VA display contains a layer of an LC medium between two transparent electrodes, where the LC medium usually has a negative value of the dielectric (DC) anisotropy. In the switched-off state, the molecules of the LC layer are aligned perpendicular to the electrode surfaces (homeotropically) or have a tilted homeotropic alignment. On application of an electrical voltage to the electrodes, a realignment of the LC molecules parallel to the electrode surfaces takes place. Furthermore, OCB (optically compensated bend) displays are known which are based on a birefringence effect and have an LC layer with a so-called "bend" alignment and usually positive (DC) anisotropy. On application of an electrical voltage, a realignment of the LC molecules perpendicular to the electrode surfaces takes place. In addition, OCB displays normally contain one or more birefringent optical retardation films in order to prevent undesired transparency to light of the bend cell in the dark state. OCB displays have a broader viewing angle and shorter response times compared with TN displays.

In VA displays of the more recent type, uniform alignment of the LC molecules is restricted to a plurality of relatively small domains within the LC cell. Disclinations exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes. In so-called MVA (multidomain vertical alignment) displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slitted electrodes generate an inhomogeneous electrical field in the LC cell on application of a voltage, meaning that controlled switching is still achieved. For further improvement of the transparency to light, the separations between the slits and protrusions can be increased, but this in turn results in a lengthening of the response times. In the so-called PVA (patterned VA), protrusions are rendered completely superfluous in that both electrodes are structured by means of slits on the opposite sides, which results in increased contrast and improved transparency to light, but is technologically difficult and makes the display more sensitive to mechanical influences (tapping, etc.). For many applications, such as, for example, monitors and especially TV screens, however, a shortening of the response times and an improvement in the contrast and luminance (transmission) of the display are desired.

A further development are the so-called PSA (polymer sustained alignment) displays. In these, a small amount (for example 0.3% by weight, typically <1% by weight) of a polymerizable compound is added to the LC medium and, after introduction into the LC cell, is polymerized or crosslinked in situ, usually by UV photopolymerization, with an electrical voltage applied between the electrodes. The addition of polymerizable mesogenic or liquid-crystalline compounds, also known as "reactive mesogens" (RMs), to the LC mixture has proven particularly suitable. Two applications may be mentioned, the so-called PSA-VA displays and PSA-OCB displays. As can be demonstrated in test cells, the PSA method results in a pretilt in the cell. In the case of PSA-OCB displays, it is therefore possible for the bend structure to be stabilized so that an offset voltage is unnecessary or can be reduced. In the case of PSA-VA displays, this pretilt has a positive effect on response times. For PSA-VA displays, a standard MVA or PVA pixel and electrode layout can be used. In addition, however, it is possible, for example, to manage with only one structured electrode side and no protrusions, which significantly simplifies production and at the same time results in very good contrast at the same time as very good transparency to light.

PSA-VA displays containing LC mixtures comprising polymerizable compounds or RMs are described, for example, in JP 10-036847 A, EP 1 170 626 A2, EP 1 378 557 A1, EP 1 498 468 A1, US 2004/0191428 A1, US 2006/0066793 A1 and US 2006/0103804 A1. PSA-OCB displays containing LC mixtures comprising polymerized RMs or polymers are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647.

However, it has been found that the LC mixtures and RMs known from the prior art still have some disadvantages on use in PSA displays. Thus, far from every soluble monomer or RM is suitable for PSA displays, and it appears difficult to find more suitable selection criteria than just the direct PSA experiment with pretilt measurement. The choice becomes even smaller if polymerization by means of UV light without the addition of photoinitiators is desired, which may be advantageous for certain applications.

Thus, there continues to be a great demand for PSA displays, in particular of the VA and OCB type, and LC media and polymerizable compounds for use in such displays, which do not have the disadvantages described above or only do so to a small extent and have improved properties. In particular, there is a great demand for PSA displays or materials having a high specific resistance at the same time as a large working-temperature range, short response times, even at low temperatures, and a low threshold voltage, which facilitate a large number of grey shades, high contrast and a wide viewing angle, and have high values for the voltage holding ratio (HR) after UV exposure.

According to an aspect of the invention, there are provided PSA displays which do not have the disadvantages indicated above or only do so to a lesser extent, enable the setting of a pretilt angle and preferably at the same time have very high specific resistance values, low threshold voltages and short response times.

Surprisingly, it has now been found that this aspect can be achieved by using PSA displays according to the invention which contain a polymerized compound having a biaryl structural element of the formula I:

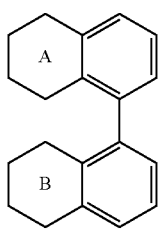

I which is linked at at least one position to one or more polymerizable groups, optionally via an organic group or a spacer group, wherein A and B are each, independently of one another, an aromatic or fully or partially saturated ring, in which, in the individual rings, one or more CH groups may be replaced by N and/or one or more $CH_2$ groups may be replaced by O and/or S in such a way that O and/or S atoms are not linked directly to one another, and where the individual rings may also be mono- or polysubstituted.

This has been demonstrated in combination with an LC medium by means of pretilt measurements in VA tilt measurement cells. In particular, a pretilt has been achieved without the addition of photoinitiator.

The invention thus relates, among other things, to a liquid-crystal (LC) display of the PSA (polymer sustained alignment) type, containing an LC cell having two substrates, where at least one substrate is transparent to light and at least one substrate has an electrode layer, and a layer of a low-molecular-weight LC medium comprising one or more polymerized compounds which is located between the substrates, where the polymerized compound(s) is (are) obtainable by polymerization of one or more polymerizable compounds between the substrates of the LC cell in the LC medium with application of an electrical voltage, characterized in that at least one of the polymerizable compounds has a biaryl structural element of the formula I

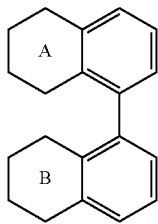

I which is linked at at least one position to one or more polymerizable groups, optionally via an organic group or a spacer group, and in which A and B each, independently of one another, denote an aromatic or fully or partially saturated ring, where, in addition, in the individual rings, one or more CH groups may be replaced by N and/or one or more $CH_2$ groups may be replaced by O and/or S in such a way that O and/or S atoms are not linked directly to one another, and where the individual rings may also be mono- or polysubstituted.

The invention furthermore relates to novel LC media comprising one or more polymerizable compounds containing a biaryl structural element of the formula I.

The invention furthermore relates to novel polymerizable compounds containing a biaryl structural element of the formula I.

The biaryl structural elements shown above and below and polymerizable and polymerized compounds containing them are chiral and can be employed either in optically active form, i.e. as pure enantiomers, or as any desired mixture of the two enantiomers, or as the racemate thereof. The use of the racemates is preferred. The use of the racemates has some advantages over the use of pure enantiomers, such as, for example, significantly more straightforward synthesis and lower material costs.

In the formulae and sub-formulae shown above and below, the biaryl skeleton of the formula I

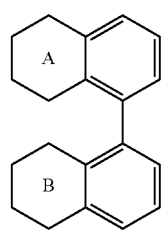

I is preferably selected from the following formulae:

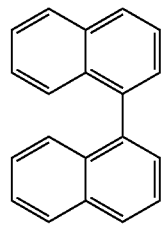

Ia

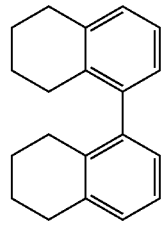

Ib

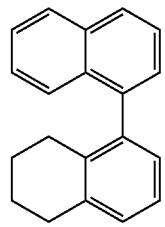

Ic

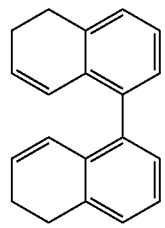

Id

-continued

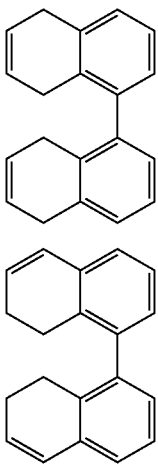

Ie

If

Particular preference is given to skeletons of the formulae Ia and Ib.

Particular preference is given to polymerizable compounds containing a structural element of the formula I which is linked at one or more positions to one or more polymerizable groups via a spacer group and preferably contains one or no polymerizable group linked directly to the structural element of the formula I.

Preference is furthermore given to polymerizable compounds containing a structural element of the formula I which is linked directly at just one position to a polymerizable group.

Preference is furthermore given to polymerizable compounds containing a structural element of the formula I which is linked directly at two positions to a polymerizable group.

Preference is furthermore given to polymerizable compounds containing a structural element of the formula I which is linked directly at more than two positions to a polymerizable group.

In a preferred embodiment of the invention, the polymerizable compounds are selected from the following formula

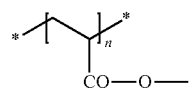

I1 in which
A and B each, independently of one another, denote fused benzene, cyclohexane or cyclohexene,
$Y^{1-4}$ each, independently of one another, denote H, halogen, $SF_5$, $NO_2$, a carbon radical or hydrocarbon radical, in which, in addition, one or more of the radicals $Y^{1-4}$ are able to form an aliphatic or aromatic, mono- or polycyclic and optionally condensed ring system with an adjacent radical $Y^{1-4}$ and/or with the biaryl skeleton, and in which at least one of the radicals $Y^{1-4}$ contains or denotes a polymerizable group P,
y1, y2 denote 1, 2 or 3, and
y3, y4 denote 1, 2, 3 or 4,
where, in addition, in each of the rings in formula I1, one or more CH groups may be replaced by N and/or one or more $CH_2$ groups may be replaced by O and/or S in such a way that O and/or S atoms are not linked directly to one another.

Preferred polymerized biaryl compounds according to the invention conform to the formulae shown above and below for polymerizable biaryl compounds, for example formula I1 and sub-formulae thereof in which the polymerizable group P has been replaced by the corresponding link, formed from the polymerization reaction, to the main polymer chain. Thus, for example, a group P of the formula $CH_2$=CH—COO— (acrylate) can be replaced in the corresponding polymerized compound by the structure

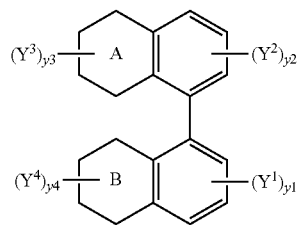

where n denotes the number of monomer units (degree of polymerization). For reasons of simplicity, only the formulae for polymerizable compounds are shown below. The polymerized biaryl compounds according to the invention are intended to be covered by these formulae without this being stated explicitly every time.

In the formulae indicated above and below, the following meanings apply:

The term "spacer" or "spacer group", also referred to as "Sp" below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless stated otherwise, the term "spacer" or "spacer group" above and below denotes a flexible organic group, which in a polymerizable mesogenic compound ("RM") connects the mesogenic group and the polymerizable group(s).

The term "mesogenic group" means a group with the ability to induce liquid crystal (LC) phase behavior. The compounds comprising mesogenic groups do not necessarily have to exhibit an LC phase themselves. It is also possible that they show LC phase behavior only in mixtures with other compounds, or when the mesogenic compounds or the mixtures thereof are polymerized. For the sake of simplicity, the term "liquid crystal" is used hereinafter for both mesogenic and LC materials. For an overview of definitions see Pure Appl. Chem. 73(5), 888 (2001) and C. Tschierske, G. Pelzl and S. Diele, Angew. Chem. 2004, 116, 6340-6368.

The term "organic group" denotes a carbon or hydrocarbon group.

The term "carbon group" denotes a mono- or polyvalent organic group containing at least one carbon atom which either contains no further atoms (such as, for example, —C≡C—) or optionally contains one or more further atoms, such as, for example, N, O, S, P, Si, Se, As, Te or Ge (for example carbonyl, etc.). The term "hydrocarbon group" denotes a carbon group which additionally contains one or more H atoms and optionally one or more hetero atoms, such as, for example, N, O, S, P, Si, Se, As, Te or Ge.

"Halogen" denotes F, Cl, Br or I.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also have spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" in accordance with the above definition containing one or more hetero atoms.

Preferred carbon and hydrocarbon groups are optionally substituted alkyl, alkenyl, alkynyl, alkoxy, alkylcarbonyl, alkoxycarbonyl, alkylcarbonyloxy and alkoxycarbonyloxy having 1 to 40, preferably 1 to 25, particularly preferably 1 to 18 C atoms, optionally substituted aryl or aryloxy having 6 to 40, preferably 6 to 25 C atoms, or optionally substituted alkylaryl, arylalkyl, alkylaryloxy, arylalkyloxy, arylcarbonyl, aryloxycarbonyl, arylcarbonyloxy and aryloxycarbonyloxy having 6 to 40, preferably 6 to 25 C atoms.

Further preferred carbon and hydrocarbon groups are $C_1$-$C_{40}$ alkyl, $C_2$-$C_{40}$ alkenyl, $C_2$-$C_{40}$ alkynyl, $C_3$-$C_{40}$ allyl, $C_4$-$C_{40}$ alkyldienyl, $C_4$-$C_{40}$ polyenyl, $C_6$-$C_{40}$ aryl, $C_6$-$C_{40}$ alkylaryl, $C_6$-$C_{40}$ arylalkyl, $C_6$-$C_{40}$ alkylaryloxy, $C_6$-$C_{40}$ arylalkyloxy, $C_2$-$C_{40}$ heteroaryl (e.g., $C_2$-$C_{20}$ heteroaryl), $C_4$-$C_{40}$ cycloalkyl, $C_4$-$C_{40}$ cycloalkenyl, etc. Particular preference is given to $C_1$-$C_{22}$ alkyl, $C_2$-$C_{22}$ alkenyl, $C_2$-$C_{22}$ alkynyl, $C_3$-$C_{22}$ allyl, $C_4$-$C_{22}$ alkyldienyl, $C_6$-$C_{12}$ aryl, $C_6$-$C_{20}$ arylalkyl and $C_6$-$C_{20}$ heteroaryl.

Further preferred carbon and hydrocarbon groups are straight-chain, branched or cyclic alkyl radicals having 1 to 40, preferably 1 to 25 C atoms, which are unsubstituted or mono- or polysubstituted by F, Cl, Br, I or CN and in which one or more non-adjacent $CH_2$ groups may each, independently of one another, be replaced by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ denotes H, halogen, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O— and in which one or more H atoms may be replaced by fluorine, or an optionally substituted aryl having 6 to 40 C atoms, aryloxy having 6 to 40 C atoms, heteroaryl having 2 to 40 C atoms (for example, 5 to 40 C atoms) (e.g., thiazolyl has 3 C atoms), or heteroaryloxy group having 2 to 40 C atoms (for example, 5 to 40 C atoms).

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptyloxy, n-octyloxy, n-nonyloxy, n-decyloxy, n-undecyloxy, n-dodecyloxy, etc.

Preferred amino groups are, for example, dimethylamino, methylamino, methylphenylamino, phenylamino, etc.

Aryl groups can be monocyclic or polycyclic, i.e. they can have one ring (for example phenyl) or two or more rings, which may also be condensed (for example naphthyl) or covalently linked (for example biphenyl), or contain a combination of condensed and linked rings. Preference is given to fully conjugated aryl groups.

Preferred aryl groups are, for example, phenyl, biphenyl, triphenyl, [1,1':3',1"]terphenyl-2'-yl, naphthyl, anthracene, binaphthyl, phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups. The heteroaryl groups may also be substituted by alkyl, alkoxy, thioalkyl, fluorine, fluoroalkyl or further aryl or heteroaryl groups.

The aryl, heteroaryl, carbon and hydrocarbon radicals optionally have one or more substituents, which are preferably selected from the group comprising silyl, sulfo, sulfonyl, formyl, amine, imine, nitrile, mercapto, nitro, halogen, $C_{1-12}$ alkyl, $C_{6-12}$ aryl, $C_{1-12}$ alkoxy, hydroxyl, or combinations of these groups.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, also referred to as "L" below, are, for example, F, Cl, Br, I, —CN, —$NO_2$, —NCO, —NCS, —OCN, —SCN, —C(=O)N($R^x$)$_2$, —C(=O)$Y_7$, —C(=O)$R^x$, —N($R^x$)$_2$, in which $R^x$ has the meaning indicated above, and $Y^7$ denotes halogen, optionally substituted silyl, aryl having 6 to 40, preferably 6 to 20 C atoms, and straight-chain or branched alkyl, alkoxy, alkylcarbonyl, alkoxycarbonyl, alkylcarbonyloxy or alkoxycarbonyloxy having 1 to 25 C atoms, in which one or more H atoms may optionally be replaced by F or Cl.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

The polymerizable group P is a group which is suitable for a polymerization reaction, such as, for example, free-radical or ionic chain polymerization, polyaddition or polycondensation, or for a polymer-analogous reaction, for example addition or condensation onto a main polymer chain. Particular preference is given to groups for chain polymerization, in particular those containing a C—C double bond or C—C triple bond, and groups which are suitable for polymerization with ring opening, such as, for example, oxetane or epoxide groups.

Preferred groups P are selected from $CH_2=CW^1-COO-$, $CH_2=CW^1-CO-$,

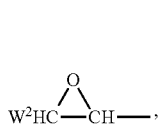 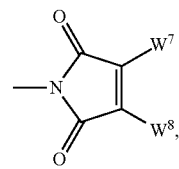

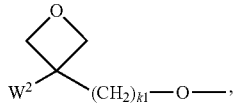

$CH_2=CW^2-(O)_{k1}-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, Phe-$CH=CH-$, $HOOC-$, $OCN-$ and $W^4W^5W^6Si-$, in which $W^1$ denotes H, F, Cl, CN, $CF_3$, phenyl or alkyl having 1 to 5 C atoms, in particular H, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above, and $k_1$ and $k_2$ each, independently of one another, denote 0 or 1.

Particularly referred groups P are $CH_2=CH-COO-$, $CH_2=C(CH_3)-COO-$, $CH_2=CH-$, $CH_2=CH-O-$, $(CH_2=CH)_2CH-OCO-$, $(CH_2=CH)_2CH-O-$,

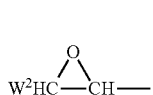 and , in particular vinyl, acrylate, methacrylate, oxetane and epoxide.

Preferred spacer groups Sp are selected from the formula Sp'-X', so that the radical "P-Sp-" conforms to the formula "P-Sp'-X'—", where Sp' denotes alkylene having 1 to 20, preferably 1 to 12 C atoms, which is optionally mono- or polysubstituted by F, Cl, Br, I or CN and in which, in addition, one or more non-adjacent $CH_2$ groups may each, independently of one another, be replaced by $-O-$, $-S-$, $-NH-$, $-NR^o-$, $-SiR^oR^{oo}-$, $-CO-$, $-COO-$, $-OCO-$, $-OCO-O-$, $-S-CO-$, $-CO-S-$, $-NR^o-CO-O-$, $-O-CO-NR^o-$, $-NR^o-CO-NR^o-$, $-CH=CH-$ or $-C\equiv C-$ in such a way that O and/or S atoms are not linked directly to one another, X' denotes $-O-$, $-S-$, $-CO-$, $-COO-$, $-OCO-$, $-O-COO-$, $-CO-NR^o-$, $-NR^o-CO-$, $-NR^o-CO-NR^o-$, $-OCH_2-$, $-CH_2O-$, $-SCH_2-$, $-CH_2S-$, $-CF_2O-$, $-OCF_2-$, $-CF_2S-$, $-SCF_2-$, $-CF_2CH_2-$, $-CH_2CF_2-$, $-CF_2CF_2-$, $-CH=N-$, $-N=CH-$, $-N=N-$, $-CH=CR^o-$, $-CY^8=CY^9-$, $-C\equiv C-$, $-CH=CH-COO-$, $-OCO-CH=CH-$ or a single bond, $R^o$ and $R^{oo}$ each, independently of one another, denote H or alkyl having 1 to 12 C atoms, and $Y^8$ and $Y^9$ each, independently of one another, denote H, F, Cl or CN.

X' is preferably $-O-$, $-S-$, $-CO-$, $-COO-$, $-OCO-$, $-O-COO-$, $-CO-NR^o-$, $-NR^o-CO-$, $-NR^o-CO-NR^o-$ or a single bond.

Typical spacer groups Sp' are, for example, $-(CH_2)_{p1}-$, $-(CH_2CH_2O)_{q1}-CH_2CH_2-$, $-CH_2CH_2-S-CH_2CH_2-$, $-CH_2CH_2-NH-CH_2CH_2-$ or $-(SiR^oR^{oo}-O)_{p1}-$, in which p1 is an integer from 1 to 12, q1 is an integer from 1 to 3, and $R^o$ and $R^{oo}$ have the meanings indicated above.

Particularly preferred groups —X'-Sp'- are $-(CH_2)_p-$, $-O-(CH_2)_{p1}-$, $-OCO-(CH_2)_{p1}-$, and $-OCOO-(CH_2)_{p1}-$.

Particularly preferred groups Sp' are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

Particular preference is given to polymerizable compounds of the following formulae:

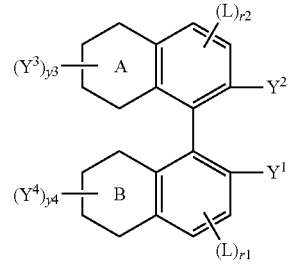

I1a

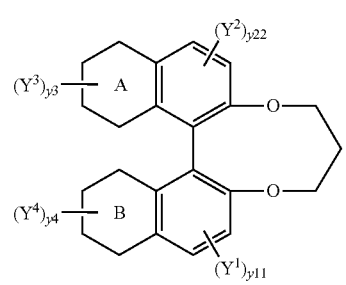

I1b in which L, A, B, $Y^{1-4}$, y3 and y4 have the meaning indicated above, y11 and y22 each, independently of one another, denote 0 or 1, and r1 and r2 each, independently of one another, denote 0, 1 or 2, and $Y^1$ and $Y^2$ preferably contain or denote a polymerizable group.

Particularly preferred compounds of the formulae I1a and I1b are those of the following sub-formulae:

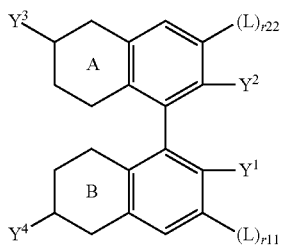

I1a1

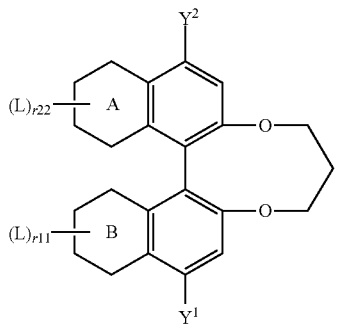

I1b1 in which $Y^{1,2}$, L, A and B have the meaning indicated above, and r11 and r22 each, independently of one another, denote 0 or 1.

Particular preference is given to compounds of the formulae I1, I1a, I1a1, I1b, I1b1 and sub-formulae thereof in which one or more of the radicals $Y^{1-4}$ denote —W—$(Z^1-A^1)_{m1}$-Sp-P, in which W denotes O, S, CH$_2$ or a single bond,
Sp denotes a spacer group or a single bond,
P denotes a polymerizable group,
$A^1$ on each occurrence, identically or differently, denotes aryl, heteroaryl or fully or partially saturated cycloalkyl having 4 to 20 C atoms, which is optionally substituted and in which, in addition, one or more CH groups may be replaced by N and/or one or more CH$_2$ groups may be replaced by O and/or S in such a way that O and/or S atoms are not linked directly to one another,
$Z^1$ on each occurrence, identically or differently, denotes —O—, —S—, —CO—, —COO—, —OCO—, —O—COO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CF=CF—, —C≡C—, —CH=CH—COO—, —OCO—CH=CH—, CR$^{0\prime}$R$^{00\prime}$ or a single bond,
R$^{0\prime}$ and R$^{00\prime}$ each, independently of one another, denote H or alkyl having 1 to 4 C atoms, and
m1 denotes 0, 1, 2, 3 or 4.

Preference is furthermore given to compounds of the formulae I1, I1a, I1a1, I1b, I1b1 and sub-formulae thereof in which one or more of the radicals $Y^{1-4}$ denote —W—$(Z^1-A^1)_{m1}$-R$^y$, in which W, $Z^1$, $A^1$ and m1 have the meaning indicated above, and R$^y$ on each occurrence, identically or differently, denotes H, L as defined above, or straight-chain or branched alkyl having 1 to 25 C atoms, which is unsubstituted or mono- or polysubstituted by F, Cl, Br, I, CN or P-Sp- and in which one or more non-adjacent CH$_2$ groups may each, independently of one another, be replaced by —C(R$^x$)=C(R$^x$)—, —C≡C—, —N(R$^x$)—, —O—, —S—, —CO—, —CO—O—, —O—CO—, —O—CO—O— in such a way that O and/or S atoms are not linked directly to one another, where R$^x$ has the meaning indicated above, and, if all radicals $Y^{1-4}$ denote —W—$(Z^1-A^1)_{m1}$-R$^y$, one or more of the radicals R$^y$ have at least one group P-Sp-.

The groups —$(Z^1-A^1)_{m1}$- are preferably selected from the following formulae:

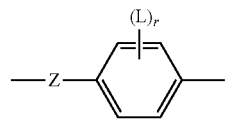

Ia

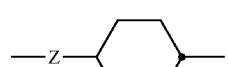

Ib

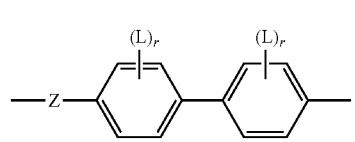

Id

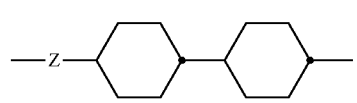

Ie

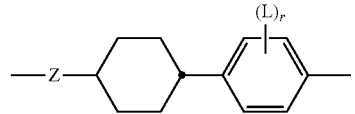

If

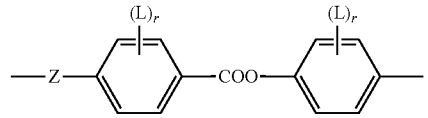

Ig

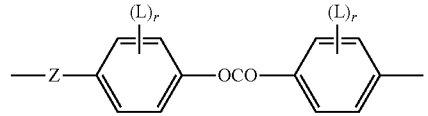

Ih

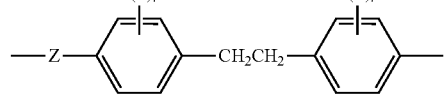

Ii

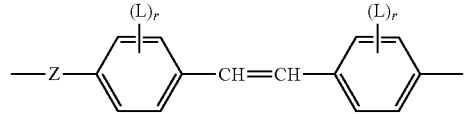

Ik

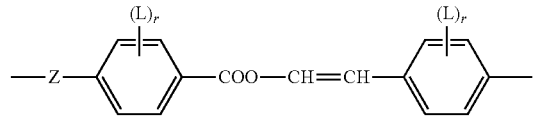

Im

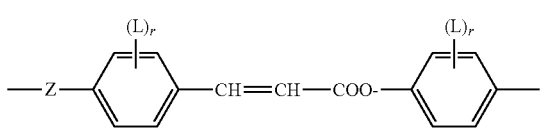

In

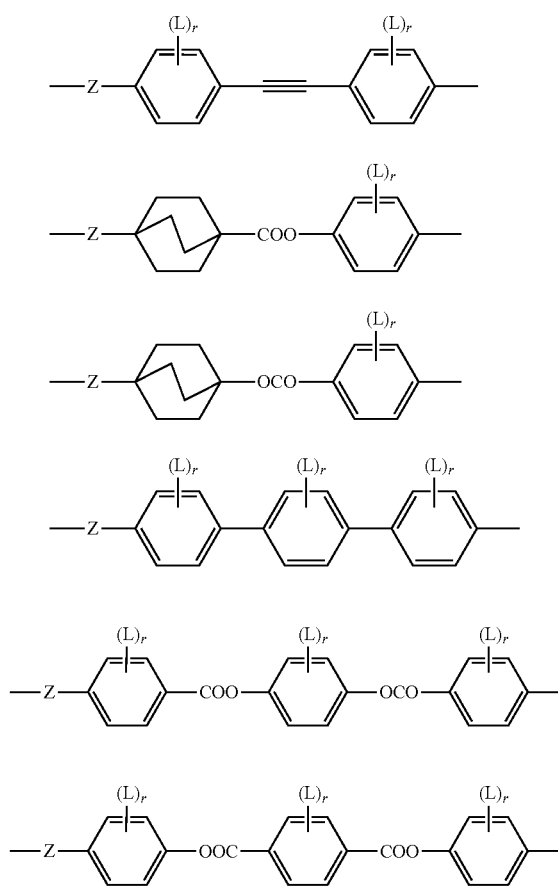

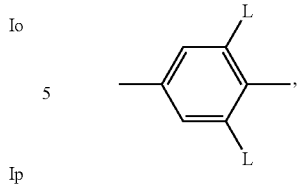

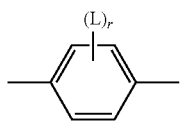

in which r≠0 preferably denotes

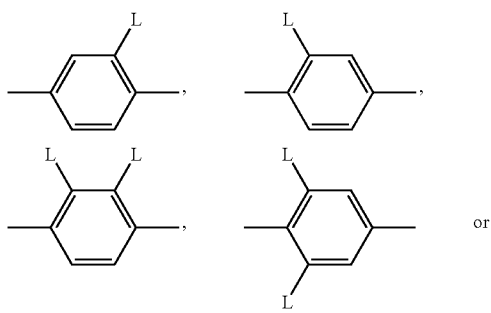

in which Z has one of the meanings indicated for $Z^1$, and L has the meaning indicated above, and r denotes 0, 1, 2, 3 or 4, preferably 0, 1 or 2. Z particularly preferably denotes OCO, OCH$_2$, OCF$_2$, CH$_2$CH$_2$, CH=CH, C≡C or a single bond; L is preferably F.

in which L on each occurrence, identically or differently, has one of the meanings indicated above.

Preference is furthermore given to compounds of the formulae I1, I1a, I1a1, I1b, I1b1 and sub-formulae thereof in which $Y^1$ and $Y^2$ each, independently of one another, have one of the meanings indicated for —W—$(Z^1-A^1)_{m1}$-Sp-P or —W—$(Z^1-A^1)_{m1}$-$R^y$, $Y^1$ and $Y^2$ are identical radicals, $Y^1$ and $Y^2$ denote P-Sp-, $Y^1$ and $Y^2$ denote P—, $Y^1$ and/or $Y^2$ denote —W—$(Z^1-A^1)_{m1}$-Sp-P in which m1 is >0, $Y^1$ and/or $Y^2$ denote —W—$(Z^1-A^1)_{m1}$-$R^y$ in which m1 is >0, $Y^1$ and/or $Y^2$ denote $R^y$, $Y^3$ and/or $Y^4$ denote H, $Y^3$ and $Y^4$ each, independently of one another, have one of the meanings indicated for —W-$(A^1-Z^1)_{m1}$-Sp-P or —W—$(Z^1-A^1)_{m1}$-$R^y$, $Y^3$ and $Y^4$ are identical radicals, $Y^3$ and $Y^4$ denote P-Sp-, $Y^3$ and $Y^4$ denote P—, $Y^3$ and/or $Y^4$ denote —W—$(Z^1-A^1)_{m1}$-Sp-P in which m1 is >0, $Y^3$ and/or $Y^4$ denote —W—$(Z^1-A^1)_{m1}$-$R^y$ in which m1 is >0, $Y^3$ and/or $Y^4$ denote $R^y$, one or more radicals $Y^{1-4}$ have one of the meanings indicated for —W—$(Z^1-A^1)_{m1}$-$R^y$ in which one or more of the radicals $R^y$ are di- or polysubstituted by P-Sp-, $Y^1$ and $Y^2$ denote P, preferably acrylate or methacrylate, and $Y^3$ and $Y^4$ denote H or aryl, which is optionally mono- or polysubstituted by L, preferably H or unsubstituted phenyl, $Y^3$ and $Y^4$ are each 1, m1 is 0, m1 is 1 or 2, W denotes a single bond, Sp denotes a single bond, Sp denotes —O—(CH$_2$)$_{p1}$—, —OCO—(CH$_2$)$_{p1}$— or —OCOO—(CH$_2$)$_{p1}$—, and p1 denotes an integer from 2 to 12, preferably 3 or 6, P denotes acrylate or methacrylate, L denotes F, A and B denote a benzene ring, A and B denote a cyclohexane ring, $Y^{11}$ and $Y^{22}$ denote 1, r1 and r2 denote 0, r11 and r22 denote 0, r11 and r22 denote 1, and L has one of the meanings indicated above and particularly preferably denotes methyl or phenyl.

A preferred embodiment of the invention is directed to compounds of the formulae I1, I1a, I1a1, I1b, I1b1 and sub-formulae thereof in which one or more of the radicals $Y^{1-4}$, preferably the radicals $Y^1$ and $Y^2$, form an aliphatic or aromatic, mono- or polycyclic and optionally condensed ring system with an adjacent radical $Y^{1-4}$ or with the biaryl skeleton. Such compounds are described, for example, in EP 1 249 483 A1, WO 02/034739 A1, WO 02/006195 A1 and WO 02/094805 A1.

However, particular preference is given to compounds of the formulae I1, I1a, I1a1, I1b, I1b1 and sub-formulae thereof in which one or more of the radicals $Y^{1-4}$, preferably at least the radicals $Y^1$ and $Y^2$, particularly preferably all radicals $Y^{1-4}$, denote terminal groups, i.e. do not form a ring system with one another or with the biaryl skeleton.

In a further preferred embodiment of the invention, the compounds of the formulae I1, I1a, I1a1, I1b, I1b1 and sub-formulae thereof contain one or more branched radicals R having two or more polymerizable groups P (multifunctional polymerizable radicals). Suitable radicals of this type and binaphthyl compounds containing them are described, for example, in U.S. Pat. No. 7,060,200 B1 or US 2006/0172090 A1. Particular preference is given to multifunctional polymerizable radicals R selected from the following formulae:

| | |
|---|---|
| —X-alkyl-CHP$^1$—CH$_2$—CH$_2$P$^2$ | I*a |
| —X-alkyl-C(CH$_2$P$^1$)(CH$_2$P$^2$)—CH$_2$P$^3$ | I*b |
| —X-alkyl-CHP$^1$CHP$^2$—CH$_2$P$^3$ | I*c |
| —X-alkyl-C(CH$_2$P$^1$)(CH$_2$P$^2$)—C$_{aa}$H$_{2aa+1}$ | I*d |
| —X-alkyl-CHP$^1$—CH$_2$P$^2$ | I*e |
| —X-alkyl-CHP$^1$P$^2$ | I*f |
| —X-alkyl-CP$^1$P$^2$—C$_{aa}$H$_{2aa+1}$ | I*g |
| —X-alkyl-C(CH$_2$P$^1$)(CH$_2$P$^2$)—CH$_2$OCH$_2$—C(CH$_2$P$^3$)(CH$_2$P$^4$)CH$_2$P$^5$ | I*h |
| —X-alkyl-CH((CH$_2$)$_{aa}$P$^1$)((CH$_2$)$_{bb}$P$^2$) | I*i |
| —X-alkyl-CHP$^1$CHP$^2$—C$_{aa}$H$_{2aa+1}$ | I*k | in which
  alkyl denotes a single bond or straight-chain or branched alkylene having 1 to 12 C atoms which is unsubstituted or mono- or polysubstituted by F, Cl or CN and in which one or more non-adjacent CH$_2$ groups may each, independently of one another, be replaced by —C(R$^x$)═C(R$^x$)—, —C≡C—, —N(R$^x$)—, —O—, —S—, —CO—, —CO—O—, —O—CO—, —O—CO—O— in such a way that O and/or S atoms are not linked directly to one another, where R$^x$ has the meaning indicated above and preferably denotes R$^0$ as defined above,
  aa and bb each, independently of one another, denote 0, 1, 2, 3, 4, 5 or 6,
  X has one of the meanings indicated for X', and
  P$^{1-5}$ each, independently of one another, have one of the meanings indicated above for P.

Particularly preferred compounds of the formula I1a1 are those of the following sub-formulae:

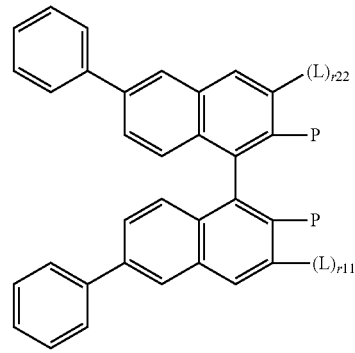

I1a1a

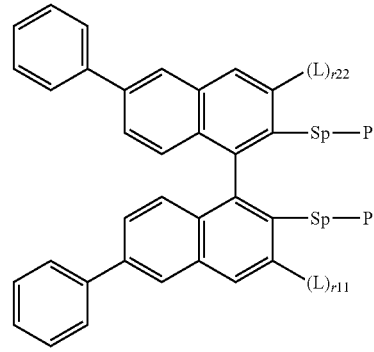

I1a1b

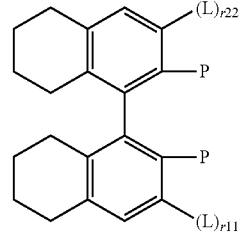

I1a1c

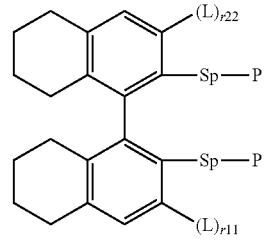

I1a1d

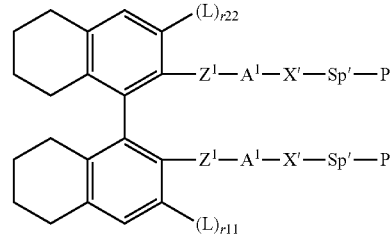

L1a1e

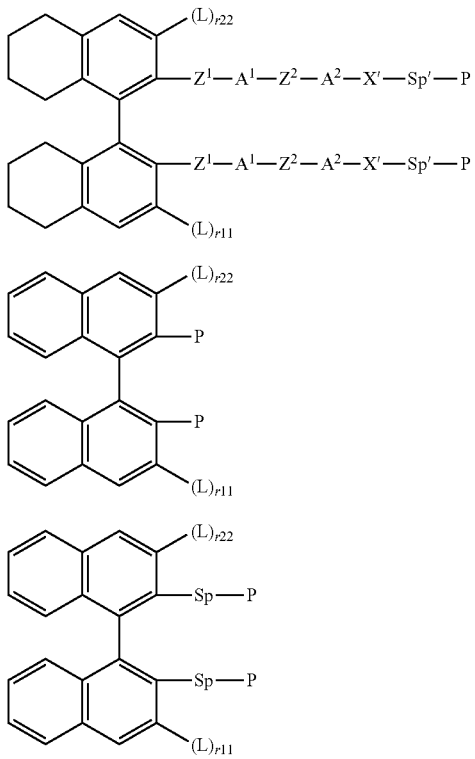

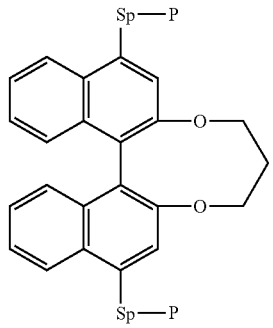

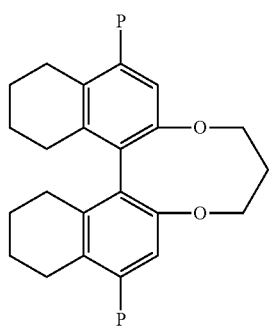

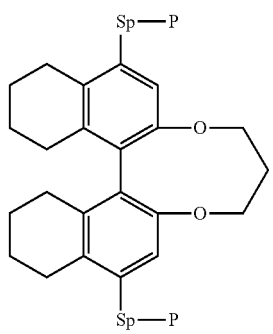

in which Sp, X', Sp', P, $Z^1$, $A^1$, L, r11 and r22 on each occurrence, identically or differently, have the meanings indicated above, and $Z^2$ and $A^2$ have one of the meanings indicated for $Z^1$ and $A^1$ respectively. The groups —$Z^1$-$A^1$- and —$Z^1$-$A^1$-$Z^2$-$A^2$- are preferably selected from the formulae Ia-Iq.

Particularly preferred compounds of the formula I1b1 are those of the following sub-formulae:

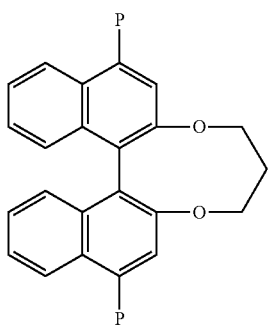

in which Sp and P on each occurrence, identically or differently, have the meanings indicated above.

Examples of particularly preferred compounds of the formulae I1a1e and I1a1f are shown in the following tables (r11=r22=0).

Formula I1a1e:

| No. | $Z^1$ | $A^1$ | X' | Sp' | P |
|---|---|---|---|---|---|
| 1 | 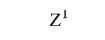 | 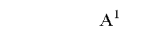 | O | —$C_3H_6$— |  |

-continued

| No. | Z¹ | A¹ | X' | Sp' | P |
|---|---|---|---|---|---|
| 2 | CH₃-O-CH₂- | 1,4-phenylene | O | —C₃H₆— | acrylate (—O—C(=O)—CH=CH₂) |
| 3 | (CH₃)₂CH— | 1,4-phenylene | O | —C₃H₆— | acrylate |
| 4 | CH₃—O—CF₂— | 1,4-phenylene | O | —C₃H₆— | acrylate |
| 5 | CH₃—CH=CH— | 1,4-phenylene | O | —C₃H₆— | acrylate |
| 6 | HC≡C— | 1,4-phenylene | O | —C₃H₆— | acrylate |
| 7 | CH₃—C(=O)—O— | 2-fluoro-1,4-phenylene | O | —C₃H₆— | acrylate |
| 8 | CH₃—O—CH₂— | 2-fluoro-1,4-phenylene | O | —C₃H₆— | acrylate |
| 9 | (CH₃)₂CH— | 2-fluoro-1,4-phenylene | O | —C₃H₆— | acrylate |
| 10 | CH₃—O—CF₂— | 2-fluoro-1,4-phenylene | O | —C₃H₆— | acrylate |

-continued

| No. | Z¹ | A¹ | X' | Sp' | P |
|---|---|---|---|---|---|
| 11 | (2-butene, H on each CH) | 2-fluoro-1,4-phenylene | O | —C₃H₆— | acrylate |
| 12 | HC≡C— | 2-fluoro-1,4-phenylene | O | —C₃H₆— | acrylate |
| 13 | CH₃C(=O)O— | 2,3-difluoro-1,4-phenylene | O | —C₃H₆— | acrylate |
| 14 | CH₃CH₂O— | 2,3-difluoro-1,4-phenylene | O | —C₃H₆— | acrylate |
| 15 | CH₃CH₂— | 2,3-difluoro-1,4-phenylene | O | —C₃H₆— | acrylate |
| 16 | CF₂HCH₂O— | 2,3-difluoro-1,4-phenylene | O | —C₃H₆— | acrylate |
| 17 | (2-butene) | 2,3-difluoro-1,4-phenylene | O | —C₃H₆— | acrylate |
| 18 | HC≡C— | 2,3-difluoro-1,4-phenylene | O | —C₃H₆— | acrylate |
| 19 | CH₃C(=O)O— | 2,6-difluoro-1,4-phenylene | O | —C₃H₆— | acrylate |

-continued

| No. | Z¹ | A¹ | X' | Sp' | P |
|---|---|---|---|---|---|
| 20 | CH₃-CH(H)(H)-O— | 2,3-difluoro-1,4-phenylene | O | —C₃H₆— | acrylate |
| 21 | (CH₃)₂CH— | 2,3-difluoro-1,4-phenylene | O | —C₃H₆— | acrylate |
| 22 | CH₃-CF₂-O— | 2,3-difluoro-1,4-phenylene | O | —C₃H₆— | acrylate |
| 23 | (CH₃)(H)C=C(CH₃)— | 2,3-difluoro-1,4-phenylene | O | —C₃H₆— | acrylate |
| 24 | HC≡C— | 2,3-difluoro-1,4-phenylene | O | —C₃H₆— | acrylate |
| 25 | CH₃-C(=O)-O— | 1,4-phenylene | O | —C₆H₁₂— | acrylate |
| 26 | CH₃-CH(H)(H)-O— | 1,4-phenylene | O | —C₆H₁₂— | acrylate |
| 27 | (CH₃)₂CH— | 1,4-phenylene | O | —C₆H₁₂— | acrylate |
| 28 | CH₃-CF₂-O— | 1,4-phenylene | O | —C₆H₁₂— | acrylate |

-continued

| No. | Z¹ | A¹ | X' | Sp' | P |
|-----|----|----|----|----|---|
| 29 | CH₃-CH=CH- (trans) | 1,4-phenylene | O | —C₆H₁₂— | acrylate |
| 30 | HC≡C— | 1,4-phenylene | O | —C₆H₁₂— | acrylate |
| 31 | CH₃-C(=O)-O— | 2-fluoro-1,4-phenylene | O | —C₆H₁₂— | acrylate |
| 32 | CH₃-CH₂-O— | 2-fluoro-1,4-phenylene | O | —C₆H₁₂— | acrylate |
| 33 | (CH₃)₂CH— | 2-fluoro-1,4-phenylene | O | —C₆H₁₂— | acrylate |
| 34 | CHF₂-O— | 2-fluoro-1,4-phenylene | O | —C₆H₁₂— | acrylate |
| 35 | CH₃-CH=CH- (trans) | 2-fluoro-1,4-phenylene | O | —C₆H₁₂— | acrylate |
| 36 | HC≡C— | 2-fluoro-1,4-phenylene | O | —C₆H₁₂— | acrylate |
| 37 | CH₃-C(=O)-O— | 2,5-difluoro-1,4-phenylene | O | —C₆H₁₂— | acrylate |

-continued

| No. | Z¹ | A¹ | X' | Sp' | P |
|---|---|---|---|---|---|
| 38 | CH₃-CH(H)(H)-O- | 2,3-difluoro-1,4-phenylene | O | —C₆H₁₂— | acrylate |
| 39 | (CH₃)₂CH- | 2,3-difluoro-1,4-phenylene | O | —C₆H₁₂— | acrylate |
| 40 | CF₂H-O- (CHF₂-O-) | 2,3-difluoro-1,4-phenylene | O | —C₆H₁₂— | acrylate |
| 41 | CH₃-CH=CH- | 2,3-difluoro-1,4-phenylene | O | —C₆H₁₂— | acrylate |
| 42 | HC≡C- | 2,3-difluoro-1,4-phenylene | O | —C₆H₁₂— | acrylate |
| 43 | CH₃-C(=O)-O- | 2,3-difluoro-1,4-phenylene | O | —C₆H₁₂— | acrylate |
| 44 | CH₃-CH(H)(H)-O- | 2,3-difluoro-1,4-phenylene | O | —C₆H₁₂— | acrylate |
| 45 | (CH₃)₂CH- | 2,3-difluoro-1,4-phenylene | O | —C₆H₁₂— | acrylate |
| 46 | CF₂H-O- | 2,3-difluoro-1,4-phenylene | O | —C₆H₁₂— | acrylate |

-continued

| No. | Z¹ | A¹ | X' | Sp' | P |
|---|---|---|---|---|---|
| 47 | CH₃-CH=CH- (with H's shown) | 2,3-difluoro-1,4-phenylene | O | —C₆H₁₂— | acrylate (—O—CO—CH=CH₂) |
| 48 | HC≡C— | 2,3-difluoro-1,4-phenylene | O | —C₆H₁₂— | acrylate (—O—CO—CH=CH₂) |
| 49 | CH₃—C(=O)—O— | 1,4-phenylene | O | —C₃H₆— | methacrylate (—O—CO—C(CH₃)=CH₂) |
| 50 | CH₃—O—CH₂— | 1,4-phenylene | O | —C₃H₆— | methacrylate |
| 51 | CH₃—CH₂—CH₂— | 1,4-phenylene | O | —C₃H₆— | methacrylate |
| 52 | CH₃—CF₂—O— | 1,4-phenylene | O | —C₃H₆— | methacrylate |
| 53 | CH₃—CH=CH— | 1,4-phenylene | O | —C₃H₆— | methacrylate |
| 54 | CH₃—C≡C— | 1,4-phenylene | O | —C₃H₆— | methacrylate |
| 55 | CH₃—C(=O)—O— | 2-fluoro-1,4-phenylene | O | —C₃H₆— | methacrylate |

-continued

| No. | Z¹ | A¹ | X' | Sp' | P |
|---|---|---|---|---|---|
| 56 | CH₃-O-CH₂- | 2-F-1,4-phenylene | O | —C₃H₆— | methacrylate |
| 57 | (CH₃)₂CH— | 2-F-1,4-phenylene | O | —C₃H₆— | methacrylate |
| 58 | CHF₂-O-CH₂- | 2-F-1,4-phenylene | O | —C₃H₆— | methacrylate |
| 59 | CH₃-CH=CH— | 2-F-1,4-phenylene | O | —C₃H₆— | methacrylate |
| 60 | HC≡C— | 2-F-1,4-phenylene | O | —C₃H₆— | methacrylate |
| 61 | CH₃-C(=O)-O— | 2,3-diF-1,4-phenylene | O | —C₃H₆— | methacrylate |
| 62 | CH₃-O-CH₂- | 2,3-diF-1,4-phenylene | O | —C₃H₆— | methacrylate |
| 63 | (CH₃)₂CH— | 2,3-diF-1,4-phenylene | O | —C₃H₆— | methacrylate |
| 64 | CHF₂-O-CH₂- | 2,3-diF-1,4-phenylene | O | —C₃H₆— | methacrylate |

-continued

| No. | Z¹ | A¹ | X' | Sp' | P |
|---|---|---|---|---|---|
| 65 | CH₃-CH=CH- (cis) | 2,3-difluoro-1,4-phenylene | O | —C₃H₆— | methacrylate |
| 66 | HC≡C— | 2,3-difluoro-1,4-phenylene | O | —C₃H₆— | methacrylate |
| 67 | CH₃—C(=O)—O— | 2,3-difluoro-1,4-phenylene | O | —C₃H₆— | methacrylate |
| 68 | CH₃—CH₂—O— | 2,3-difluoro-1,4-phenylene | O | —C₃H₆— | methacrylate |
| 69 | CH₃—CH₂—CH₂— | 2,3-difluoro-1,4-phenylene | O | —C₃H₆— | methacrylate |
| 70 | CHF₂—CH₂—O— | 2,3-difluoro-1,4-phenylene | O | —C₃H₆— | methacrylate |
| 71 | CH₃-CH=CH- (trans) | 2,3-difluoro-1,4-phenylene | O | —C₃H₆— | methacrylate |
| 72 | CH₃—C≡C— | 2,3-difluoro-1,4-phenylene | O | —C₃H₆— | methacrylate |
| 73 | CH₃—C(=O)—O— | 1,4-phenylene | O | —C₆H₁₂— | methacrylate |

-continued

| No. | Z¹ | A¹ | X' | Sp' | P |
|---|---|---|---|---|---|
| 74 | CH₃-O-CH₂- | 1,4-phenylene | O | —C₆H₁₂— | methacrylate |
| 75 | CH₃-CH₂-CH₂- (propyl) | 1,4-phenylene | O | —C₆H₁₂— | methacrylate |
| 76 | CH₃-O-CF₂- | 1,4-phenylene | O | —C₆H₁₂— | methacrylate |
| 77 | CH₃-CH=CH- | 1,4-phenylene | O | —C₆H₁₂— | methacrylate |
| 78 | HC≡C— | 1,4-phenylene | O | —C₆H₁₂— | methacrylate |
| 79 | CH₃-C(=O)-O- | 2-fluoro-1,4-phenylene | O | —C₆H₁₂— | methacrylate |
| 80 | CH₃-O-CH₂- | 2-fluoro-1,4-phenylene | O | —C₆H₁₂— | methacrylate |
| 81 | CH₃-CH₂-CH₂- | 2-fluoro-1,4-phenylene | O | —C₆H₁₂— | methacrylate |
| 82 | CH₃-O-CF₂- | 2-fluoro-1,4-phenylene | O | —C₆H₁₂— | methacrylate |

-continued

| No. | Z¹ | A¹ | X' | Sp' | P |
|---|---|---|---|---|---|
| 83 | (E)-CH=CH-CH₃ | 2-F-phenylene | O | —C₆H₁₂— | methacrylate |
| 84 | HC≡C— | 2-F-phenylene | O | —C₆H₁₂— | methacrylate |
| 85 | CH₃C(=O)O— | 2,6-diF-phenylene | O | —C₆H₁₂— | methacrylate |
| 86 | CH₃CH₂O— | 2,6-diF-phenylene | O | —C₆H₁₂— | methacrylate |
| 87 | (CH₃)₂CH— | 2,6-diF-phenylene | O | —C₆H₁₂— | methacrylate |
| 88 | CHF₂CH₂O— | 2,6-diF-phenylene | O | —C₆H₁₂— | methacrylate |
| 89 | (Z)-CH=CH-CH₃ | 2,6-diF-phenylene | O | —C₆H₁₂— | methacrylate |
| 90 | HC≡C— | 2,6-diF-phenylene | O | —C₆H₁₂— | methacrylate |
| 91 | CH₃C(=O)O— | 2,3-diF-phenylene | O | —C₆H₁₂— | methacrylate |

-continued

| No. | Z¹ | A¹ | X' | Sp' | P |
|---|---|---|---|---|---|
| 92 | CH₃-O-CH₂- (methoxymethyl) | 2,3-difluoro-1,4-phenylene | O | —C₆H₁₂— | methacrylate |
| 93 | isopropyl | 2,3-difluoro-1,4-phenylene | O | —C₆H₁₂— | methacrylate |
| 94 | -O-CHF₂ (difluoromethoxy) | 2,3-difluoro-1,4-phenylene | O | —C₆H₁₂— | methacrylate |
| 95 | CH₃-CH=CH- | 2,3-difluoro-1,4-phenylene | O | —C₆H₁₂— | methacrylate |
| 96 | HC≡C— | 2,3-difluoro-1,4-phenylene | O | —C₆H₁₂— | methacrylate |

Formula I1a1f:

| No. | Z¹ | A¹ | Z² | A² | X' | Sp' | P |
|---|---|---|---|---|---|---|---|
| 97 | CH₃-C(=O)-O- | 1,4-phenylene | — | 1,4-phenylene | O | —C₃H₆— | acrylate |
| 98 | CH₃-O-CH₂- | 1,4-phenylene | — | 1,4-phenylene | O | —C₃H₆— | acrylate |
| 99 | isopropyl | 1,4-phenylene | — | 1,4-phenylene | O | —C₃H₆— | acrylate |

-continued
| No. | Z¹ | A¹ | Z² | A² | X' | Sp' | P |
|---|---|---|---|---|---|---|---|
| 100 | 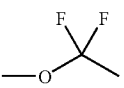 | 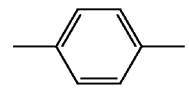 | — | 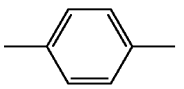 | O | —C₃H₆— | 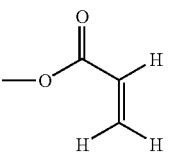 |
| 101 | 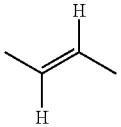 | 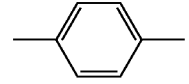 | — | 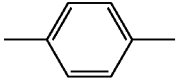 | O | —C₃H₆— | 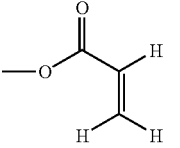 |
| 102 | 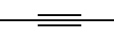 | 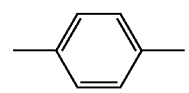 | — | 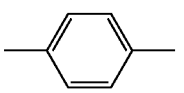 | O | —C₃H₆— | 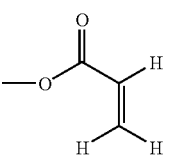 |
| 103 | 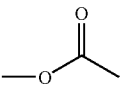 | 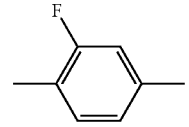 | — | 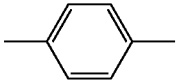 | O | —C₃H₆— | 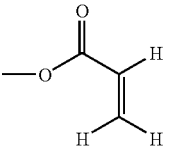 |
| 104 | 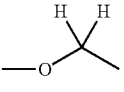 | 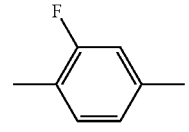 | — | 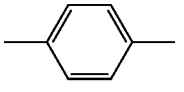 | O | —C₃H₆— | 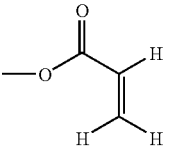 |
| 105 | 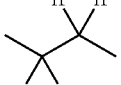 | 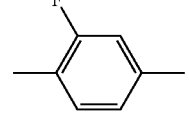 | — | 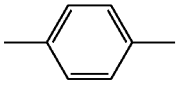 | O | —C₃H₆— | 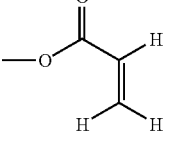 |
| 106 | 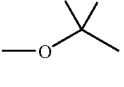 | 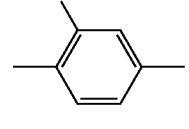 | — | 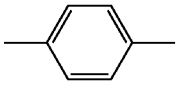 | O | —C₃H₆— | 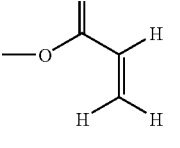 |
| 107 | 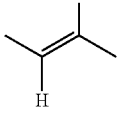 | 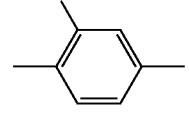 | — | 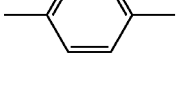 | O | —C₃H₆— | 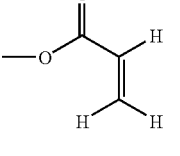 |
| 108 |  | 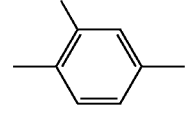 | — | 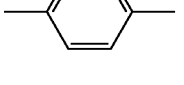 | O | —C₃H₆— | 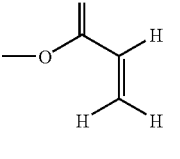 |

-continued

| No. | Z¹ | A¹ | Z² | A² | X' | Sp' | P |
|---|---|---|---|---|---|---|---|
| 109 | CH₃C(=O)O— | 2,6-difluoro-1,4-phenylene | — | 1,4-phenylene | O | —C₃H₆— | CH₂=CH—C(=O)O— |
| 110 | CH₃CH₂O— | 2,6-difluoro-1,4-phenylene | — | 1,4-phenylene | O | —C₃H₆— | CH₂=CH—C(=O)O— |
| 111 | (CH₃)₂CH— | 2,6-difluoro-1,4-phenylene | — | 1,4-phenylene | O | —C₃H₆— | CH₂=CH—C(=O)O— |
| 112 | CHF₂CH₂O— | 2,6-difluoro-1,4-phenylene | — | 1,4-phenylene | O | —C₃H₆— | CH₂=CH—C(=O)O— |
| 113 | CH₃CH=CH— | 2,6-difluoro-1,4-phenylene | — | 1,4-phenylene | O | —C₃H₆— | CH₂=CH—C(=O)O— |
| 114 | HC≡C— | 2,6-difluoro-1,4-phenylene | — | 1,4-phenylene | O | —C₃H₆— | CH₂=CH—C(=O)O— |
| 115 | CH₃C(=O)O— | 2,3-difluoro-1,4-phenylene | — | 1,4-phenylene | O | —C₃H₆— | CH₂=CH—C(=O)O— |
| 116 | CH₃CH₂O— | 2,3-difluoro-1,4-phenylene | — | 1,4-phenylene | O | —C₃H₆— | CH₂=CH—C(=O)O— |
| 117 | (CH₃)₂CH— | 2,3-difluoro-1,4-phenylene | — | 1,4-phenylene | O | —C₃H₆— | CH₂=CH—C(=O)O— |

-continued
| No. | Z¹ | A¹ | Z² | A² | X' | Sp' | P |
|---|---|---|---|---|---|---|---|
| 118 | 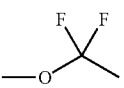 | 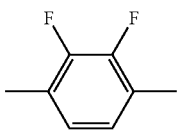 | — | 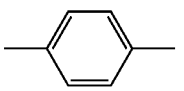 | O | —C₃H₆— | 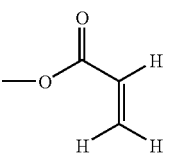 |
| 119 | 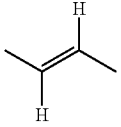 | 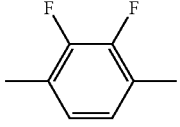 | — | 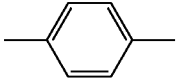 | O | —C₃H₆— | 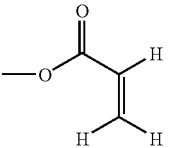 |
| 120 | 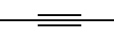 | 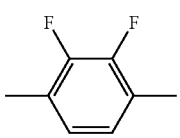 | — | 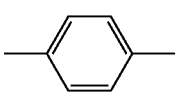 | O | —C₃H₆— | 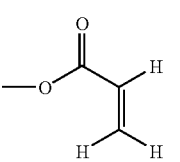 |
| 121 | 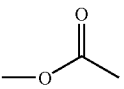 |  | — | 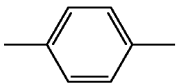 | O | —C₆H₁₂— | 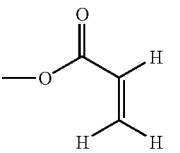 |
| 122 | 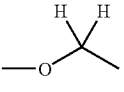 | 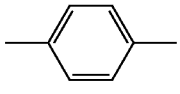 | — | 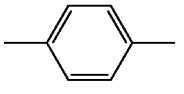 | O | —C₆H₁₂— | 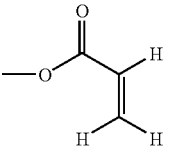 |
| 123 | 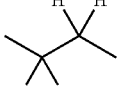 |  | — | 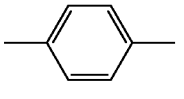 | O | —C₆H₁₂— | 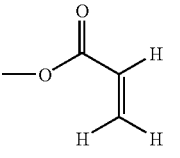 |
| 124 | 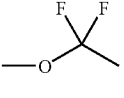 |  | — | 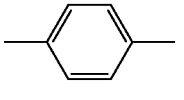 | O | —C₆H₁₂— | 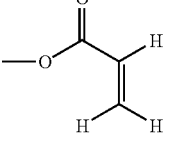 |
| 125 | 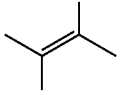 | 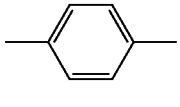 | — | 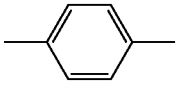 | O | —C₆H₁₂— | 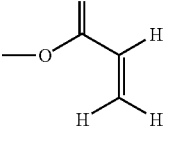 |
| 126 |  | 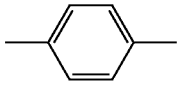 | — | 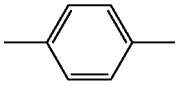 | O | —C₆H₁₂— | 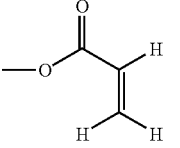 |

-continued

| No. | Z¹ | A¹ | Z² | A² | X' | Sp' | P |
|---|---|---|---|---|---|---|---|
| 127 | methyl ester (—O—C(=O)—CH₃) | 2-fluoro-1,4-phenylene | — | 1,4-phenylene | O | —C₆H₁₂— | acrylate |
| 128 | —O—CH₂— (ethoxy) | 2-fluoro-1,4-phenylene | — | 1,4-phenylene | O | —C₆H₁₂— | acrylate |
| 129 | isopropyl | 2-fluoro-1,4-phenylene | — | 1,4-phenylene | O | —C₆H₁₂— | acrylate |
| 130 | —O—CF₂— | 2-fluoro-1,4-phenylene | — | 1,4-phenylene | O | —C₆H₁₂— | acrylate |
| 131 | cis-propenyl | 2-fluoro-1,4-phenylene | — | 1,4-phenylene | O | —C₆H₁₂— | acrylate |
| 132 | —C≡C— | 2-fluoro-1,4-phenylene | — | 1,4-phenylene | O | —C₆H₁₂— | acrylate |
| 133 | —O—C(=O)—CH₃ | 2,3-difluoro-1,4-phenylene | — | 1,4-phenylene | O | —C₆H₁₂— | acrylate |
| 134 | —O—CH₂— | 2,3-difluoro-1,4-phenylene | — | 1,4-phenylene | O | —C₆H₁₂— | acrylate |
| 135 | isopropyl | 2,3-difluoro-1,4-phenylene | — | 1,4-phenylene | O | —C₆H₁₂— | acrylate |

-continued

| No. | Z¹ | A¹ | Z² | A² | X' | Sp' | P |
|---|---|---|---|---|---|---|---|
| 136 | CF₂H-O-CH₃ (methoxy difluoromethyl) | 3,5-difluoro-1,4-phenylene | — | 1,4-phenylene | O | —C₆H₁₂— | acrylate |
| 137 | CH₃-CH=CH— | 3,5-difluoro-1,4-phenylene | — | 1,4-phenylene | O | —C₆H₁₂— | acrylate |
| 138 | HC≡C— | 3,5-difluoro-1,4-phenylene | — | 1,4-phenylene | O | —C₆H₁₂— | acrylate |
| 139 | CH₃-C(=O)-O— | 2,3-difluoro-1,4-phenylene | — | 1,4-phenylene | O | —C₆H₁₂— | acrylate |
| 140 | CH₃-O-CH₂— | 2,3-difluoro-1,4-phenylene | — | 1,4-phenylene | O | —C₆H₁₂— | acrylate |
| 141 | (CH₃)₂CH— | 2,3-difluoro-1,4-phenylene | — | 1,4-phenylene | O | —C₆H₁₂— | acrylate |
| 142 | CF₂H-O-CH₃ | 2,3-difluoro-1,4-phenylene | — | 1,4-phenylene | O | —C₆H₁₂— | acrylate |
| 143 | CH₃-CH=CH— | 2,3-difluoro-1,4-phenylene | — | 1,4-phenylene | O | —C₆H₁₂— | acrylate |
| 144 | HC≡C— | 2,3-difluoro-1,4-phenylene | — | 1,4-phenylene | O | —C₆H₁₂— | acrylate |

-continued

| No. | Z¹ | A¹ | Z² | A² | X' | Sp' | P |
|---|---|---|---|---|---|---|---|
| 145 | CH₃C(=O)O— | —C₆H₄— | — | —C₆H₄— | O | —C₃H₆— | —O−C(=O)−C(CH₃)=CH₂ |
| 146 | CH₃CH₂O— | —C₆H₄— | — | —C₆H₄— | O | —C₃H₆— | —O−C(=O)−C(CH₃)=CH₂ |
| 147 | (CH₃)₂CH— | —C₆H₄— | — | —C₆H₄— | O | —C₃H₆— | —O−C(=O)−C(CH₃)=CH₂ |
| 148 | CF₂H−O— | —C₆H₄— | — | —C₆H₄— | O | —C₃H₆— | —O−C(=O)−C(CH₃)=CH₂ |
| 149 | CH₃−CH=CH— | —C₆H₄— | — | —C₆H₄— | O | —C₃H₆— | —O−C(=O)−C(CH₃)=CH₂ |
| 150 | HC≡C— | —C₆H₄— | — | —C₆H₄— | O | —C₃H₆— | —O−C(=O)−C(CH₃)=CH₂ |
| 151 | CH₃C(=O)O— | —C₆H₃(F)— | — | —C₆H₄— | O | —C₃H₆— | —O−C(=O)−C(CH₃)=CH₂ |
| 152 | CH₃CH₂O— | —C₆H₃(F)— | — | —C₆H₄— | O | —C₃H₆— | —O−C(=O)−C(CH₃)=CH₂ |
| 153 | (CH₃)₂CH— | —C₆H₃(F)— | — | —C₆H₄— | O | —C₃H₆— | —O−C(=O)−C(CH₃)=CH₂ |

-continued

| No. | Z¹ | A¹ | Z² | A² | X' | Sp' | P |
|---|---|---|---|---|---|---|---|
| 154 | CHF₂-O-CH₂- | 2-F-1,4-phenylene | — | 1,4-phenylene | O | —C₃H₆— | methacrylate |
| 155 | CH₃-CH=CH— | 2-F-1,4-phenylene | — | 1,4-phenylene | O | —C₃H₆— | methacrylate |
| 156 | HC≡C— | 2-F-1,4-phenylene | — | 1,4-phenylene | O | —C₃H₆— | methacrylate |
| 157 | CH₃-C(=O)-O— | 2,6-diF-1,4-phenylene | — | 1,4-phenylene | O | —C₃H₆— | methacrylate |
| 158 | CH₃-CH₂-O— | 2,6-diF-1,4-phenylene | — | 1,4-phenylene | O | —C₃H₆— | methacrylate |
| 159 | CH₃-CH₂-CH₂— | 2,6-diF-1,4-phenylene | — | 1,4-phenylene | O | —C₃H₆— | methacrylate |
| 160 | CHF₂-O-CH₂- | 2,6-diF-1,4-phenylene | — | 1,4-phenylene | O | —C₃H₆— | methacrylate |
| 161 | CH₃-CH=CH— | 2,6-diF-1,4-phenylene | — | 1,4-phenylene | O | —C₃H₆— | methacrylate |
| 162 | HC≡C— | 2,6-diF-1,4-phenylene | — | 1,4-phenylene | O | —C₃H₆— | methacrylate |

-continued

| No. | Z¹ | A¹ | Z² | A² | X' | Sp' | P |
|---|---|---|---|---|---|---|---|
| 163 | CH₃-C(=O)-O- | 2,3-difluoro-1,4-phenylene | — | 1,4-phenylene | O | —C₃H₆— | methacrylate |
| 164 | CH₃-CH₂-O- | 2,3-difluoro-1,4-phenylene | — | 1,4-phenylene | O | —C₃H₆— | methacrylate |
| 165 | (CH₃)₂CH- | 2,3-difluoro-1,4-phenylene | — | 1,4-phenylene | O | —C₃H₆— | methacrylate |
| 166 | CF₂H-CH(-)-O- | 2,3-difluoro-1,4-phenylene | — | 1,4-phenylene | O | —C₃H₆— | methacrylate |
| 167 | (CH₃)₂C=CH- | 2,3-difluoro-1,4-phenylene | — | 1,4-phenylene | O | —C₃H₆— | methacrylate |
| 168 | CH₃-CH=CH- | 2,3-difluoro-1,4-phenylene | — | 1,4-phenylene | O | —C₃H₆— | methacrylate |
| 169 | CH₃-C(=O)-O- | 1,4-phenylene | — | 1,4-phenylene | O | —C₆H₁₂— | methacrylate |
| 170 | CH₃-CH₂-O- | 1,4-phenylene | — | 1,4-phenylene | O | —C₆H₁₂— | methacrylate |
| 171 | (CH₃)₂CH- | 1,4-phenylene | — | 1,4-phenylene | O | —C₆H₁₂— | methacrylate |

-continued
| No. | Z¹ | A¹ | Z² | A² | X' | Sp' | P |
|---|---|---|---|---|---|---|---|
| 172 | 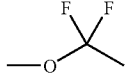 | 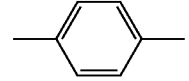 | — | 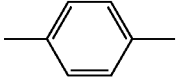 | O | —C₆H₁₂— | 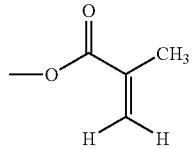 |
| 173 | 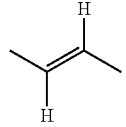 | 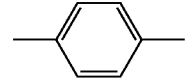 | — | 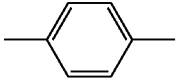 | O | —C₆H₁₂— | 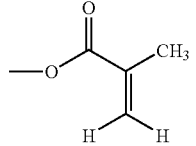 |
| 174 | 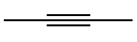 | 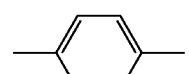 | — | 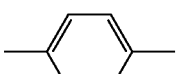 | O | —C₆H₁₂— | 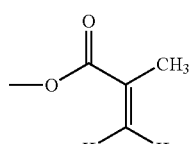 |
| 175 | 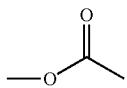 |  | — |  | O | —C₆H₁₂— | 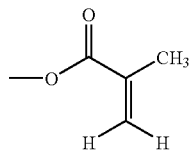 |
| 176 | 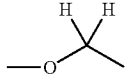 | 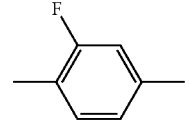 | — | 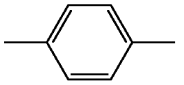 | O | —C₆H₁₂— | 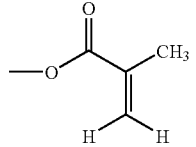 |
| 177 | 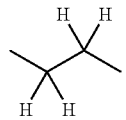 | 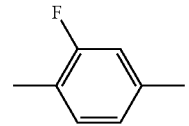 | — |  | O | —C₆H₁₂— | 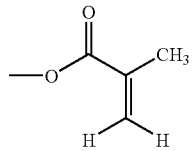 |
| 178 | 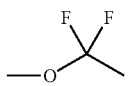 | 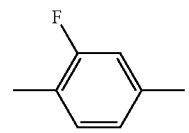 | — | 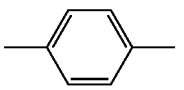 | O | —C₆H₁₂— | 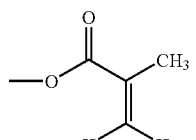 |
| 179 | 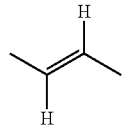 | 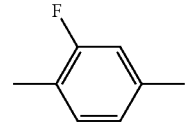 | — | 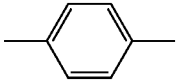 | O | —C₆H₁₂— | 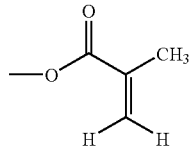 |
| 180 | 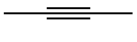 | 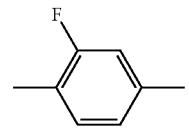 | — |  | O | —C₆H₁₂— | 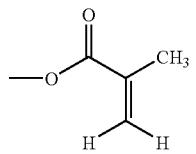 |

-continued

| No. | Z¹ | A¹ | Z² | A² | X' | Sp' | P |
|---|---|---|---|---|---|---|---|
| 181 | CH₃C(O)O— | 2,6-difluoro-1,4-phenylene | — | 1,4-phenylene | O | —C₆H₁₂— | methacrylate |
| 182 | CH₃CH₂O— | 2,6-difluoro-1,4-phenylene | — | 1,4-phenylene | O | —C₆H₁₂— | methacrylate |
| 183 | (CH₃)₂CH— | 2,6-difluoro-1,4-phenylene | — | 1,4-phenylene | O | —C₆H₁₂— | methacrylate |
| 184 | CHF₂CH₂O— | 2,6-difluoro-1,4-phenylene | — | 1,4-phenylene | O | —C₆H₁₂— | methacrylate |
| 185 | (CH₃)₂C=CH— | 2,6-difluoro-1,4-phenylene | — | 1,4-phenylene | O | —C₆H₁₂— | methacrylate |
| 186 | HC≡C— | 2,6-difluoro-1,4-phenylene | — | 1,4-phenylene | O | —C₆H₁₂— | methacrylate |
| 187 | CH₃C(O)O— | 2,3-difluoro-1,4-phenylene | — | 1,4-phenylene | O | —C₆H₁₂— | methacrylate |
| 188 | CH₃CH₂O— | 2,3-difluoro-1,4-phenylene | — | 1,4-phenylene | O | —C₆H₁₂— | methacrylate |
| 189 | (CH₃)₂CH— | 2,3-difluoro-1,4-phenylene | — | 1,4-phenylene | O | —C₆H₁₂— | methacrylate |

-continued

| No. | $Z^1$ | $A^1$ | $Z^2$ | $A^2$ | X' | Sp' | P |
|---|---|---|---|---|---|---|---|
| 190 | 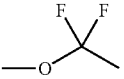 | 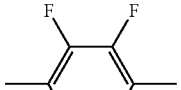 | — | 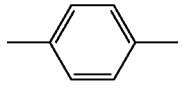 | O | $-C_6H_{12}-$ | 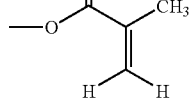 |
| 191 | 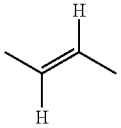 | 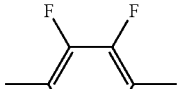 | — | 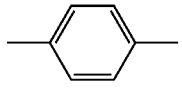 | O | $-C_6H_{12}-$ | 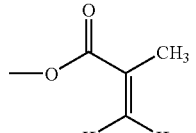 |
| 192 | 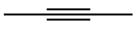 | 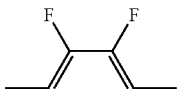 | — | 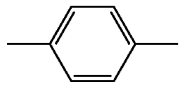 | O | $-C_6H_{12}-$ | 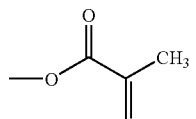 |

The polymerizable compounds are prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart. Polymerizable binaphthyl compounds and the synthesis thereof are described, for example, in DE 43 42 280 A1, DE 195 20 704 A1, GB 2 328 436 A, GB 2 398 569 A, GB 2 298 202 A, EP 0 964 035 A1, EP 1 249 483 A1, WO 02/034739 A1, WO 02/006195 A1, WO 02/094805 A1, US 2005/179005 A1, JP 2001-066431 A, JP 2005-170934 A or JP 2005-171235 A.

The polymerizable compounds are polymerized or crosslinked (if a compound contains two or more polymerizable groups) by in-situ polymerization in the LC medium between the substrates of the LC display with application of a voltage. Suitable and preferred polymerization methods are, for example, thermal or photopolymerization, preferably photopolymerization, in particular UV photopolymerization. If necessary, one or more initiators may also be added here. Suitable conditions for the polymerization, and suitable types and amounts of the initiators, are known to the person skilled in the art and are described in the literature. Suitable for free-radical polymerization are, for example, the commercially available photoinitiators Irgacure651®, Irgacure184® or Darocure1173® (Ciba AG). If an initiator is employed, its proportion in the mixture as a whole is preferably 0.001 to 5% by weight, particularly preferably 0.005 to 1% by weight. However, the polymerization can also take place without addition of an initiator.

The biaryl compounds according to the invention are particularly suitable for polymerization without initiator, which is associated with considerable advantages, such as, for example, lower material costs and in particular less contamination of the LC medium by possible residual amounts of the initiator or degradation products thereof.

The LC medium may also comprise one or more stabilizers to avoid undesired spontaneous polymerization of the RMs, for example during storage or transport. Suitable types and amounts of stabilizers are known to the person skilled in the art and are described in the literature. Especially suitable are for example the commercially available stabilizers of the Irganox® series (Ciba AG). If stabilizers are used, their proportion in relation to the total amount of polymerizable compounds is preferably 10 to 5000 ppm, very preferably 50 to 500 ppm.

The LC media according to the invention preferably comprise <5%, particularly preferably <1%, very particularly preferably <0.5%, of polymerizable compounds, in particular biaryl compounds of the formulae mentioned above.

The polymerizable compounds according to the invention can be added individually to the LC media, but it is also possible to use mixtures comprising two or more polymerizable biaryl compounds according to the invention or mixtures comprising one or more polymerizable biaryl compounds according to the invention and one or more additional polymerizable compounds (comonomers). The comonomers can be mesogenic or non-mesogenic. In the case of polymerization of mixtures of this type, copolymers are formed. The invention furthermore relates to the polymerizable mixtures mentioned above and below.

Suitable and preferred mesogenic comonomers are, for example, those selected from the following formulae:

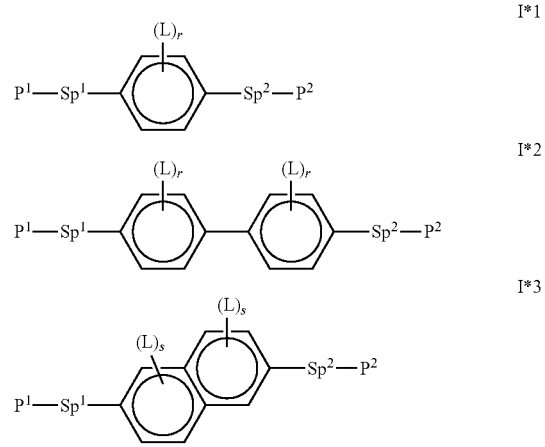

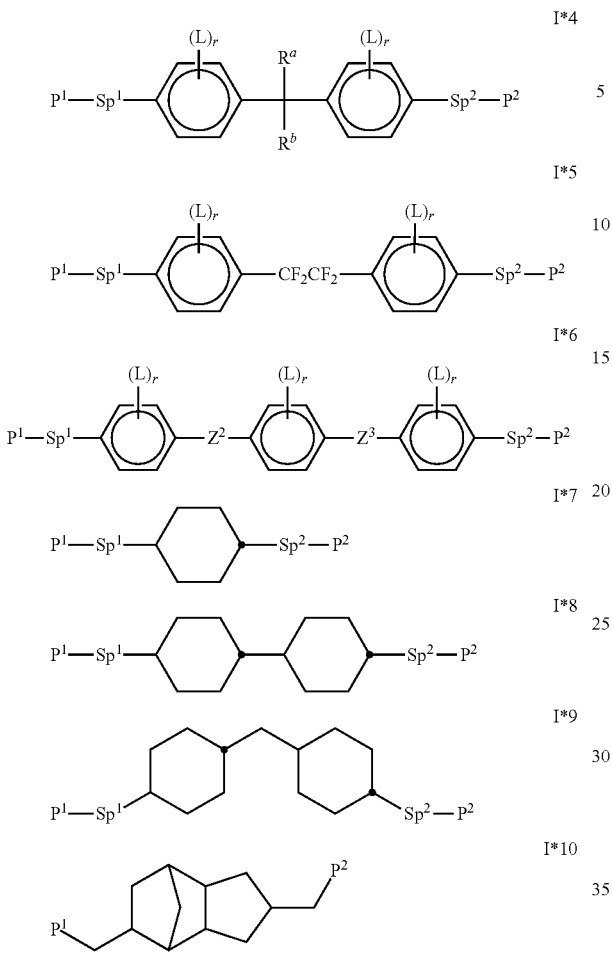

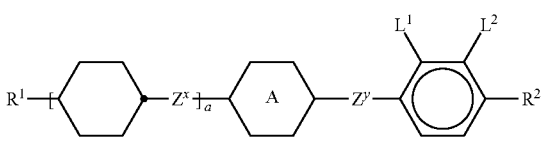

in which

R¹ and R² each, independently of one another, denote alkyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another, $Z^x$ and $Z^y$ each, independently of one another, denote —$CH_2CH_2$—, —CH=CH—, —$CF_2O$—, —$OCF_2$—, —$CH_2O$—, —$OCH_2$—, —COO—, —OCO—, —$C_2F_4$—, —CF=CF—, —$CHCH_2O$—, or a single bond, preferably a single bond, L¹ and L² each, independently of one another, denote F, Cl, $OCF_3$, $CF_3$, $CH_3$, $CH_2F$ or $CHF_2$, a denotes 0 or 1, and

Preferably, L¹ and L² denote F or one of L¹ and L² denotes Cl and the other denotes F.

The compounds of the formula II are preferably selected from the following formulae:

in which P¹ and P² have one of the meanings indicated for P and preferably denote acrylate or methacrylate, Sp¹ and Sp² have one of the meanings indicated for Sp or denote a single bond, Z² and Z³ each, independently of one another, have one of the meanings indicated for Z¹ and preferably denote —COO— or —OCO, L and r on each occurrence, identically or differently, have one of the meanings indicated above, and L preferably denotes F or $CH_3$, s denotes 0, 1, 2 or 3, and $R^a$ and $R^b$ each, independently of one another, denote H or $CH_3$.

Besides the polymerizable biaryl compounds described above, the LC media for use in the LC displays according to the invention comprise an LC mixture ("host mixture") comprising one or more, preferably two or more, low-molecular-weight (i.e. monomeric or unpolymerized) compounds. The latter are stable or unreactive to a polymerization reaction under the conditions used for the polymerization of the biaryl compounds. In principle, any LC mixture which is suitable for use in conventional VA and OCB displays is suitable as host mixture. Suitable LC mixtures are known to the person skilled in the art and are described in the literature, for example mixtures in VA displays in EP 1 378 557 A1 and mixtures for OCB displays in EP 1 306 418 A1 and DE 102 24 046 A1.

Particularly preferred LC media are mentioned below:

1) LC medium which comprises one or more compounds of the formula II

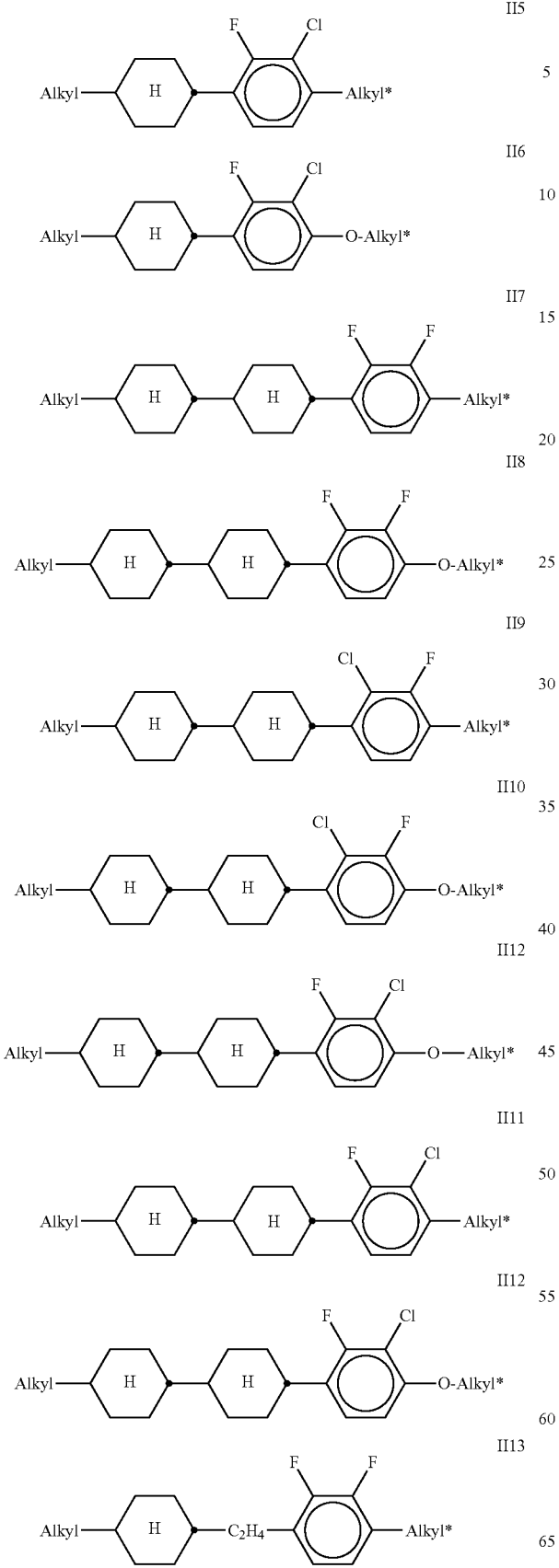
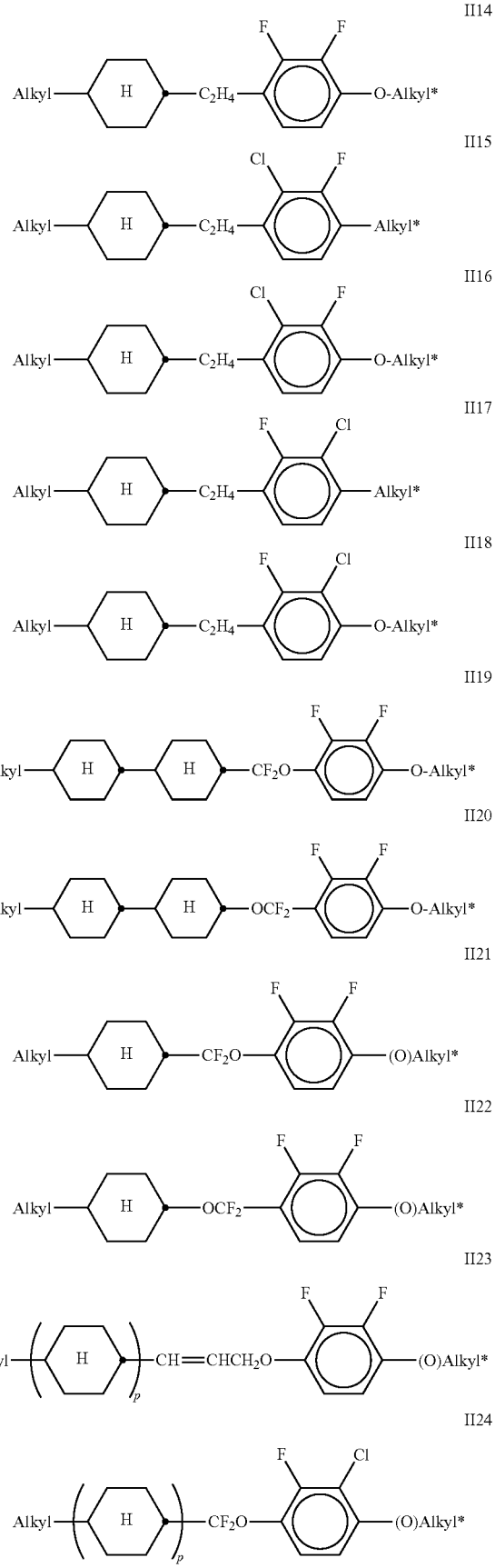

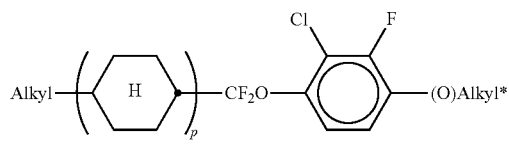 II25
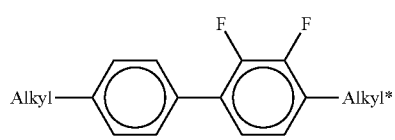 II26
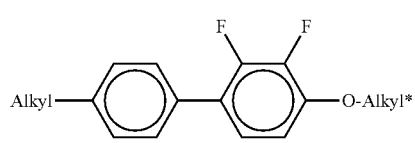 II27
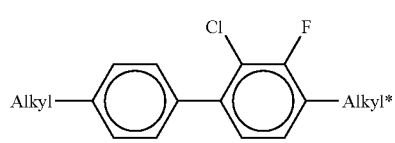 II28
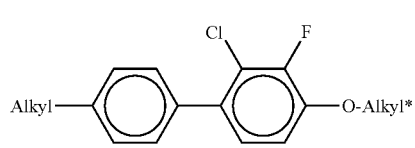 II29
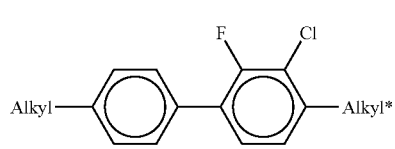 II30
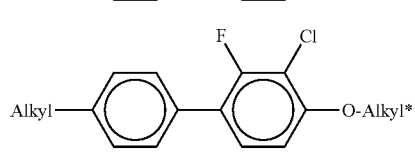 II31
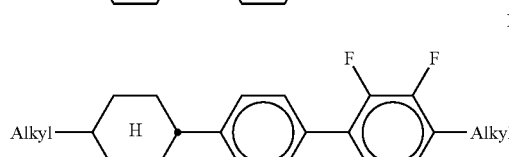 II32
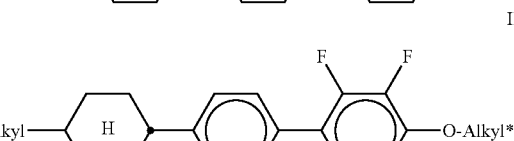 II33
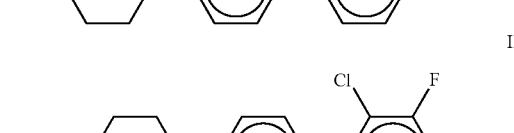 II34
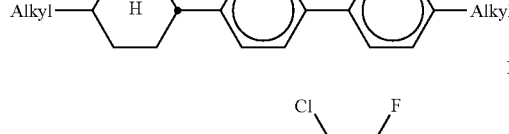 II35
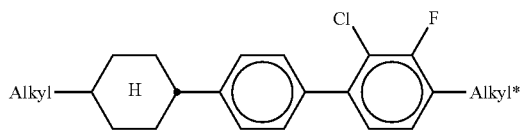 II34
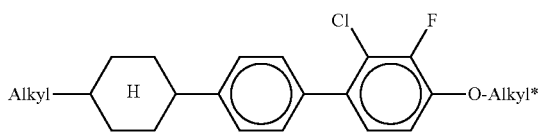 II35
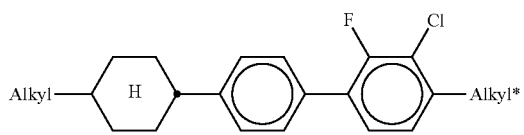 II36
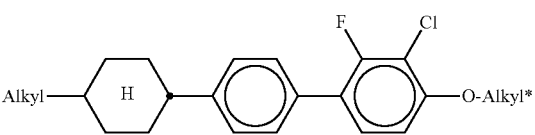 II37
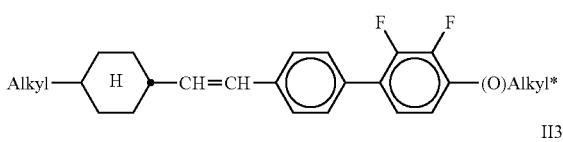 II38
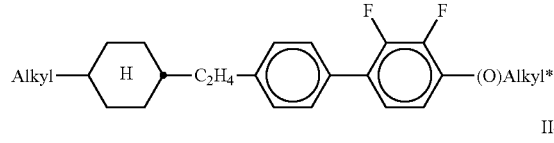 II39
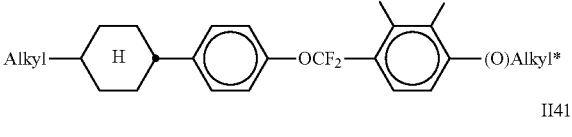 II40
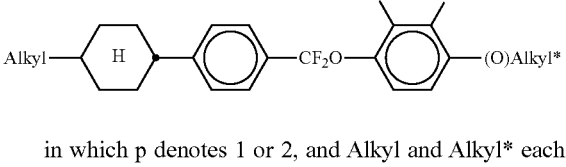 II41
in which p denotes 1 or 2, and Alkyl and Alkyl* each, independently of one another denote straight-chain alkyl having 1 to 12 C atoms.
2) Medium which additionally comprises one or more compounds of the formula III
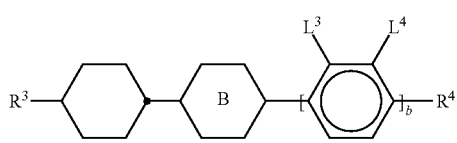 III
in which the individual radicals have the following meanings:

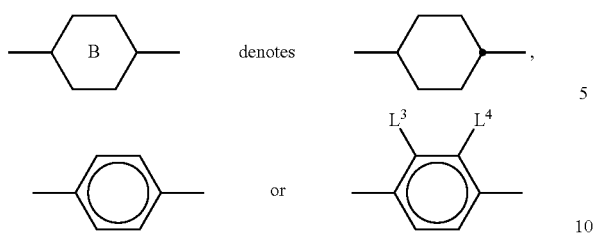

b denotes 0 or 1, $L^3$ and $L^4$ each, independently of one another, denote H, F or Cl, $R^3$ denotes alkenyl having 2 to 9 C atoms, $R^4$ denotes alkyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another or, if b=0 and the ring B denotes cyclohexylene, $R^4$ also denotes $R^3$.

$R^4$ is preferably straight-chain alkyl or alkoxy having 1 to 8 C atoms, particularly preferably methoxy, ethoxy, n-propoxy or n-butoxy. Preferably, $L^3$ and $L^4$ denote F or $L^3$ denotes Cl and $L^4$ denotes F.

The compounds of the formula III are preferably selected from the following formulae:

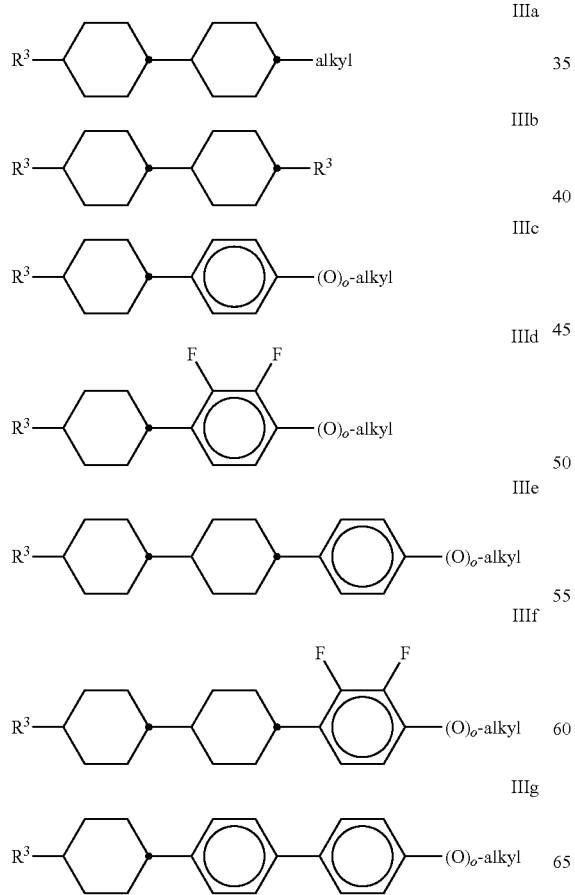

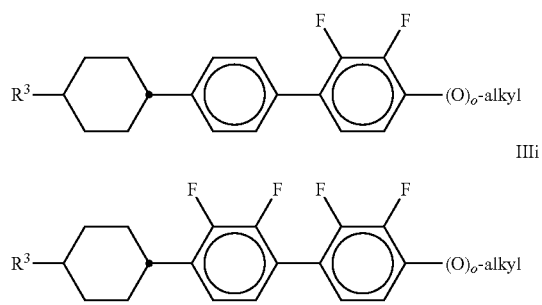

in which $R^3$ on each occurrence, identically or differently, has the meaning indicated above, o is 0 or 1, and "alkyl" denotes $C_{1-6}$-alkyl, which is preferably straight-chain. Particular preference is given to compounds of the formulae IIIa, IIIb, IIId and IIIf.

3) Medium which additionally comprises one or more compounds of the formula IV:

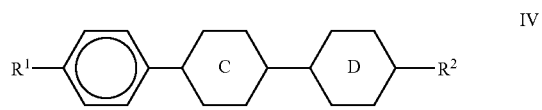

in which $R^1$ and $R^2$ each, independently of one another, have one of the meanings indicated in formula II, and

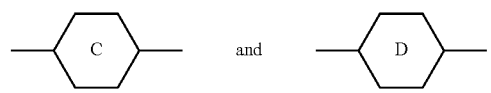

each, independently of one another, denote

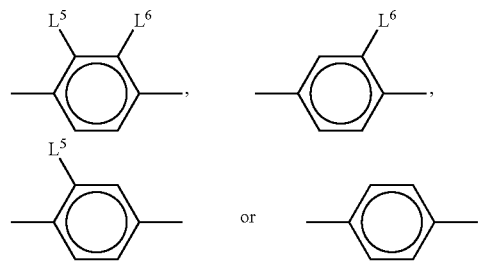

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula IV are preferably selected from the following formulae:

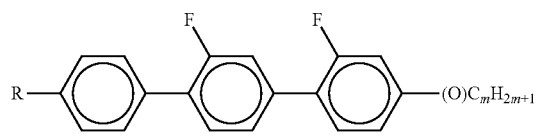

IV2
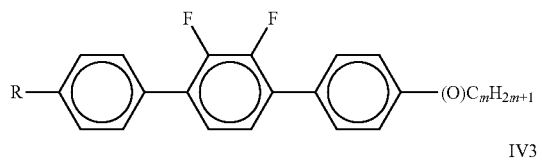
IV3
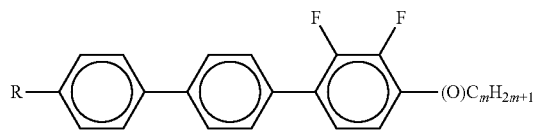
IV4
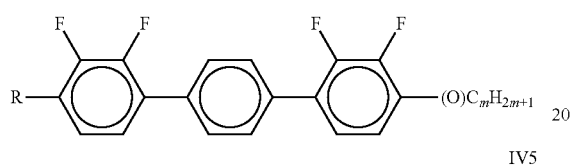
IV5
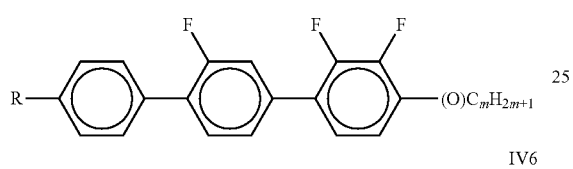
IV6
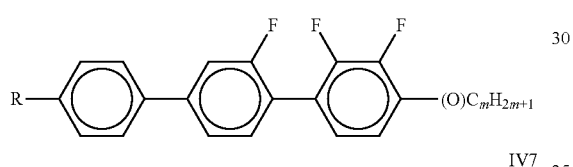
IV7
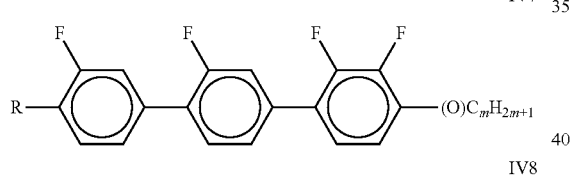
IV8
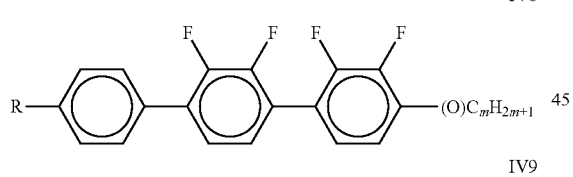
IV9
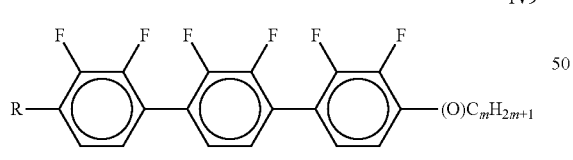
IV10
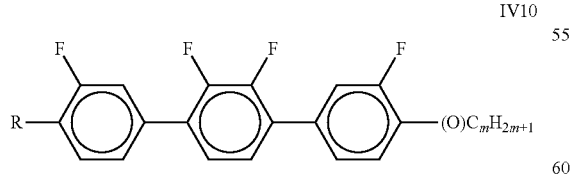
IV11
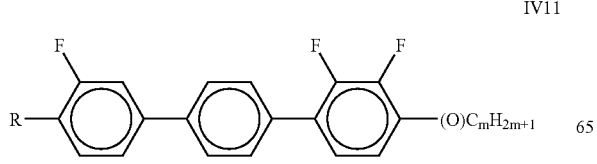
IV11
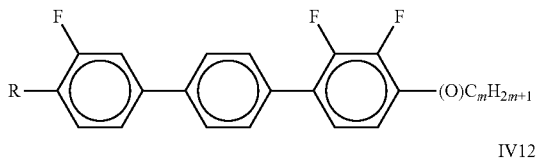
IV12
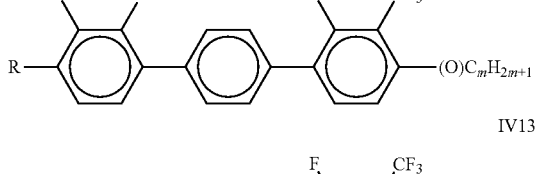
IV13
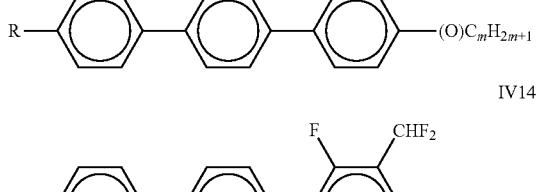
IV14
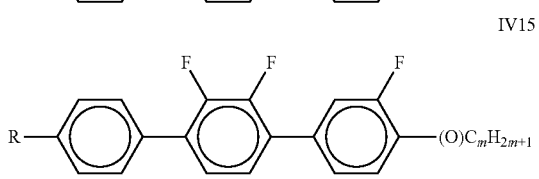
IV15
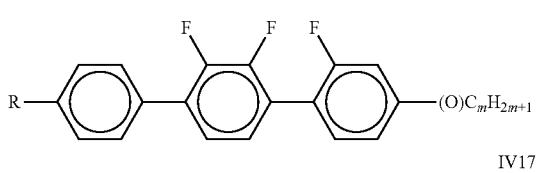
IV16
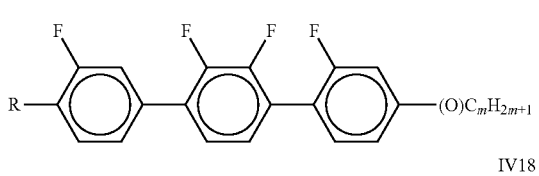
IV17
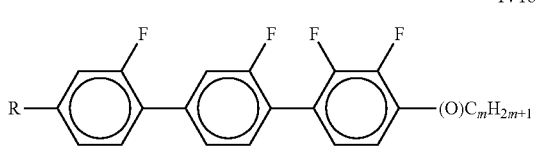
IV18
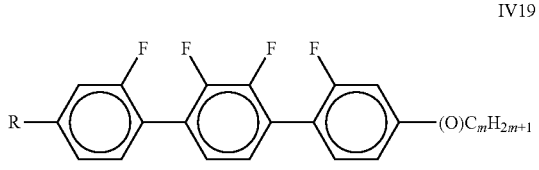
IV19
IV20

-continued

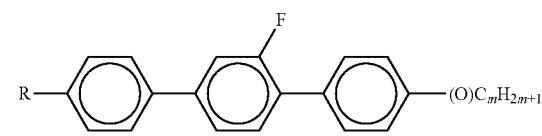
IV21

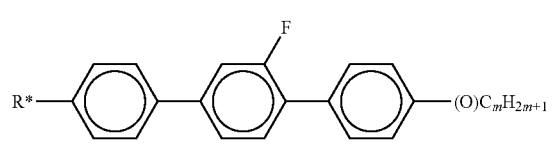
IV22

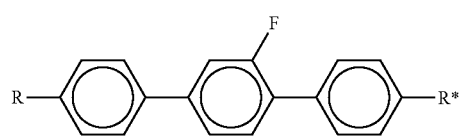
IV23 in which R is straight-chain alkyl or alkoxy having 1 to 7 C atoms, R* is straight-chain alkenyl having 2 to 7 C atoms, and m denotes an integer from 1 to 6.

4) Medium which additionally comprises one or more compounds selected from the formulae Va and Vb:

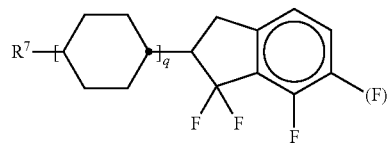
Va

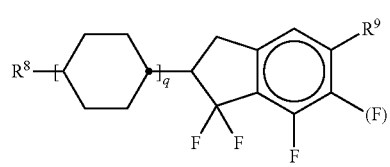
Vb in which $R^7$ and $R^8$ each, independently of one another, have one of the meanings indicated for $R^1$, $R^9$ denotes $CH_3$, $C_2H_5$ or n-$C_3H_7$, and q denotes 1 or 2.

The compounds of the formulae Va and Vb are preferably selected from the following formulae:

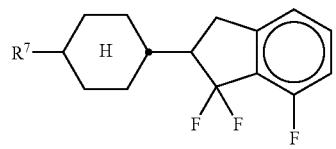
Va1

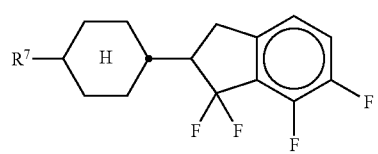
Va2

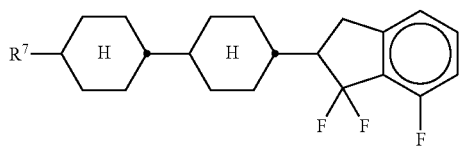
Va3

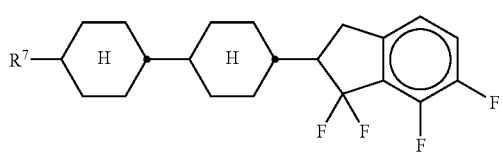
Va4

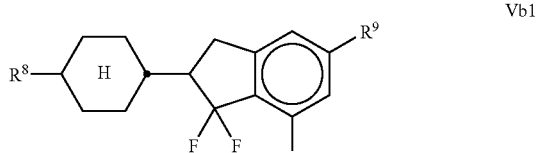
Vb1

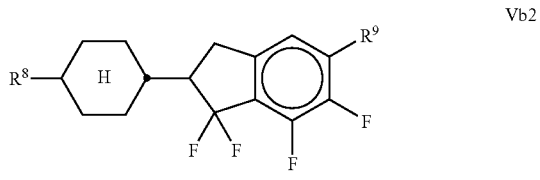
Vb2

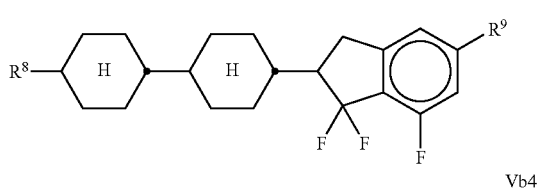
Vb3

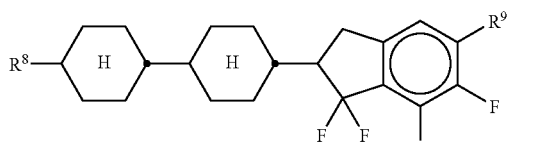
Vb4 in which $R^7$ and $R^8$ preferably denote straight-chain alkyl and $R^9$ denotes $CH_3$, $C_2H_5$ or n-$C_3H_7$.

5) Medium which additionally comprises one or more compounds which have a tetrahydronaphthyl or naphthyl unit, such as, for example, the compounds selected from the following formulae:

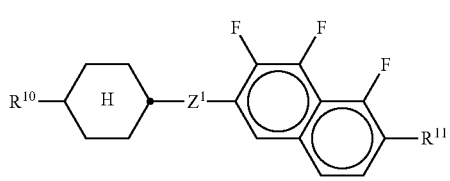
VIa

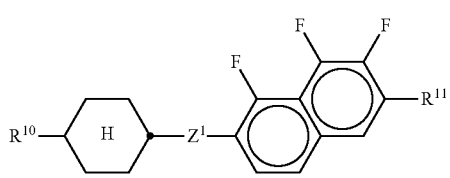
VIb

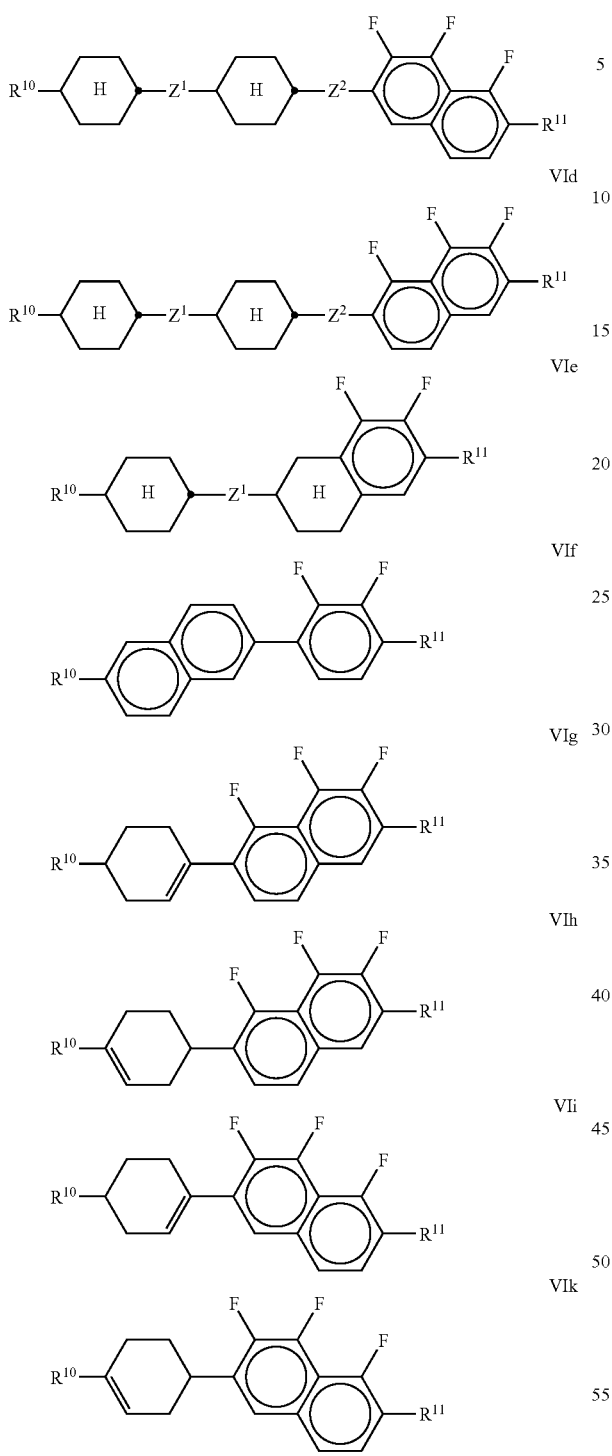

in which $R^{10}$ and $R^{11}$ each, independently of one another, have one of the meanings indicated for $R^1$, preferably denote straight-chain alkyl, straight-chain alkoxy or straight-chain alkenyl, and $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CHCH$_2$CH$_2$—, —CH$_2$CH$_2$CH=CH—, —CH$_2$O—, —OCH$_2$—, —COO—, —OCO—, —$C_2F_4$—, —CF=CF—, —CF=CH—, —CH=CF—, —CH$_2$— or a single bond.

6) Medium which additionally comprises one or more compounds of the formula VII:

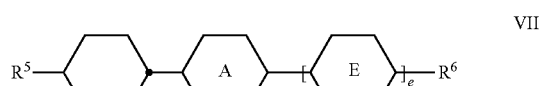

in which $R^5$ and $R^6$, independently of one another, have one of the meanings indicated for $R^1$ in formula II,

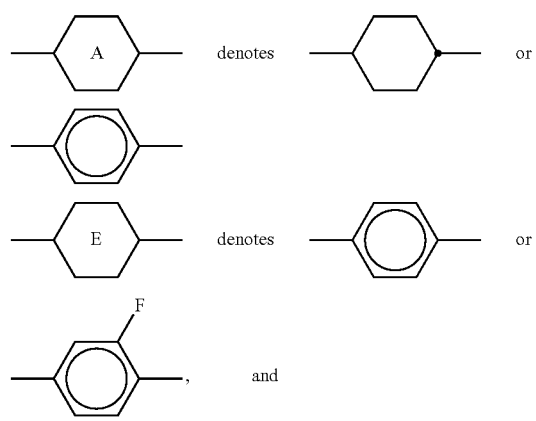

e denotes 0 or 1.

The compounds of the formula VII are preferably selected from the following formulae:

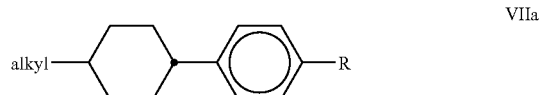

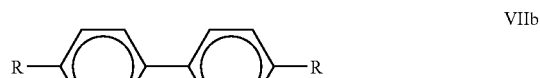

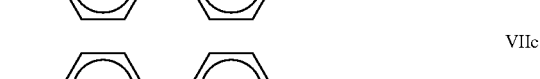

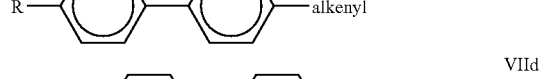

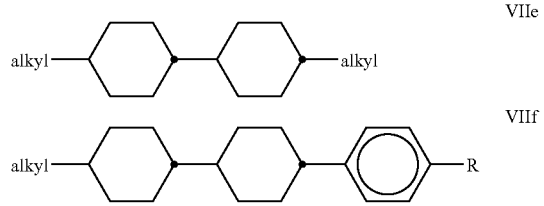

-continued

VIIg
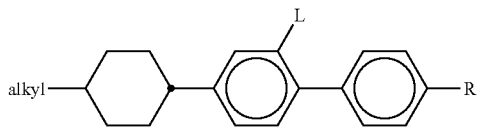

in which "alkyl" denotes $C_{1-6}$-alkyl, R denotes $C_{1-6}$-alkyl or -alkoxy, "alkenyl" denotes $C_{2-7}$-alkenyl, and L denotes H or F.

7) Medium which additionally comprises one or more compounds selected from the formulae VIIIa to VIIId:

VIIIa
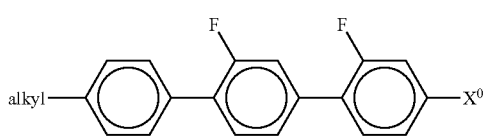

VIIIb
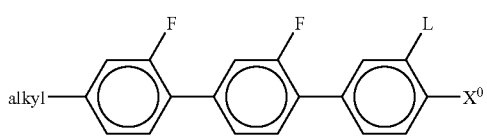

VIIIc
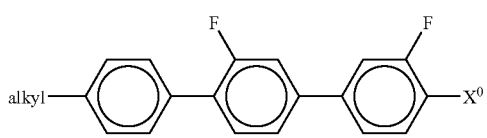

VIIId
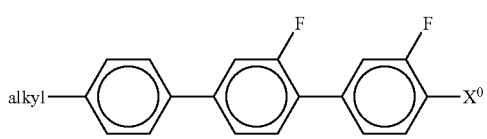

in which "alkyl" denotes $C_{1-6}$-alkyl, L denotes H or F, and $X^0$ denotes F or Cl. Particular preference is given to compounds of the formula VIIIa in which $X^0$ denotes F.

8) Medium which additionally comprises one or more compounds selected from the following formulae:

IXa
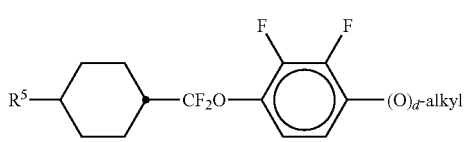

IXb
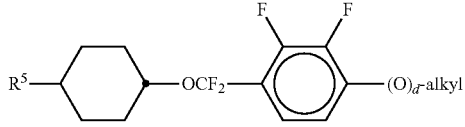

IXc
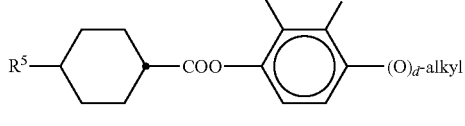

Xa
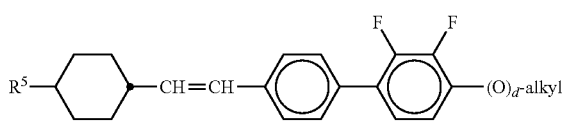

Xb
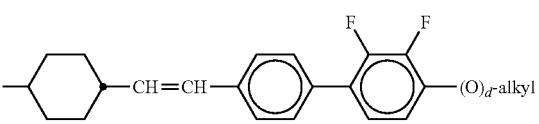

XIa
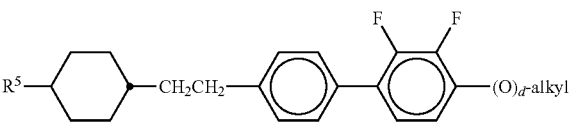

XIb
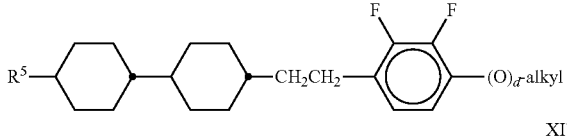

XIc
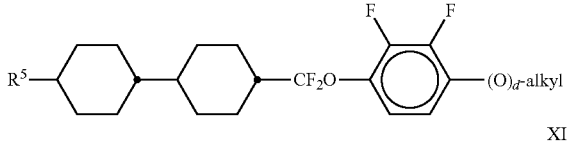

XIIa
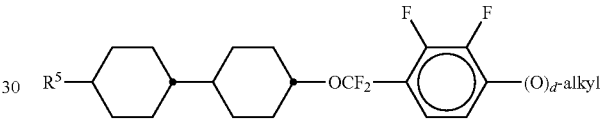

XIIb
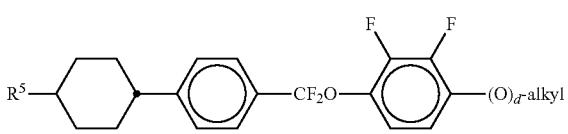

XIIIa
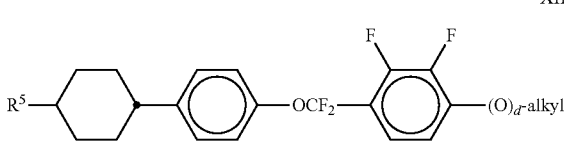

XIIIb
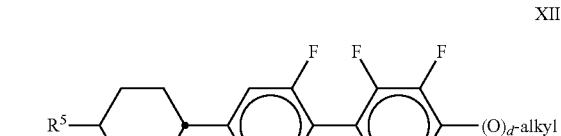

XIIIc
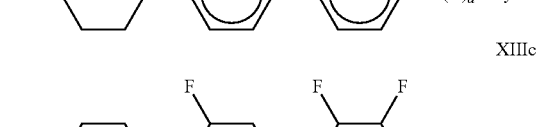

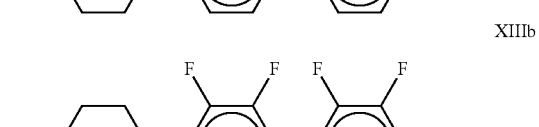

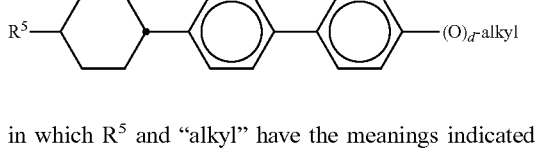

in which $R^5$ and "alkyl" have the meanings indicated above, and d denotes 0 or 1. $R^5$ in these compounds is particularly preferably $C_{1-6}$-alkyl or -alkoxy, d is preferably 1. Particular preference is given to compounds of the formulae Xb and XIb.

9) Medium which additionally comprises one or more compounds selected from the following formulae:

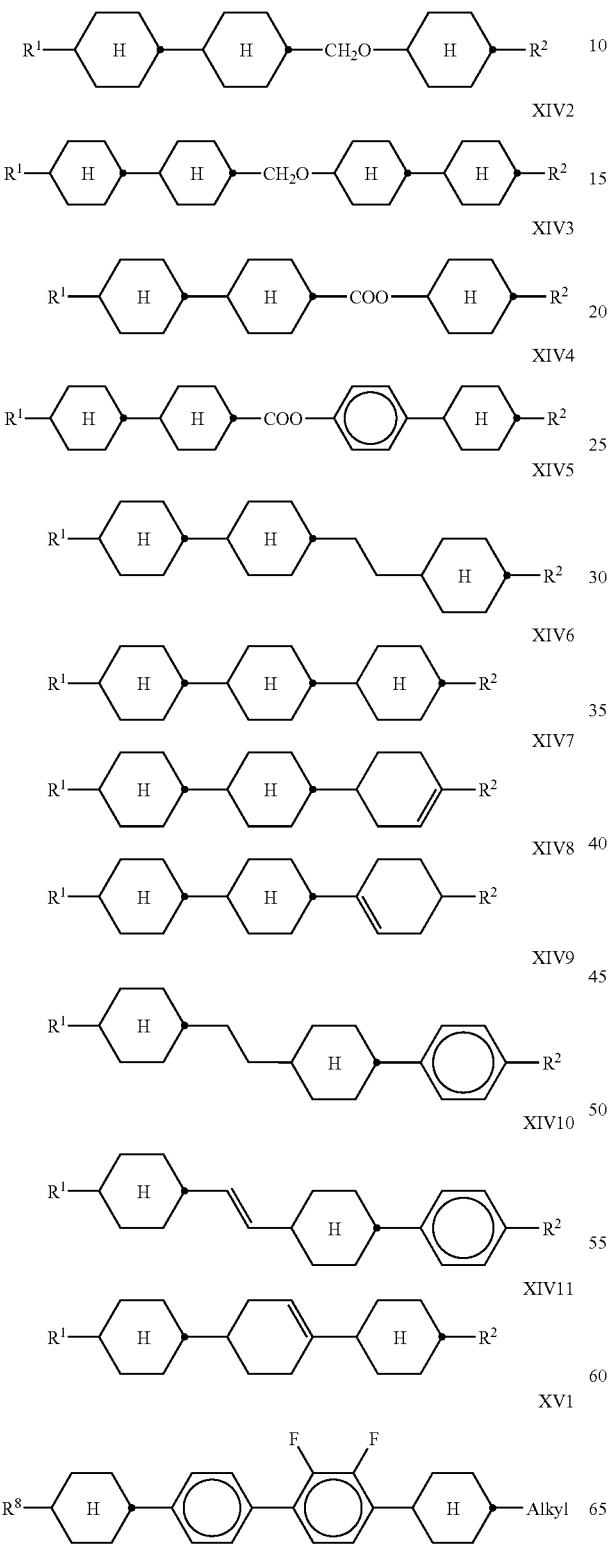

in which $R^5$ and $R^6$ have the meanings indicated above and preferably denote alkyl having 1 to 8 C atoms, $R^8$ has one of the meanings of $R^1$ given above, and Alkyl denotes straight-chain alkyl having 1 to 6 C atoms.

10) Medium which, in addition to the polymerizable compounds of the formula I or I1 or sub-formulae thereof and the comonomers, comprises no compounds which have an alkenyl side chain with a terminal vinyl or vinyloxy group (—CH=CH$_2$ or —O—CH=CH$_2$).

11) Medium which comprises 1 to 8, preferably 1 to 5, compounds of the formulae II2 and/or II27. The proportion of these compounds in the mixture as a whole is preferably 5 to 60%, particularly preferably 10 to 35%. The content of these individual compounds is preferably in each case 2 to 20%.

12) Medium which comprises 1 to 8, preferably 1 to 5, compounds of the formulae II8 and/or II33. The proportion of these compounds in the mixture as a whole is preferably 5 to 60%, particularly preferably 10 to 35%. The content of these individual compounds is preferably in each case 2 to 20%.

13) Medium which comprises 1 to 8, preferably 1 to 5, compounds of the formula III, in particular compounds of the formula IIIa, IIIb, IIId, IIIe or IIIf. The proportion of compounds of the formula III in the mixture as a whole is preferably 2 to 70%, particularly preferably 5 to 60%. The content of the individual compounds of the formula III is preferably in each case 1 to 60%.

14) Medium which comprises 1 to 10, preferably 1 to 8, compounds of the formula VIIc.

15) Medium which comprises 1 to 10, preferably 1 to 8, compounds of the formula VII, in particular compounds of the formulae VIIa and/or VIId.

16) Medium in which the proportion of compounds of the formulae II33, IV2 and IV3 in the mixture as a whole is preferably 5 to 50%, particularly preferably 10 to 35%. The content of the individual compounds of the formula II33 is preferably in each case 2 to 15%. The content of the individual compounds of the formula IV2 is preferably in each case 2 to 10%. The content of the individual compounds of the formula IV3 is preferably in each case 2 to 20%.

17) Medium in which the proportion of compounds of the formulae Va and Vb in the mixture as a whole is preferably up to 30%, particularly preferably up to 20%. The content of the individual compounds of the formulae Va and Vb is preferably in each case 2 to 12%.

18) Medium in which the proportion of compounds containing a tetrahydronaphthyl or naphthyl unit (for example of the formulae VIa-VIe) in the mixture as a whole is preferably up to 30%, particularly preferably up to 20%. The content of the individual compounds of this type is preferably in each case 2 to 20%.
19) Medium in which the proportion of compounds of the formulae VII to XV and XIX to XXIII in the mixture as a whole is 10 to 70%, preferably 10 to 60%.
20) Medium which comprises 1 to 5, preferably 1, 2 or 3, polymerizable compounds.
21) Medium in which the proportion of polymerizable compounds in the mixture as a whole is 0.05 to 5%, preferably 0.1 to 1%.
22) Medium which additionally comprises one or more compounds of the following formulae, in particular for use in OCB displays:

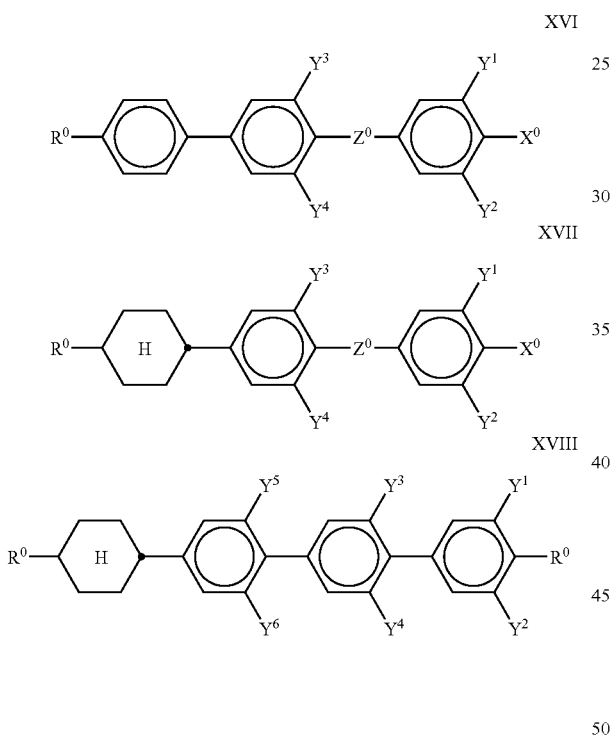

in which $R^0$ on each occurrence, identically or differently, denotes n-alkyl, alkoxy, oxaalkyl, fluoroalkyl or alkenyl, each having up to 9 C atoms, $X^0$ denotes F, Cl or in each case halogenated alkyl, alkenyl, alkenyloxy or alkoxy, each having up to 6 C atoms, $Z^0$ denotes —$CF_2O$— or a single bond, $Y^{1-6}$ each, independently of one another, denote H or F.

$X^0$ is preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or $CH=CF_2$, particularly preferably F or $OCF_3$.

The compounds of the formula XVI are preferably selected from the following formulae:

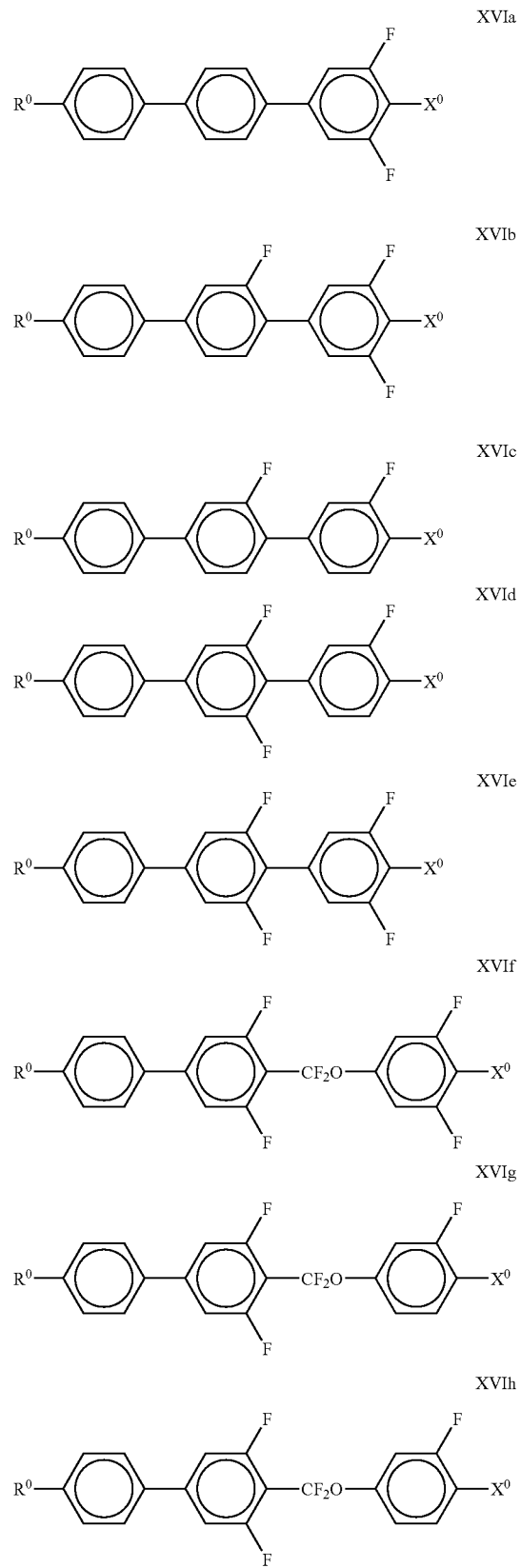

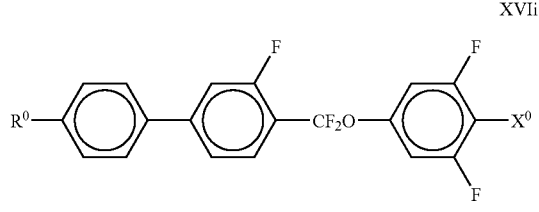

in which R⁰ and X⁰ have the meaning indicated above, and X⁰ preferably denotes F. Particular preference is given to compounds of the formulae XVIb and XVIf.

The compounds of the formula XVII are preferably selected from the following formula:

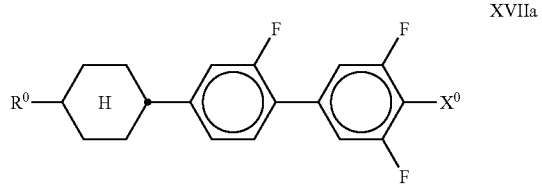

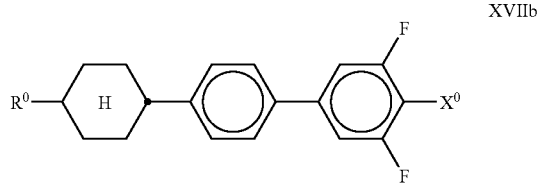

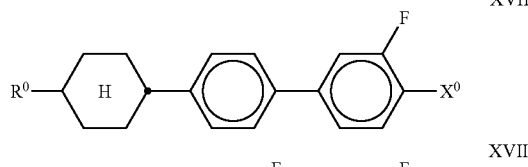

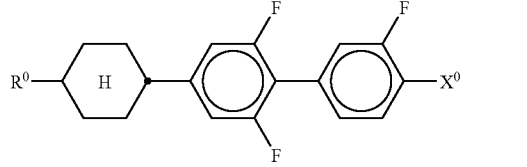

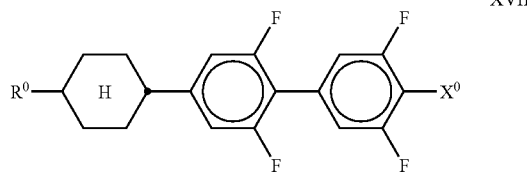

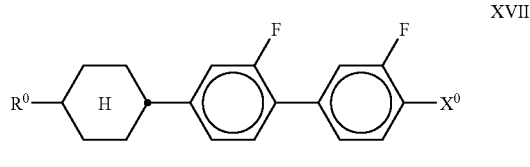

in which R⁰ and X⁰ have the meaning indicated above, and X⁰ preferably denotes F. Particular preference is given to compounds of the formulae XVIIa, XVIIb and XVIIe.

The compounds of the formula XVIII are preferably selected from the following formulae:

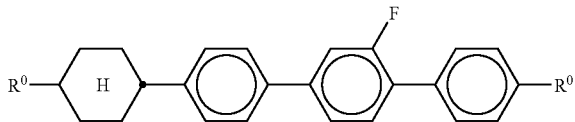

in which R⁰ on each occurrence, identically or differently, has the meaning indicated above and preferably denotes alkyl having 1 to 6 C atoms.

23) Medium which additionally comprises one or more compounds of the following formula:

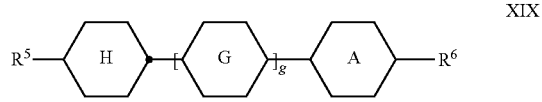

in which the individual radicals have the following meanings:

$R^5$ and $R^6$ each, independently of one another, have one of the meanings indicated above for $R^1$,

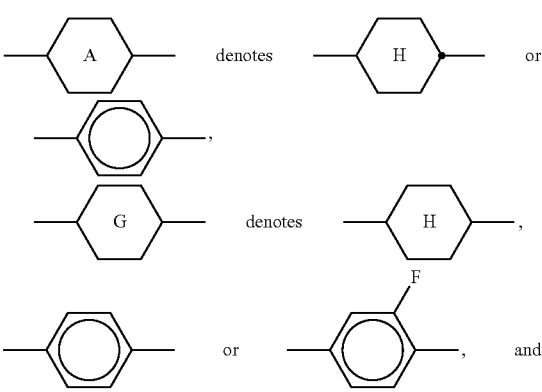

g denotes 1 or 2.

The compounds of the formula XIX are preferably selected from the following subformulae:

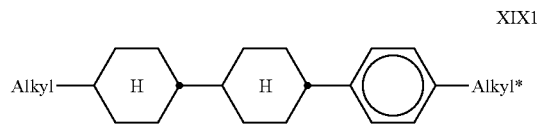

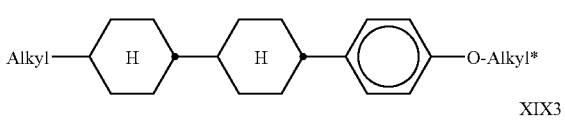

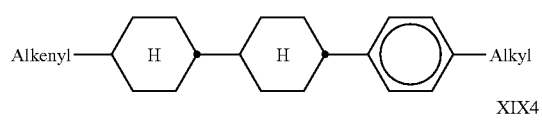

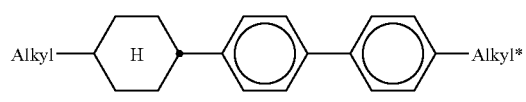

-continued

XIX5
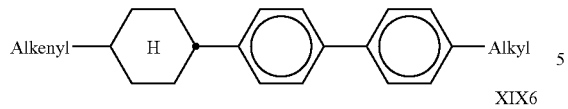

XIX6
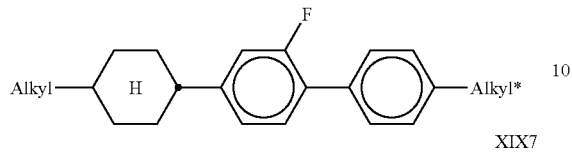

XIX7
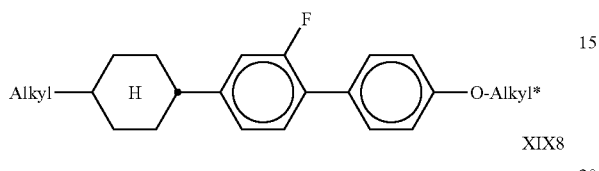

XIX8
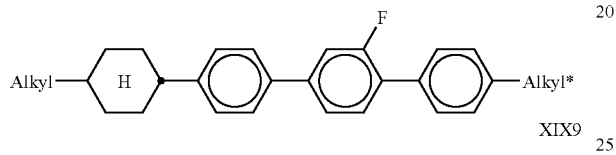

XIX9
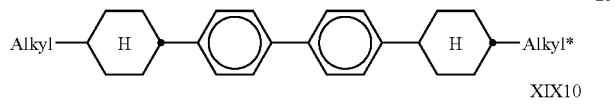

XIX10
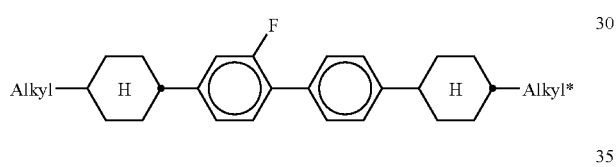

in which Alkyl and Alkyl* each, independently of one another, denote straight-chain alkyl having 1 to 6 C atoms, and Alkenyl denotes straight-chain alkenyl having 2 to 6 C atoms.

24) Medium which additionally comprises one or more compounds of the following formula:

XX
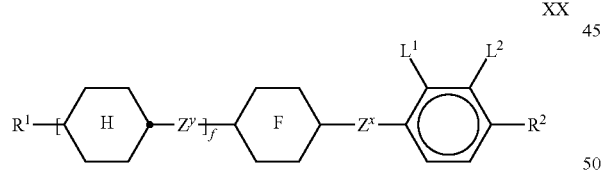

in which the individual radicals have the following meanings:

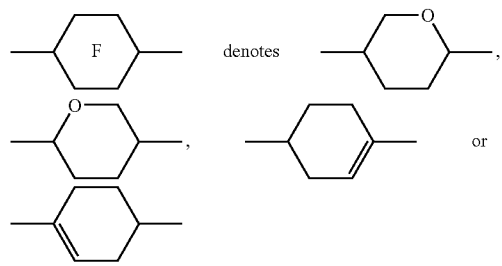

f denotes 0 or 1, $R^1$ and $R^2$ each, independently of one another, denote alkyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another, $Z^x$ and $Z^y$ each, independently of one another, denote —$CH_2CH_2$—, —CH=CH—, —$CF_2O$—, —$OCF_2$—, —$CH_2O$—, —$OCH_2$—, —COO—, —OCO—, —$C_2F_4$—, —CF=CF—, —CH=$CHCH_2O$—, or a single bond, preferably a single bond, and $L^1$ and $L^2$ each, independently of one another, denote F, Cl, $OCF_3$, $CF_3$, $CH_3$, $CH_2F$ or $CHF_2$.

Preferably, $L^1$ and $L^2$ denote F or one of $L^1$ and $L^2$ denotes Cl and the other denotes F.

The compounds of the formula XX are preferably selected from the following subformulae:

XX1
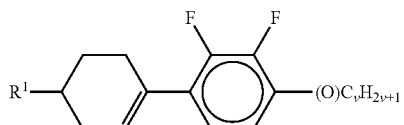

XX2
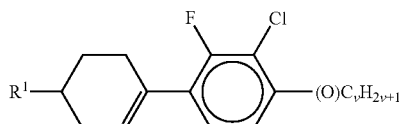

XX3
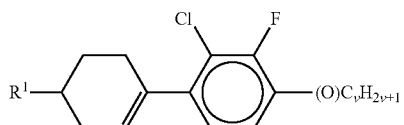

XX4
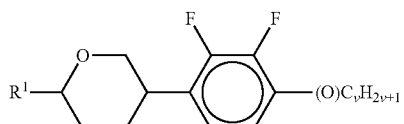

XX5
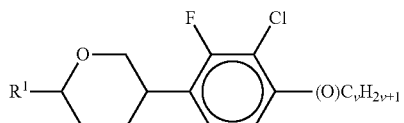

XX6
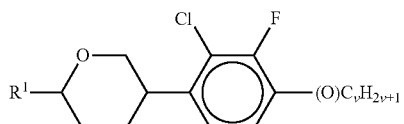

XX7
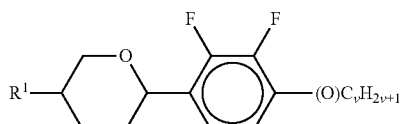

XX8
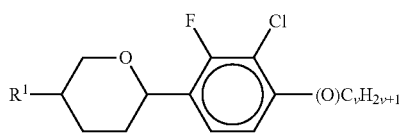

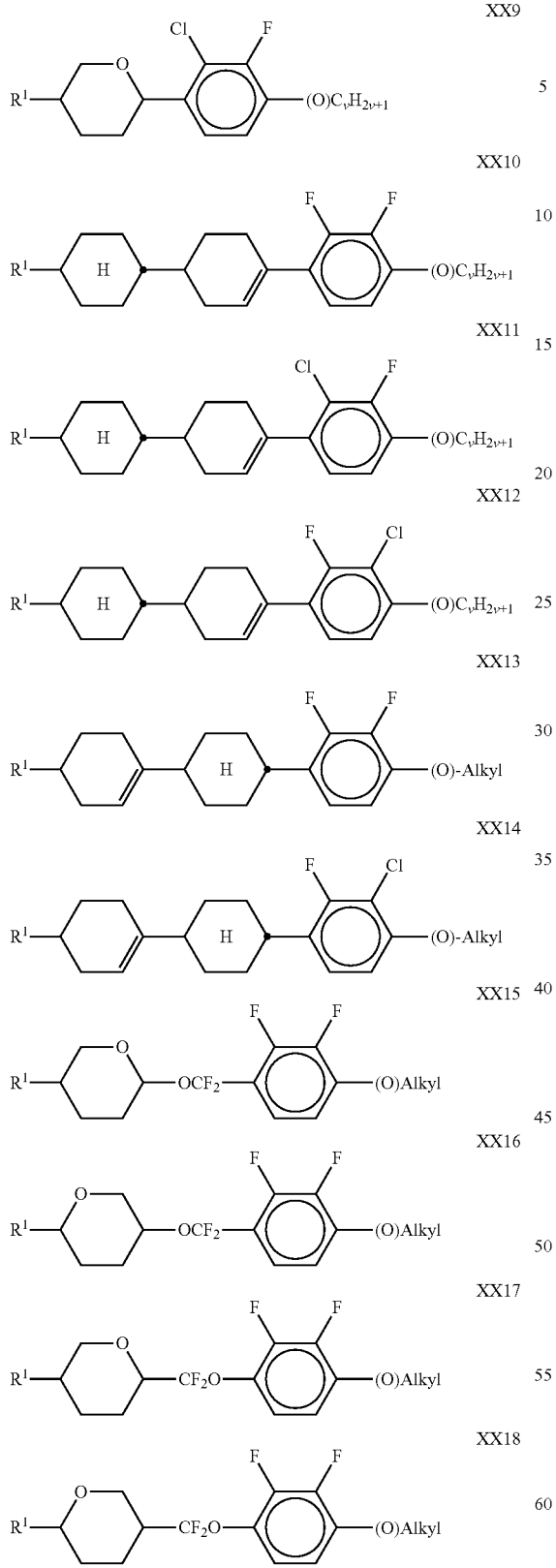

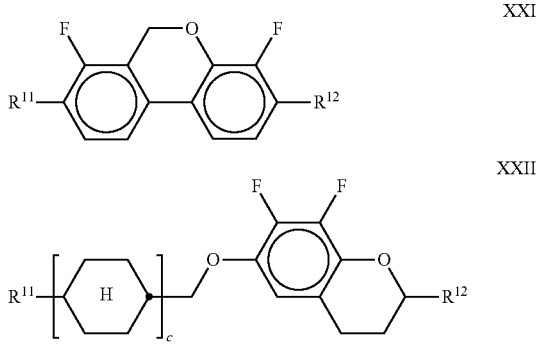

25) Medium which additionally comprises one or more difluorodibenzo-chromane and/or chromane compounds of the following formulae:

in which $R^{11}$ and $R^{12}$ each, independently of one another, have the meanings indicated above, and c denotes 0 or 1, preferably in amounts of 3 to 20% by weight, very preferably in amounts of 3 to 15% by weight.

The compounds of the formulae XXI and XXII are preferably selected from the following subformulae:

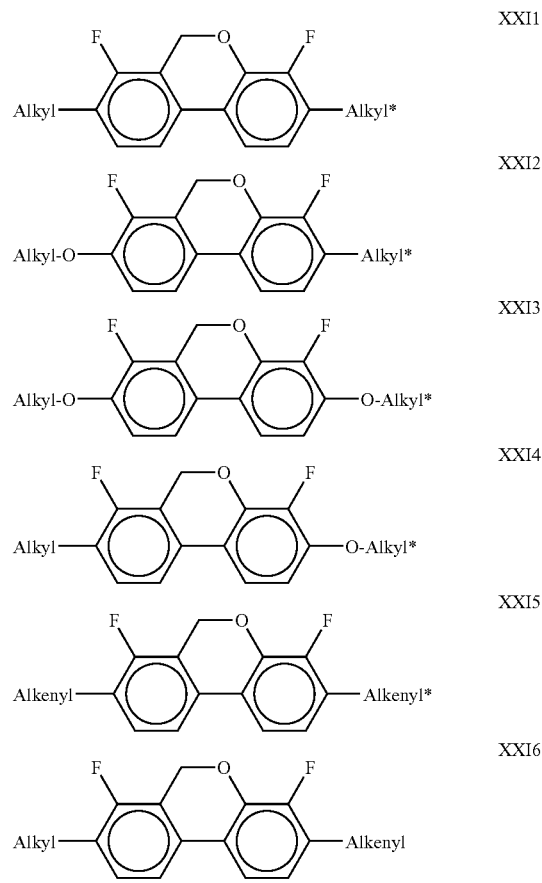

in which $R^1$ and Alkyl have the meanings indicated above, and v denotes an integer from 1 to 6. $R^1$ is preferably straight-chain alkyl or alkenyl.

-continued

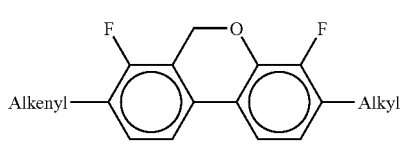
XXI7

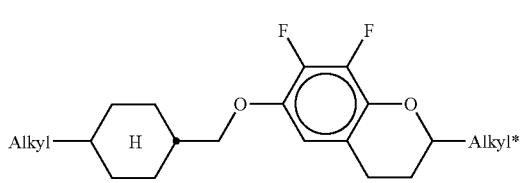
XXII1

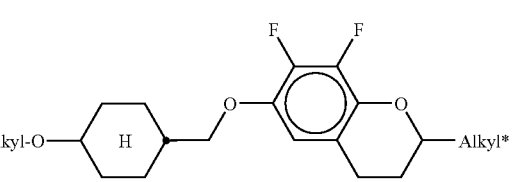
XXII2

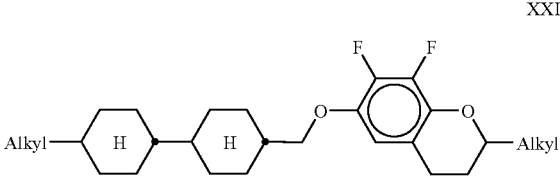
XXII3

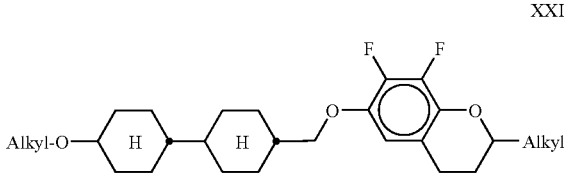
XXII4

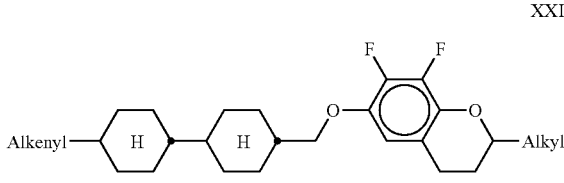
XXII5 in which Alkyl and Alkyl* each, independently of one another, denote straight-chain alkyl having 1 to 6 C atoms, and Alkenyl and Alkenyl* each, independently of one another, denote straight-chain alkenyl having 2 to 6 C atoms.

26) Medium which additionally comprises one or more fluorinated phenanthrenes or dibenzofuranes of the following formulae:

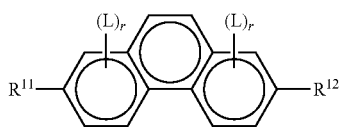
XXIII

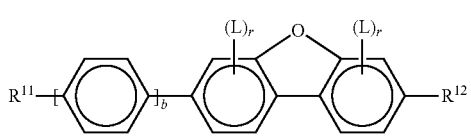
XXIV in which $R^{11}$ and $R^{12}$ each, independently of one another, have the meanings indicated for $R^{11}$ above, b denotes 0 or 1, L denotes F and r denotes 1, 2 or 3.

The compounds of the formulae XXIII and XXIV are preferably selected from the following subformulae:

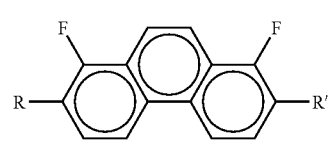
XXIII1

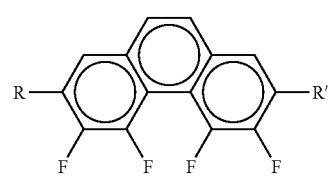
XXIII2

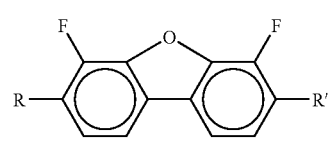
XXIV1

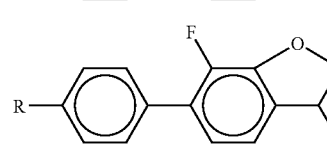
XXIV2 in which R and R' each, independently of one another, denote straight-chain alkyl or alkoxy having 1 to 7 C atoms.

The combination of compounds of the formulae II-XXIV with the polymerized biaryl compounds described above affects low threshold voltages, low rotational viscosities and very good low-temperature stabilities with maintenance of high clearing points and high HR values in the LC media according to the invention and allows the setting of a pretilt angle in PSA displays. In particular, the LC media exhibit significantly shortened response times, in particular also the grey-shade response times, in PSA displays compared with the media from the prior art.

The liquid-crystal mixture preferably has a nematic phase range of at least 80 K, particularly preferably at least 100 K, and a rotational viscosity of not greater than 250 mPa·s, preferably not greater than 200 mPa·s, at 20° C.

LC media according to the invention for use in displays of the VA type have a negative dielectric anisotropy $\Delta\epsilon$, preferably of about −0.5 to −7.5, in particular of about −2.8 to −5.5, at 20° C. and 1 kHz.

LC media according to the invention for use in displays of the OCB type have a positive dielectric anisotropy $\Delta\epsilon$, preferably of about +7 to +17 at 20° C. and 1 kHz.

The birefringence Δn in LC media according to the invention for use in displays of the VA type is preferably less than 0.16, particularly preferably between 0.06 and 0.14, in particular between 0.07 and 0.12.

The birefringence Δn in LC media according to the invention for use in displays of the OCB type is preferably between 0.14 and 0.22, in particular between 0.16 and 0.22.

The dielectrics may also comprise further additives known to the person skilled in the art and described in the literature. For example, 0 to 15% by weight of pleochroic dyes may be added, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)) for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the formulae II to XXIV of the LC mixtures according to the invention are either known or the ways in which they are prepared can readily be derived from the prior art by the person skilled in the relevant art since they are based on standard methods described in the literature. Corresponding compounds of the formula II are described, for example, in EP-A-0 364 538. Corresponding compounds of the formula III are described, for example, in EP-A-0 122 389. Corresponding compounds of the formula VII are described, for example, in DE-A-26 36 684 and DE-A-33 21 373.

The LC media which can be used in accordance with the invention are prepared in a manner conventional per se, for example by mixing one or more compounds of the formulae II-XXIV with one or more polymerizable compounds as defined above and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes.

The construction of the LC displays according to the invention corresponds to the conventional geometry for PSA displays, as described in the prior art cited at the outset. Geometries without protrusions are preferred, in particular those in which, in addition, the electrode on the color filter side is unstructured and only the electrode on the TFT side has slits. Particularly suitable and preferred electrode structures for PSA-VA displays are described, for example, in US 2006/0066793 A1.

The present invention will now be further described by way of the following non-limiting examples. In applying the disclosure of these examples, it should be kept clearly in mind that other and different embodiments of the methods disclosed according to the present invention will no doubt suggest themselves to those of skill in the relevant art.

In the foregoing and in the following examples, all temperatures are set forth uncorrected in degrees Celsius; and, unless otherwise indicated, all parts and percentages are by weight.

The entire disclosures of all applications, patents and publications, cited above and below, including German Patent Application 102006048274.3, filed Oct. 12, 2006, are hereby incorporated by reference.

EXAMPLES

The following examples are intended to explain the invention without limiting it. Above and below, percentage data denote percent by weight, unless indicated otherwise; all temperatures are indicated in degrees Celsius.

The following abbreviations and acronyms are used:

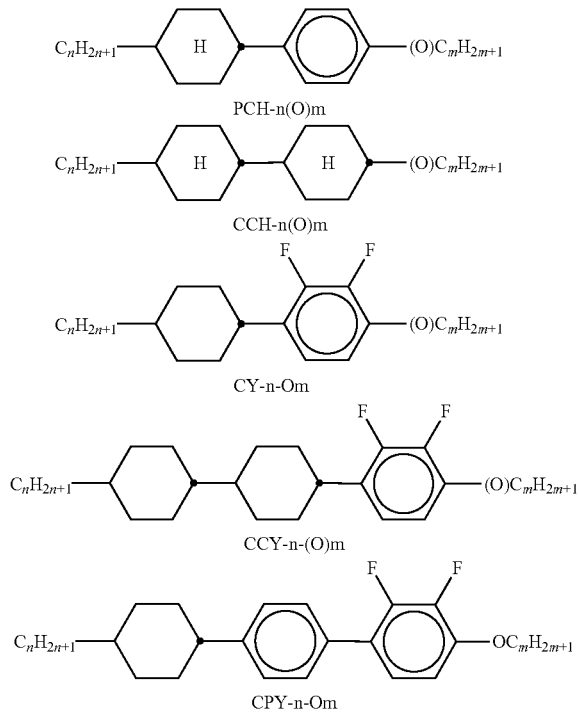

furthermore:
Tg denotes the glass transition temperature
N denotes the nematic phase
I denotes the isotropic phase
cl.p. denotes the clearing point [° C.]
$\Delta n$ denotes the optical anisotropy (birefringence) at 20° C. and 589 nm
$\Delta \epsilon$ denotes the dielectric anisotropy at 20° C. and 1 kHz
$\epsilon_\parallel$ denotes dielectric constant parallel to the director at 20° C. and 1 kHz
$K_3/K_1$ denotes the ratio of the elastic constants $K_3$ and $K_1$
$\gamma_1$ denotes the rotational viscosity [mPa·s] (at 20° C., unless indicated otherwise)
$V_0$ denotes the capacitive threshold voltage [V]
$\tau$ denotes the response time in msec Unless explicitly stated otherwise, all concentrations in the present application are given as percent by weight, and refer to the corresponding mixture or mixture component, unless explicitly stated otherwise.

Unless explicitly stated otherwise, all temperature values in the present application, like for example the melting point T(C,N), the transition from the smectic (S) to the nematic (N) phase T(S,N), and the clearing point T(N,I), are given in degrees Celsius (° C.).

All physical properties are or have been determined according to "Merck Liquid Crystals, Physical Properties of Liquid Crystals", Status November 1997, Merck KGaA, Germany, and are valid for a temperature of 20° C., and $\Delta n$ is determined at 589 nm and $\Delta \epsilon$ at 1 kHz, unless explicitly stated otherwise.

The display used for measurement of the capacitive threshold voltage has two plane-parallel outer plates at a separation of 4 µm and electrode layers with alignment layers of rubbed polyimide on top on the insides of the outer plates, which produce a homeotropic edge alignment of the liquid-crystal molecules.

The polymerizable compounds are polymerized in the display by UV irradiation, for example with a strength of 28 mW/cm², for the prespecified time, with a voltage (usually 10 V to 30 V alternating current) being applied to the display at the same time.

The tilt angle is determined by a rotating crystal experiment (Autronic-Melchers TBA-105). A small value (i.e. a large deviation from the 90° angle) here corresponds to a large tilt.

Example 1

2'-(2-methylacryloyloxy)[1,1']binaphthalinyl-2-yl 2-methylacrylate (compound 1)

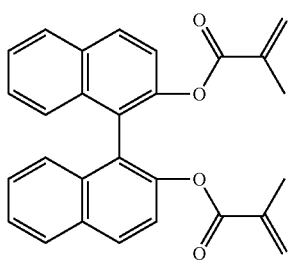

(1)

The compound is described as the racemate by S. Zheng and D. Y. Sogah, Polymer Preprints 2001, 42(1), 452-453, and is obtained analogously in optically active form from (+)-R-1,1'-bi-2-naphthol.

Phase behavior: Tg 12° C. I

Compound (15) is prepared analogously:

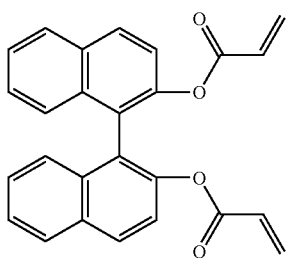

(15)

Phase behavior: Tg 16 C 128 I

Example 2

2'-(2-Methylacryloyloxy)-6,6'-diphenyl[1,1']binaphthalinyl-2-yl(±)-2-methylacrylate (compound 2) is prepared as follows:

Step 1: (±)-6,6'-Diphenyl-[1,1']binaphthalinyl-2,2'-diol

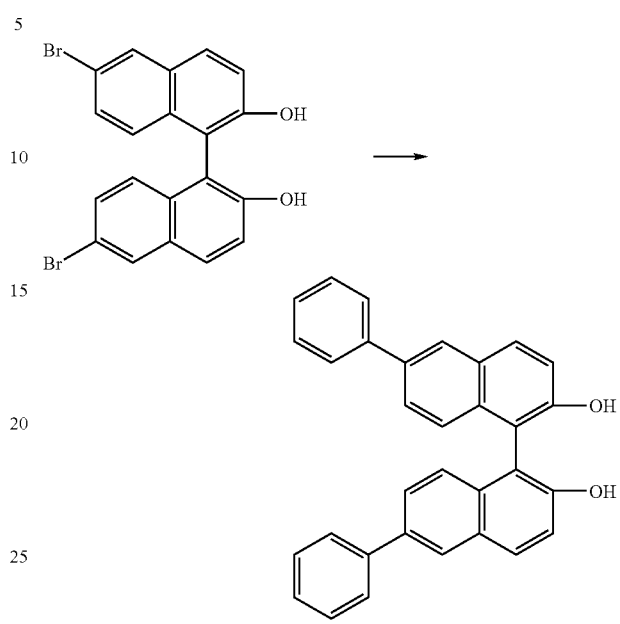

12.0 g (25.7 mmol) of (±)-6,6'-dibromo[1,1']binaphthalinyl-2,2'-diol, 11.5 g (41 mmol) of sodium metaborate octahydrate and 800 mg of bistriphenylphosphinepalladium(II) chloride are initially introduced in 100 ml of water and 20 ml of THF, 0.13 ml of hydrazine hydrate is added, and a solution of 7.0 g (57 mmol) of benzeneboronic acid in 80 ml of THF is added dropwise. The batch is subsequently heated under reflux overnight, added to water and extracted three times with MTB ether. The combined org. phases are washed with water and dried over sodium sulfate. The solvent is removed in vacuo, and the residue is filtered through silica gel with toluene/ethyl acetate (19:1) and evaporated, and the product is recrystallized once each from toluene/cyclohexane (1:1) and isopropanol, giving (±)-6,6'-diphenyl[1,1']binaphthalinyl-2,2'-diol as colorless crystals.

MS(EI): m/e (%)=438 [M⁺] (100).

Step 2: 2'-(2-Methylacryloyloxy)-6,6'-diphenyl[1,1'] binaphthalinyl-2-yl(±)-2-methylacrylate

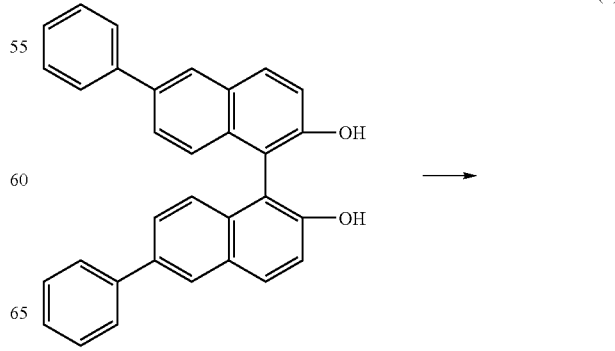

(2)

-continued

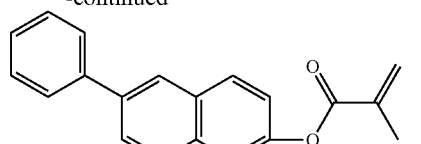

6.6 g (14.5 mmol) of (±)-6,6'-diphenyl[1,1']binaphthalinyl-2,2'-diol and 11 ml (80 mmol) of triethylamine are dissolved in 350 ml of dichloromethane, and 3.7 ml (37.8 mmol) of methacryloyl chloride are added with ice-cooling. The batch is stirred overnight at room temp. and evaporated, and the residue is chromatographed on silica gel with toluene/ethyl acetate (19:1). Crystallization of the crude product from diethyl ether gives colorless crystals of m.p. 180° C. (racemate).

The pure, optically active enantiomers of (2) can be obtained analogously to the synthesis described above from commercially available (R)-(CAS No. 65283-60-5) or (S)-6,6'-dibromo[1,1']binaphthalinyl-2,2'-diol (CAS No. 80655-81-8).

Example 3

Compound (3) is prepared as follows:

(3)

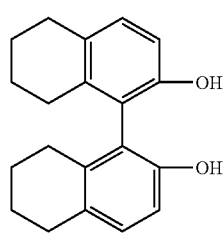  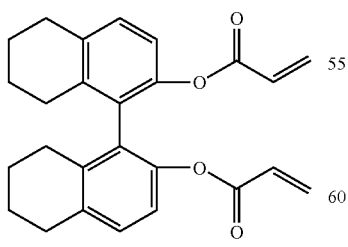

Starting from 5,6,7,8,5',6',7',8'-octahydro[1,1']binaphthalenyl-2,2'-diol, which is accessible by the method of D. J. Cram et al., J. Org. Chem. 1981, 46, 393-406, by catalytic hydrogenation of [1,1']-binaphthalenyl-2,2'-diol, reaction with acryloyl chloride analogously to Examples 1 and 2 gives 2'-acryloyloxy-5,6,7,8,5',6',7',8'-octahydro[1,1']binaphthalenyl-2-yl acrylate as colorless solid.

The following compounds are prepared analogously (Me=methyl, Ph=phenyl):

(4)

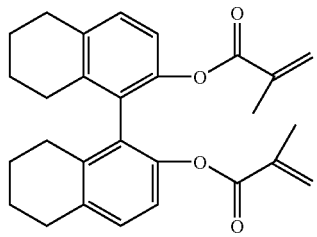

(5)

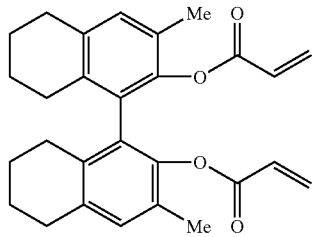

(6)

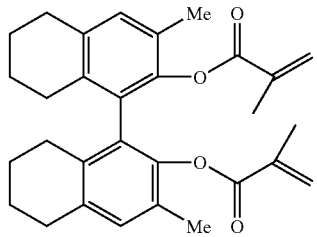

(7)

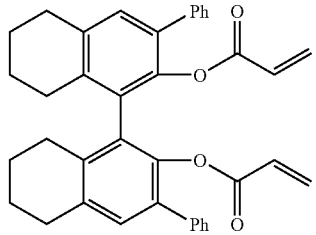

(8)

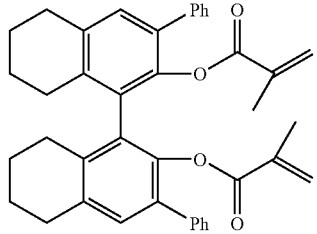

(9)

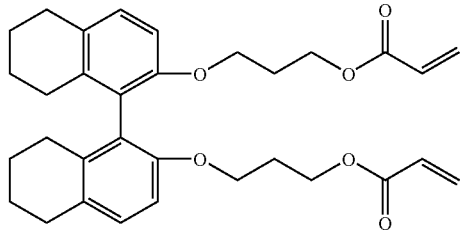

(10)
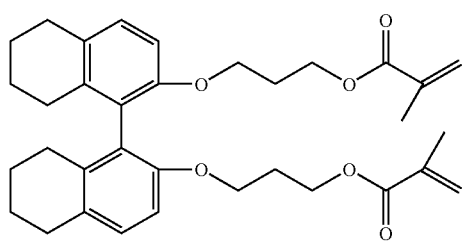

(11)
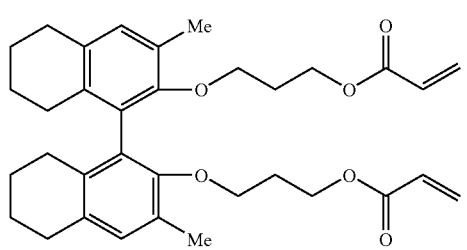

(12)
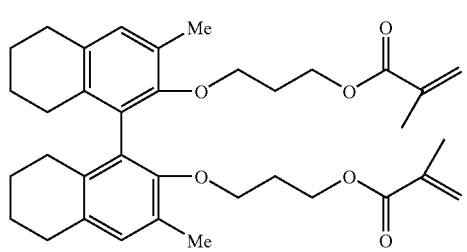

(13)
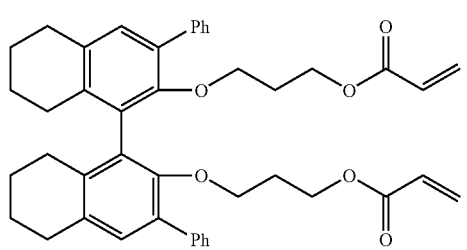

(14)
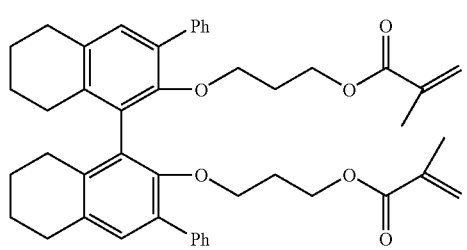

Example 4

Compound (16)

(16)
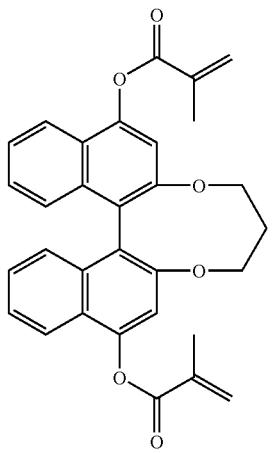

The starting material 4,4'-dibromo[1,1']binaphthalinyl-2,2'-diol is prepared by the method of M. Noji, M. Nakajima, K. Koga, *Tetrahedron Lett.* 1994, 35, 7983-7984, from 4-bromo-2-naphthol, prepared by the method of M. S. Newman, V. Sankaran, D. R. Olson, *J. Am. Chem. Soc.* 1976, 98, 3237-3241. The enantiomers are separated by HPLC (column: Chiralpak AD-H 20 μm, eluent: ethanol).

Step 1: 9,17-Dibromo-13,14-dihydro-12H-naphtho[2,1,10,13-fgh][1,5]-dioxonine

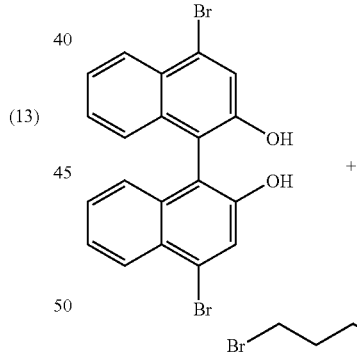

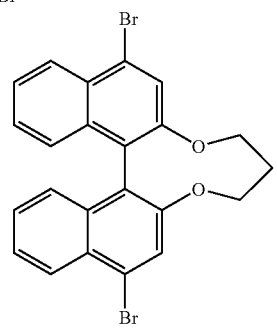

5.66 g (12.7 mmol) of 4,4'-dibromo[1,1']binaphthalinyl-2,2'-diol and 9.5 g (29.2 mmol) of caesium carbonate are initially introduced in 75 ml of DMF, and 1.4 ml (13.4 mmol) of 1,3-dibromopropane are added at 80° C. The batch is left to stir overnight, added to water and extracted with toluene. The combined org. phases are evaporated, and the residue is filtered through silica gel with toluene, giving 9,17-dibromo-13,14-dihydro-12H-naphtho[2,1,10,13-fgh][1,5]dioxonine as colorless crystals.

$^1$H-NMR (400 MHz, CDCl$_3$):

δ=1.99 (m$_c$, 2H, —OCH$_2$CH$_2$CH$_2$O—), 4.35 (m$_c$, 4H, —OCH$_2$CH$_2$CH$_2$O—), 7.26 (m$_c$, 4H, Ar—H), 7.48 (ddd, J=1.4 Hz, J=6.64 Hz, J=8.56 Hz, 2H, Ar—H), 7.78 (s, 2H, Ar—H), 8.27 (d, J=8.6 Hz, 2H, Ar—H).

Step 2: 13,14-Dihydro-12H-naphtho[2,1,10,13-fgh][1,5]dioxonine-9,17-diyl-9,17-diboronic acid

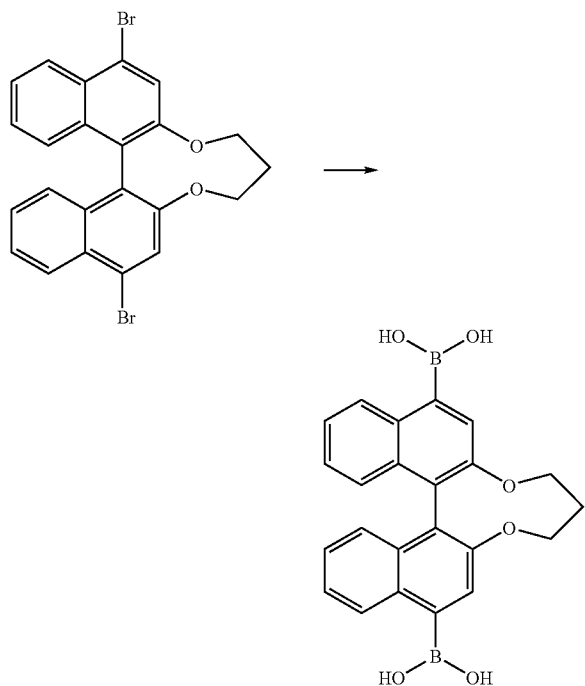

4.00 g (8.26 mmol) of 9,17-dibromo-13,14-dihydro-12H-naphtho-[2,1,10,13-fgh][1,5]-dioxonine are dissolved in 100 ml of dioxane, 5.0 g (50.9 mmol) of potassium acetate, 6.5 g (25.1 mmol) of bis(pinacolato)-diboron and 400 mg (0.545 mmol) of 1,1'-bis(diphenylphosphino)ferrocene-palladium (II) chloride are added, and the mixture is heated under reflux for 4 h. The batch is subsequently added to water, extracted with MTB ether and dried over sodium sulfate. The solvent is removed in vacuo, the residue is filtered through silica gel with heptane/ethyl acetate (2:1), evaporated and taken up in 200 ml of acetone, 9 g (45 mmol) of sodium periodate and 3.2 g (45 mmol) of ammonium acetate are added, and the mixture is left to stir overnight at room temp. and at 45° C. until conversion is complete (TLC). The solvent is subsequently removed in vacuo, water is added to the residue, and the mixture is extracted with MTB ether. The combined org. phases are dried over sodium sulfate. Removal of the solvent gives 13,14-dihydro-12H-naphtho[2,1,10,13-fgh][1,5]dioxonine-9,17-diyl-9,17-diboronic acid, which is employed in the next step without purification.

Step 3: 9,17-Dihydroxy-13,14-dihydro-12H-naphtho[2,1,10,13-fgh][1,5]-dioxonine

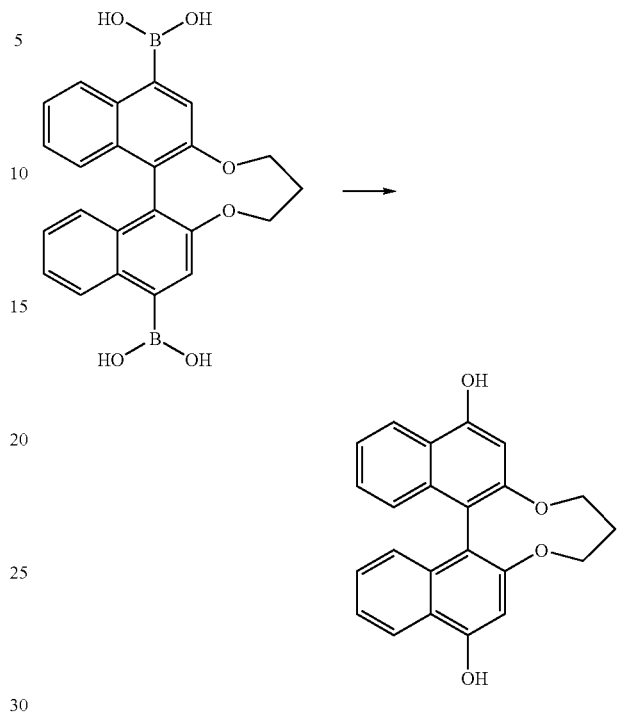

2.6 g (6.4 mmol) of 13,14-dihydro-12H-naphtho[2,1,10,13-fgh][1,5]-dioxonine-9,17-diyl-9,17-diboronic acid are initially introduced in 50 ml of THF, 2 ml of water and 2.2 ml of glacial acetic acid are added, and 3.5 ml (36 mmol) of 35 p.c. hydrogen peroxide are subsequently added slowly with ice-cooling. The batch is left to stir at room temp. for 3 h, diluted with water and extracted with MTB ether. The combined org. phases are washed with ammonium iron(II) sulfate solution and water, dried over sodium sulfate and evaporated. Chromatography of the crude product on silica gel with heptane/MTB ether (1:4) gives 9,17-dihydroxy-13,14-dihydro-12H-naphtho[2,1,10,13-fgh][1,5]dioxonine as colorless solid.

$^1$H-NMR (400 MHz, CDCl$_3$): δ=1.95 (m$_c$, 2H, —OCH$_2$CH$_2$CH$_2$O—), 4.31 (m$_c$, 4H, —OCH$_2$CH$_2$CH$_2$O—), 5.40 (s, 2H, OH), 6.84 (s, 2H, Ar—H), 7.26 (m$_c$, 4H, Ar—H), 7.36 (ddd, J=4.0 Hz, J=4.0 Hz, J=8.1 Hz, 2H, Ar—H), 8.16 (d, J=8.4 Hz, 2H, Ar—H).

Step 4: 13,14-Dihydro-12H-naphtho[2,1,10,13-fgh][1,5]dioxonine-9,17-diyl dimethacrylate

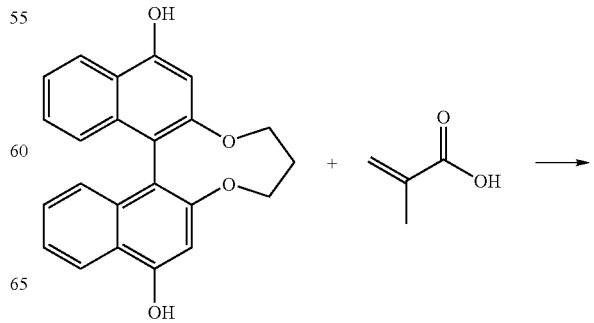

-continued

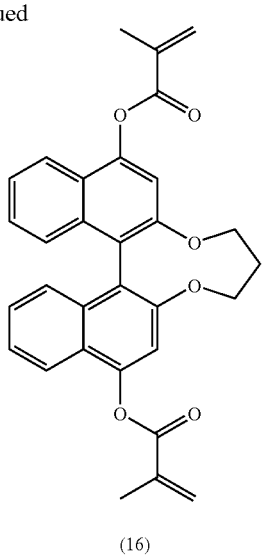

(16)

1.20 g (3.35 mmol) of 9,17-dihydroxy-13,14-dihydro-12H-naphtho-[2,1,10,13-fgh][1,5]dioxonine are dissolved in 30 ml of toluene, and dicyclohexylcarbodiimide in 20 ml of toluene and 150 mg of N,N-dimethylaminopyridine are added. 0.85 ml (10 mmol) of acrylic acid is subsequently added, and the batch is left to stir overnight. After addition of 0.5 g of oxalic acid dihydrate, the mixture is left to stir for a further 2 h, the precipitated solid is filtered off, the filtrate is evaporated, the residue is chromatographed on silica gel with heptane/ethyl acetate (6:1), and the crude product is recrystallized from ether/ethyl acetate, giving 13,14-dihydro-12H-naphtho[2,1,10,13-fgh][1,5]dioxonine-9,17-diyl dimethacrylate as colorless solid.

Phase behavior: Tg 157 C 240 I
Specific rotation (c=0.5, $CH_2Cl_2$): $[a]_{20}^D = -210.5$ Mixture Example A The nematic LC host mixture N1 is formulated as follows:

| CCH-501 | 9.00% | Cl.p. | +70.0 |
|---|---|---|---|
| CCH-35 | 14.00% | Δn | 0.0825 |
| PCH-53 | 8.00% | Δε | −3.5 |
| CY-3-O4 | 14.00% | $\epsilon_\parallel$ | 3.5 |
| CY-5-O4 | 13.00% | $K_3/K_1$ | 1.00 |
| CCY-3-O2 | 8.00% | $\gamma_1$ | 141 |
| CCY-5-O2 | 8.00% | $V_0$ | 2.06 |
| CCY-2-1 | 9.00% | | |
| CCY-3-1 | 9.00% | | |
| CPY-2-O2 | 8.00% | | |

0.3% of a polymerizable monomeric compound from Examples 1 to 4 is added to the LC mixture N1, and the resultant mixtures are introduced into VA e/o test cells (rubbed at 90°, VA-polyimide alignment layer, layer thickness d≈4 μm). Each cell is irradiated for 20 minutes with UV light with an intensity of 28 mW/cm² with application of a voltage of 10 V (alternating current), causing polymerization of the monomeric compound. In a second series of experiments, 0.006% of the photoinitiator Irgacure 651 is additionally added to the LC/monomer mixture, and the exposure time is shortened to 2 minutes. Before and after the UV irradiation, the tilt angle is determined by a rotating crystal experiment (Autronic-Melchers TBA-105). The results are shown in Table 1.

TABLE 1

| Monomer | Initiator | Tilt before UV | Tilt after UV |
|---|---|---|---|
| R-(1) | no | 89.9° | 87.6° |
| R-(1) | yes | 89.9° | 88.6° |
| rac-(1) | no | 89.9° | 87.8° |
| rac-(1) | yes | 89.9° | 89.4° |
| R*-(2) | no | 89.8° | 89.0° |
| R*-(2) | yes | 89.7° | 89.5° |
| rac-(2) | no | 89.8° | 86.9° |
| rac-(2) | yes | 89.6° | 89.7° |
| rac-(15) | no | 89.8° | 87.8° |
| rac-(15) | yes | 89.7° | 87.4° |
| R*-(16) | no | 89.7° | 87.1° |
| R*-(16) | yes | 89.8° | 87.4° |

As can be seen from Table 1, a significant increase in the tilt (i.e. reduction in the tilt angle) after polymerization can be achieved with the monomers according to the invention, in particular without use of a photoinitiator.

The preceding examples can be repeated with similar success by substituting the generically or specifically described reactants and/or operating conditions of this invention for those used in the preceding examples.

While the invention has been illustrated with respect to the production and of particular compounds, it is apparent that variations and modifications of the invention can be made without departing from the spirit or scope of the invention.

The invention claimed is:

1. A polymer sustained alignment (PSA) liquid-crystal (LC) display comprising:
an LC cell having two substrates, wherein at least one substrate is transparent to light and at least one substrate has an electrode layer, and a layer of a low-molecular-weight LC medium positioned between said substrates, said LC medium comprising one or more polymerised compounds, wherein said polymerised compound(s) is (are) obtained by polymerisation of one or more polymerisable compounds between the substrates of the LC cell in the LC medium with application of an electrical voltage,
wherein at least one of the polymerisable compounds has a biaryl structural element of Formula I

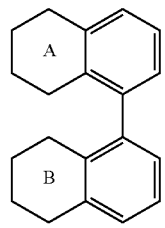

which is linked at at least one position to one or more polymerisable groups, optionally via an organic group or a spacer group,
wherein A and B are each, independently of one another, an aromatic or fully or partially saturated ring, in which, in the individual rings, one or more CH groups are each optionally replaced by N, and one or more $CH_2$ groups are each optionally replaced by O or S in such a way that O and/or S atoms are not linked directly to one another, and where the individual rings may also be mono- or polysubstituted, and wherein said at least one polymerisable compound which contains a structural element of Formula I is employed as a racemate.

2. A liquid crystal display according to claim 1, wherein said at least one polymerisable compound which contains a structural element of Formula I is linked at one or more positions to one or more polymerisable groups via a spacer group.

3. A liquid crystal display according to claim 1, wherein said at least one polymerisable compound contains a structural element of Formula I which is linked directly at one, two or more than two positions to a polymerisable group.

4. A liquid crystal display according to claim 1, wherein the structural element of Formula I is selected from the following formulae:

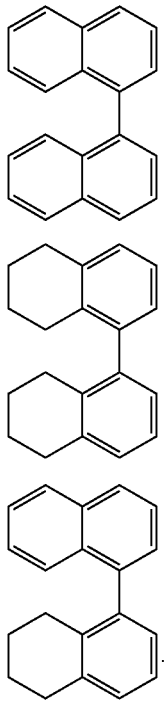

5. A liquid crystal display according to claim 1, wherein said at least one polymerisable compound is (are) selected from the following formula:

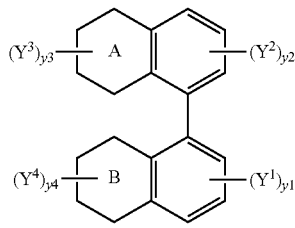

in which
A and B are each, independently of one another, fused benzene, cyclohexane or cyclohexene,
$Y^{1-4}$ are each, independently of one another, H, halogen, $SF_5$, $NO_2$, a carbon group or a hydrocarbon group, in which, in addition, one or more of the radicals $Y^{1-4}$ is (are) able to form an aliphatic or aromatic, mono- or polycyclic and optionally condensed ring system with an adjacent radical $Y^{1-4}$ and/or with the biaryl skeleton, and wherein at least one of the radicals $Y^{1-4}$ contains a polymerisable group P,
y1, y2 are each independently 1, 2 or 3, and
y3, y4 are each independently 1, 2, 3 or 4,
where, in addition, in each of the rings in formula I1, one or more CH groups are each optionally replaced by N, and one or more $CH_2$ groups are each optionally replaced by O or S in such a way that O and/or S atoms are not linked directly to one another.

6. A liquid crystal display according to claim 1, wherein said at least one polymerisable compound is (are) selected from the following formulae:

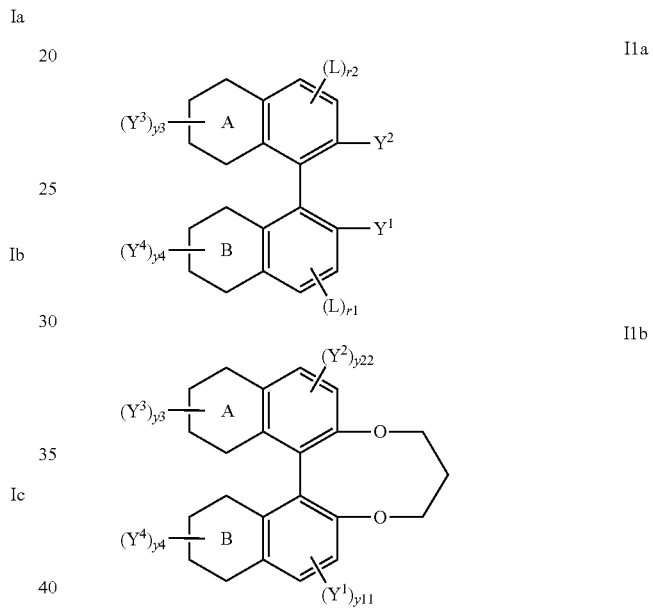

Wherein
A and B are each, independently of one another, fused benzene, cyclohexane or cyclohexene,
$Y^{1-4}$ are each, independently of one another, H, halogen, $SF_5$, $NO_2$, a carbon group or a hydrocarbon group, in which, in addition, one or more of the radicals $Y^{1-4}$ is (are) able to form an aliphatic or aromatic, mono- or polycyclic and optionally condensed ring system with an adjacent radical $Y^{1-4}$ and/or with the biaryl skeleton, and wherein at least one of the radicals $Y^{1-4}$ contains a polymerisable group P,
y3, y4 are each independently 1, 2, 3 or 4,
r1 and r2 are each, independently of one another, 0, 1 or 2,
y11 and y22 are each, independently of one another, 0 or 1,
L is F, Cl, Br, I, —CN, —$NO_2$, —NCO, —NCS, —OCN, —SCN, —C(=O)N($R^x$)$_2$, —C(=O)$Y^7$, —C(=O)$R^x$, —N($R^x$)$_2$, optionally substituted silyl, aryl having 6 to 40, straight-chain or branched alkyl having 1 to 25 C atoms, alkoxy having 1 to 25 C atoms, alkylcarbonyl having up to 25 C atoms, alkoxycarbonyl having up to 25 C atoms having up to 25 C atoms, alkylcarbonyloxy having up to 25 C atoms, or alkoxycarbonyloxy having up to 25 C atoms, in which one or more H atoms are each optionally replaced by F or Cl, $R^x$ is H, halogen, a straight-chain, branched or cyclic alkyl chain having 1 to 25 C atoms, in which, in addition, one or more non-adjacent C atoms are each optionally replaced by —O—, —S—, —CO—, —CO—O—, —O—CO—, —O—CO—O— and in which one or more H atoms are each optionally replaced by fluorine, or an optionally substituted aryl having 6 to 40 C atoms, aryloxy having 6 to 40 C atoms, heteroaryl having 2 to 40 C atoms, or heteroaryloxy group having 2 to 40 C atoms, and $Y^7$ is halogen.

7. A liquid crystal display according to claim 1, wherein said at least one polymerisable compound is (are) from the following formulae:

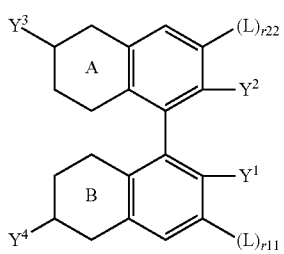

I1a1

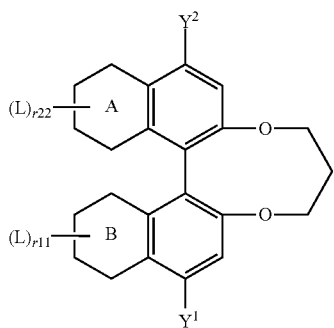

I1b1

Wherein
A and B are each, independently of one another, fused benzene, cyclohexane or cyclohexene, $Y^{1-4}$ are each, independently of one another, H, halogen, $SF_5$, $NO_2$, a carbon group or a hydrocarbon group, in which, in addition, one or more of the radicals $Y^{1-4}$ is (are) able to form an aliphatic or aromatic, mono- or polycyclic and optionally condensed ring system with an adjacent radical $Y^{1-4}$ and/or with the biaryl skeleton, and wherein at least one of the radicals $Y^{1-4}$ contains a polymerisable group P, L is F, Cl, Br, I, —CN, —$NO_2$, —NCO, —NCS, —OCN, —SCN, —C(=O)N($R^x$)$_2$, —C(=O)$Y^7$, —C(=O)$R^x$, —N($R^x$)$_2$, optionally substituted silyl, aryl having 6 to 40, straight-chain or branched alkyl having 1 to 25 C atoms, alkoxy having 1 to 25 C atoms, alkylcarbonyl having up to 25 C atoms, alkoxycarbonyl having up to 25 C atoms having up to 25 C atoms, alkylcarbonyloxy having up to 25 C atoms, or alkoxycarbonyloxy having up to 25 C atoms, in which one or more H atoms are each optionally replaced by F or Cl, $R^x$ is H, halogen, a straight-chain, branched or cyclic alkyl chain having 1 to 25 C atoms, in which, in addition, one or more non-adjacent C atoms are each optionally replaced by —O—, —S—, —CO—, —CO—O—, —O—CO—, —O—CO—O— and in which one or more H atoms are each optionally replaced by fluorine, or an optionally substituted aryl having 6 to 40 C atoms, aryloxy having 6 to 40 C atoms, heteroaryl having 2 to 40 C atoms, or heteroaryloxy group having 2 to 40 C atoms, $Y^7$ is halogen, and r11 and r22 are each 0 or 1.

8. A liquid crystal display according to claim 5, wherein one or more of the radicals $Y^{1-4}$ in the compound of formula I1 is —W—($Z^1$-$A^1$)$_{m1}$-Sp-P, in which W is O, S, $CH_2$ or a single bond, Sp is a spacer group or a single bond, P is a polymerisable group, $A^1$ is on each occurrence, identically or differently, aryl, heteroaryl or fully or partially saturated cycloalkyl having 4 to 20 C atoms, which is optionally substituted and in which, in addition, one or more CH groups are each optionally replaced by N, and one or more $CH_2$ groups are each optionally replaced by O or S in such a way that O and/or S atoms are not linked directly to one another, $Z^1$ is on each occurrence, identically or differently, —O—, —S—, —CO—, —COO—, —OCO—, —O—COO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=CH—, —CF=CF—, —C≡C—, —CH=CH—COO—, —OCO—CH=CH—, $CR^{0'}R^{00'}$ or a single bond, $R^{0'}$ and $R^{00'}$ are each, independently of one another, H or alkyl having 1 to 4 C atoms, and m1 is 0, 1, 2, 3 or 4.

9. A liquid crystal display according to claim 5, wherein one or more of the radicals $Y^{1-4}$ in the compound of formula I1 is —W—($Z^1$-$A^1$)$_{m1}$-$R^y$, in which W is O, S, $CH_2$ or a single bond, $A^1$ is on each occurrence, identically or differently, aryl, heteroaryl or fully or partially saturated cycloalkyl having 4 to 20 C atoms, which is optionally substituted and in which, in addition, one or more CH groups are each optionally replaced by N, and one or more $CH_2$ groups are each optionally replaced by O or S in such a way that O and/or S atoms are not linked directly to one another, $Z^1$ is on each occurrence, identically or differently, —O—, —S—, —CO—, —COO—, —OCO—, —O—COO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=CH—, —CF=CF—, —C≡C—, —CH=CH—COO—, —OCO—CH=CH—, $CR^{0'}R^{00'}$ or a single bond, $R^{0'}$ and $R^{00'}$ are each, independently of one another, H or alkyl having 1 to 4 C atoms, m1 is 0, 1, 2, 3 or 4, $R^y$ on each occurrence, identically or differently, is H, L, straight-chain or branched alkyl having 1 to 25 C atoms, which is unsubstituted or mono- or polysubstituted by F, Cl, Br, I, CN or P-Sp- and in which one or more non-adjacent $CH_2$ groups are each optionally, independently of one another, replaced by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another, L is F, Cl, Br, I, —CN, —$NO_2$, —NCO, —NCS, —OCN, —SCN, —C(=O)N($R^x$)$_2$, —C(=O)$Y^7$, —C(=O)$R^x$, —N($R^x$)$_2$, optionally substituted silyl, aryl having 6 to 40, straight-chain or branched alkyl having 1 to 25 C atoms, alkoxy having 1 to 25 C atoms, alkylcarbonyl having up to 25 C atoms, alkoxycarbonyl having up to 25 C atoms having up to 25 C atoms, alkylcarbonyloxy having up to 25 C atoms, or alkoxycarbonyloxy having up to 25 C atoms, in which one or more H atoms are each optionally replaced by F or Cl, $R^x$ is H, halogen, a straight-chain, branched or cyclic alkyl chain having 1 to 25 C atoms, in which, in addition, one or more non-adjacent C atoms are each optionally replaced by —O—, —S—, —CO—, —CO—O—, —O—CO—, —O—CO—O— and in which one or more H atoms are each optionally by fluorine, or an optionally substituted aryl having 6 to 40 C atoms, aryloxy having 6 to 40 C atoms, heteroaryl having 2 to 40 C atoms, or heteroaryloxy group having 2 to 40 C atoms, and $Y^7$ is halogen, and, if all radicals $Y^{1-4}$ are —W—$(Z^1\text{-}A^1)_{m1}$-$R^y$, one or more of the radicals $R^y$ have at least one group P-Sp-.

10. A liquid crystal display according to claim 1, wherein said at least one polymerisable compound is (are) from the following formulae:

IIa1a

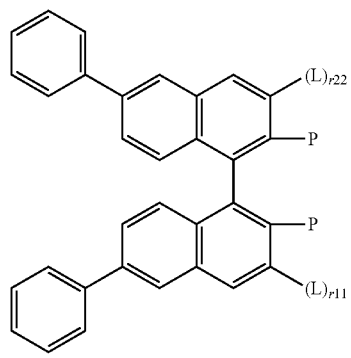

IIa1b

IIa1c

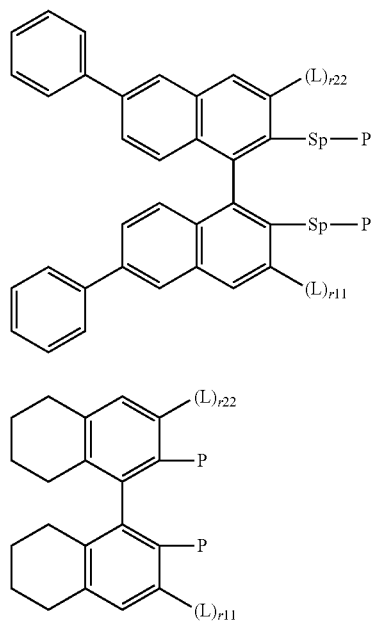

IIa1d

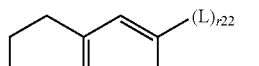

IIa1e

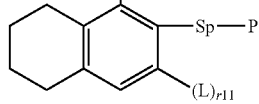

IIa1f

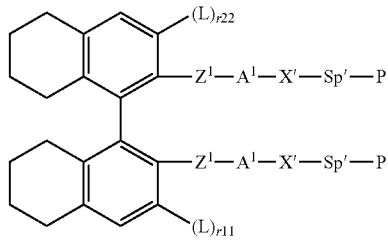

IIa1g

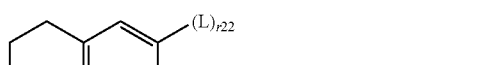

IIa1h

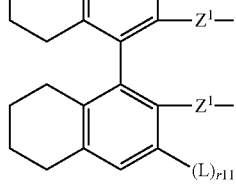

IIb1a

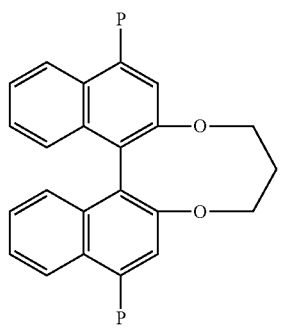

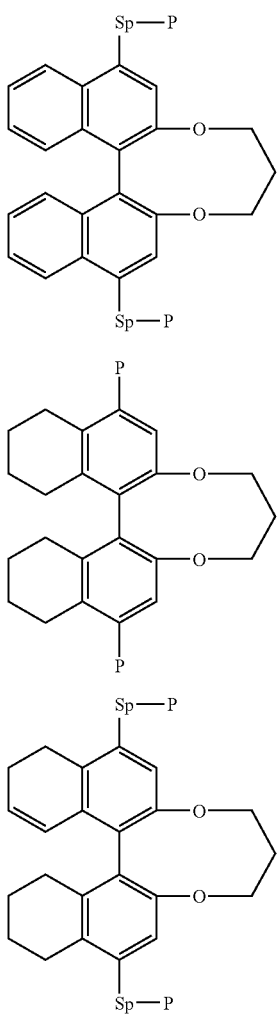

in which
- $Y^{3-4}$ are each, independently of one another, H, halogen, $SF_5$, $NO_2$, a carbon group or a hydrocarbon group, in which, in addition, one or more of the radicals $Y^{1-4}$ is (are) able to form an aliphatic or aromatic, mono- or polycyclic and optionally condensed ring system with an adjacent radical $Y^{1-4}$ and/or with the biaryl skeleton, and wherein at least one of the radicals $Y^{1-4}$ contains a polymerisable group P,
- L is F, Cl, Br, I, —CN, —$NO_2$, —NCO, —NCS, —OCN, —SCN, —C(=O)N($R^x$)$_2$, —C(=O)$Y^7$, —C(=O)$R^x$, —N($R^x$)$_2$, optionally substituted silyl, aryl having 6 to 40, straight-chain or branched alkyl having 1 to 25 C atoms, alkoxy having 1 to 25 C atoms, alkylcarbonyl having up to 25 C atoms, alkoxycarbonyl having up to 25 C atoms having up to 25 C atoms, alkylcarbonyloxy having up to 25 C atoms, or alkoxycarbonyloxy having up to 25 C atoms, in which one or more H atoms are each optionally replaced by F or Cl,
- $R^x$ is H, halogen, a straight-chain, branched or cyclic alkyl chain having 1 to 25 C atoms, in which, in addition, one or more non-adjacent C atoms are each optionally replaced by —O—, —S—, —CO—, —CO—O—, —O—CO—, —O—CO—O— and in which one or more H atoms are each optionally replaced by fluorine, or an optionally substituted aryl having 6 to 40 C atoms, aryloxy having 6 to 40 C atoms, heteroaryl having 2 to 40 C atoms, or heteroaryloxy group having 2 to 40 C atoms, and
- $Y^7$ is halogen,
- r11 and r22 are each 0 or 1,
- Sp is a spacer group or a single bond,
- P is a polymerisable group,
- $A^1$ and $A^2$ are independently, on each occurrence, identically or differently, aryl, heteroaryl or fully or partially saturated cycloalkyl having 4 to 20 C atoms, which is optionally substituted and in which, in addition, one or more CH groups are each optionally replaced by N, and one or more $CH_2$ groups are each optionally replaced by O or S in such a way that O and/or S atoms are not linked directly to one another,
- $Z^1$ and $Z^2$ are independently, on each occurrence, identically or differently, —O—, —S—, —CO—, —COO—, —OCO—, —O—COO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CF=CF—, —C≡C—, —CH=CH—COO—, —OCO—CH=CH—, CR$^0$'R$^{00}$' or a single bond,
- R$^{0}$' and R$^{00}$' are each, independently of one another, H or alkyl having 1 to 4 C atoms,
- Sp' is alkylene having 1 to 20 C atoms, which is optionally mono- or polysubstituted by F, Cl, Br, I or CN and in which, in addition, one or more non-adjacent CH$_2$ groups are each optionally, independently of one another, replaced by —O—, —S—, —NH—, —NR$^0$—, —SiR$^0$R$^{00}$'—, —CO—, —COO—, —OCO—, —OCO—O—, —S—CO—, —CO—S—, —NR$^0$—CO—O—, —O—CO—NR$^0$—, —NR$^0$—CO—NR$^0$—, —CH=CH— or —C≡C— in such a way that O and/or S atoms are not linked directly to one another,
- X' is —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—N=CH—, N=N—, —CH=CR$^0$—, —CY$^8$=CY$^9$—, —C≡C—, —CH=CH—COO—, —OCO—CH=CH— or a single bond, R$^0$ and R$^{00}$ each, independently of one another, is H or alkyl having 1 to 12 C atoms, and
- $Y^8$ and $Y^9$ each, independently of one another, is H, F, Cl or CN.

11. A liquid crystal display according to claim 1, wherein said LC medium further comprises one or more compounds of formula II

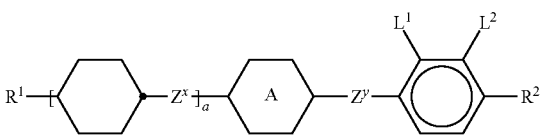

in which
- $R^1$ and $R^2$ are each, independently of one another, alkyl having 1 to 12 C atoms, in which, in addition, one or two non-adjacent $CH_2$ groups are each optionally replaced by —O—, —CH=CH—, —CO—, —OCO— or —COO— in such a way that O atoms are not linked directly to one another, $Z^x$ and $Z^y$ are each, independently of one another, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, —CH=CHCH$_2$O—, or a single bond, $L^1$ and $L^2$ are each, independently of one another, F, Cl, OCF$_3$, CF$_3$, CH$_3$, CH$_2$F or CHF$_2$, a is 0 or 1, and

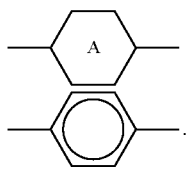

12. A liquid crystal display according to claim 1, wherein said LC medium further comprises one or more compounds of formula III

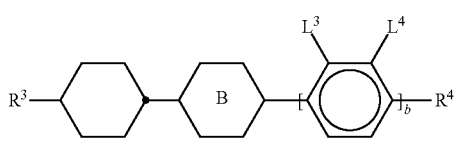

III in which the individual radicals have the following meaning:

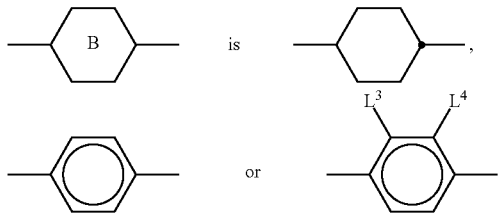

b is 0 or 1, $L^3$ and $L^4$ are each, independently of one another, H, F or Cl, $R^3$ is alkenyl having 2 to 9 C atoms, $R^4$ is alkyl having 1 to 12 C atoms, in which, in addition, one or two non-adjacent CH$_2$ groups are each optionally replaced by —O—, —CH=CH—, —CO—, —OCO— or —COO— in such a way that O atoms are not linked directly to one another or, if b=0 and the ring B is cyclohexylene, $R^4$ can also be alkenyl having 2 to 9 C atoms.

13. A liquid crystal display according to claim 1, wherein said LC medium further comprises one or more compounds of formula VII:

VII in which $R^5$ and $R^6$, are each, independently of one another, alkyl having 1 to 12 C atoms, in which, in addition, one or two non-adjacent CH$_2$ groups are each optionally replaced by —O—, —CH=CH—, —CO—, —OCO— or —COO— in such a way that O atoms are not linked directly to one another,

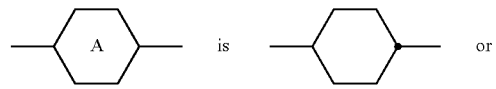

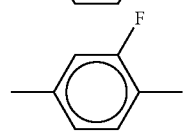

e is 0 or 1.

14. A liquid crystal display according to claim 1, wherein said LC medium further comprises one or more compounds of the formula IV:

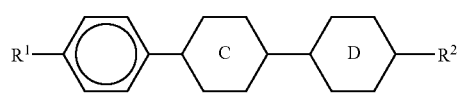

IV in which $R^1$ and $R^2$ are each, independently of one another, alkyl having 1 to 12 C atoms, in which, in addition, one or two non-adjacent CH$_2$ groups are each optionally replaced by —O—, —CH=CH—, —CO—, —OCO— or —COO— in such a way that O atoms are not linked directly to one another,

each, independently of one another, is

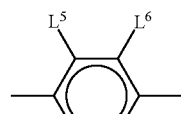 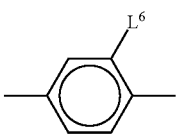

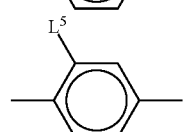 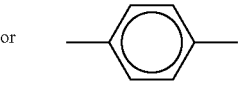

$L^5$ is F or Cl, and $L^6$ is F, Cl, OCF$_3$, CF$_3$, CH$_3$, CH$_2$F or CHF$_2$.

15. A liquid crystal display according to claim 1, wherein said LC medium further comprises one or more compounds selected from the formulae Va and Vb:

Va
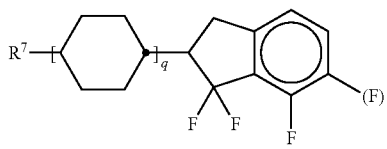

Vb
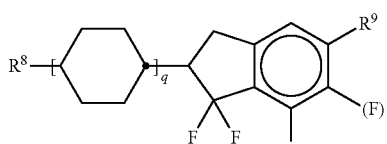

in which

R⁷ and R⁸ are each, independently of one another, alkyl having 1 to 12 C atoms, in which, in addition, one or two non-adjacent CH₂ groups are each optionally replaced by —O—, —CH=CH—, —CO—, —OCO— or —COO— in such a way that O atoms are not linked directly to one another, R⁹ is CH₃, C₂H₅ or n-C₃H₇, and q is 1 or 2.

16. A liquid crystal display according to claim 1, wherein said LC medium further comprises one or more compounds selected from the formulae VIa VIk:

VIa
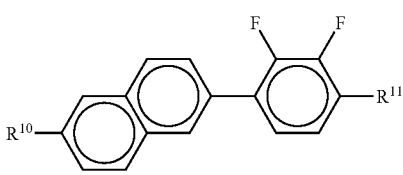

VIb
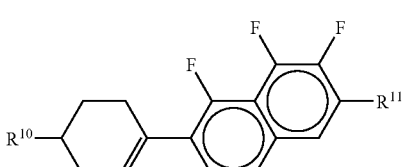

VIc
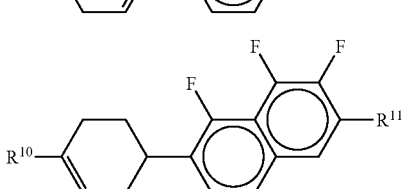

VId
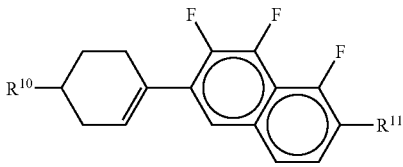

VIe
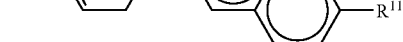

VIf
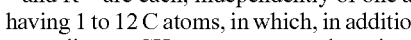

VIg
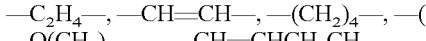

VIh
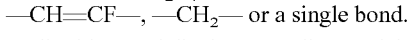

VIi

VIk

in which

R¹⁰ and R¹¹ are each, independently of one another, alkyl having 1 to 12 C atoms, in which, in addition, one or two non-adjacent CH₂ groups are each optionally replaced by —O—, —CH=CH—, —CO—, —OCO— or —COO— in such a way that O atoms are not linked directly to one another, and Z¹ and Z² each, independently of one another, is —C₂H₄—, —CH=CH—, —(CH₂)₄—, —(CH₂)₃O—, —O(CH₂)₃—, —CH=CHCH₂CH₂—, —CH₂CH₂CH=CH—, —CH₂O—, —OCH₂—, —COO—, —OCO—, —C₂F₄—, —CF=CF—, —CF=CH—, —CH=CF—, —CH₂— or a single bond.

17. A liquid crystal display according to claim 8, wherein:

P is CH₂=CW¹—COO—, CH₂=CW¹—CO—,

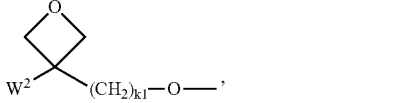

$CH_2=CW^2(O)_{k1}$—, $CH_3$—CH=CH—O—, $(CH_2=CH)_2$CH—OCO—, $(CH_2=CH-CH_2)_2$CH—OCO—, $(CH_2=CH)_2$CH—O—, $(CH_2=CH-CH_2)_2$N—, $(CH_2=CH-CH_2)_2$N—CO—, HO—$CW^2W^3$—, HS—$CW^2W^3$—, $HW^2$N—, HO—$CW^2W^3$—NH—, $CH_2=CW^1$—CO—NH—, $CH_2=CH-(COO)_{k1}$-Phe-$(O)_{k2}$—, $CH_2=CH-(CO)_u$-Phe-$(O)_{k2}$—, Phe-CH=CH—, HOOC—, OCN— or $W^4W^5W^6Si$—, $W^1$ is H, F, Cl, CN, $CF_3$, phenyl or alkyl having 1 to 5 C atoms, $W^2$ and $W^3$ are each, independently of one another, H or alkyl having 1 to 5 C atoms, $W^4$, $W^5$ and $W^6$ are each, independently of one another, Cl, oxaalkyl or oxacarbonylalkyl having 1 to 5 C atoms, $W^7$ and $W^8$ are each, independently of one another, H, Cl or alkyl having 1 to 5 C atoms, Phe is 1,4-phenylene, which is optionally substituted by one or more L groups, and $k_1$ and $k_2$ are each, independently of one another, 0 or 1, Sp is Sp'-X', Sp' is alkylene having 1 to 20, which is optionally mono- or polysubstituted by F, Cl, Br, I or CN and in which, in addition, one or more non-adjacent $CH_2$ groups are each optionally, independently of one another, replaced by —O—, —S—, —NH—, —NR$^0$—, —SiR$^0$R$^{00}$—, —CO—, —COO—, —OCO—, —OCO—O—, —S—CO—, —CO—S—, —NR$^0$—CO—O—, —O—CO—NR$^0$—, —NR$^0$—CO—NR$^0$—, —CH=CH— or —C≡C— in such a way that O and/or S atoms are not linked directly to one another, X' is —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—N=CH—N=N—, —CH=CR$^0$—, —CY$^8$=CY$^9$—, —C≡C—, —CH=CH—COO—, —OCO—CH=CH— or a single bond, $R^0$ and $R^{00}$ are each, independently of one another, H or alkyl having 1 to 12 C atoms, and $Y^8$ and $Y^9$ each, independently of one another, is H, F, Cl or CN.

18. A liquid crystal display according to claim 17, wherein:

P is $CH_2=CH$—COO—, $CH_2=C(CH_3)$—COO—, $CH_2=CH$—, $CH_2=CH$—O—, $(CH_2=CH)_2CH$—OCO—, $(CH_2=CH)_2CH$—O—,

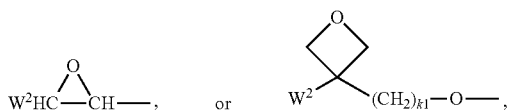

Sp' is —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^0$R$^{00}$—O)$_{p1}$—, p1 is an integer from 1 to 12, q1 is an integer from 1 to 3, and X' is —O—, —S—, —CO—, —COO—, —OCO—, —O—COO—, —CO—NR$^0$—, —NR$^0$—CO—, —NR$^0$—CO—NR$^0$— or a single bond.

19. A liquid crystal display according to claim 1, wherein said display is a PSA-VA display or a PSA-OCB display.

20. A LC medium comprising: one or more polymerised compounds, wherein said polymerised compound(s) is (are) obtained by polymerisation of one or more polymerisable compounds with application of an electrical voltage, wherein at least one of the polymerisable compounds has a biaryl structural element of Formula I

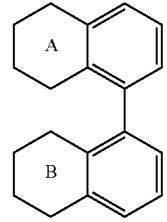

which is linked at at least one position to one or more polymerisable groups, optionally via an organic group or a spacer group, wherein A and B are each, independently of one another, an aromatic or fully or partially saturated ring, in which, in the individual rings, one or more CH groups are each optionally replaced by N, and one or more $CH_2$ groups are each optionally replaced by O or S in such a way that O and/or S atoms are not linked directly to one another, and where the individual rings may also be mono- or polysubstituted, and wherein said at least one polymerisable compound which contains a structural element of Formula I is employed as a racemate.

21. A polymerisable compound selected from formula I1b1

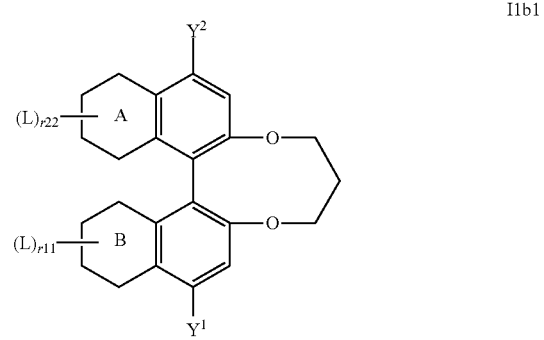

in which

A and B are each, independently of one another, an aromatic or fully or partially saturated ring, in which, in the individual rings, one or more CH groups are each optionally replaced by N, and one or more $CH_2$ groups are each optionally replaced by O or S in such a way that O and/or S atoms are not linked directly to one another, and where the individual rings may also be mono- or polysubstituted, $Y^{1-2}$ are each, independently of one another, H, halogen, $SF_5$, $NO_2$, a carbon group or a hydrocarbon group, and $Y^1$ and $Y^2$ contain or is a polymerisable group, L is F, Cl, Br, I, —CN, —NO$_2$, —NCO, —NCS, —OCN, —SCN, —C(=O)N(R$^x$)$_2$, —C(=O)Y$^7$, —C(=O)R$^x$, —N(R$^x$)$_2$, optionally substituted silyl, aryl having 6 to 40, straight-chain or branched alkyl having 1 to 25 C atoms, alkoxy having 1 to 25 C atoms, alkylcarbonyl having up to 25 C atoms, alkoxycarbonyl having up to 25

C atoms having up to 25 C atoms, alkylcarbonyloxy having up to 25 C atoms, or alkoxycarbonyloxy having up to 25 C atoms, in which one or more H atoms are each optionally replaced by F or Cl, $R^x$ is H, halogen, a straight-chain, branched or cyclic alkyl chain having 1 to 25 C atoms, in which, in addition, one or more non-adjacent C atoms are each optionally replaced by —O—, —S—, —CO—, —CO—O—, —O—CO—, —O—CO—O— and in which one or more H atoms are each optionally replaced by fluorine, or an optionally substituted aryl having 6 to 40 C atoms, aryloxy having 6 to 40 C atoms, heteroaryl having 2 to 40 C atoms, or heteroaryloxy group having 2 to 40 C atoms, and $Y^7$ is halogen, and r11 and r22 are each 0 or 1.

22. A liquid crystal display according to claim 5, wherein one or more of the radicals $Y^{1-4}$ in the compounds of the formula II is —W—$(Z^1-A^1)_{m1}$-Sp-P or —W—$(Z^1-A^1)_{m1}$—$R^y$, in which W is O, S, $CH_2$ or a single bond, Sp is a spacer group or a single bond, P is a polymerisable group, $R^y$ on each occurrence, identically or differently, is H, L, straight-chain or branched alkyl having 1 to 25 C atoms, which is unsubstituted or mono- or polysubstituted by F, Cl, Br, I, CN or P-Sp- and in which one or more non-adjacent $CH_2$ groups are each optionally, independently of one another, replaced by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another, $A^1$ is on each occurrence, identically or differently, aryl, heteroaryl or fully or partially saturated cycloalkyl having 4 to 20 C atoms, which is optionally substituted and in which, in addition, one or more CH groups are each optionally replaced by N, and one or more $CH_2$ groups are each optionally replaced by O or S in such a way that O and/or S atoms are not linked directly to one another, $Z^1$ is on each occurrence, identically or differently, —O—, —S—, —CO—, —COO—, —OCO—, —O-COO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=CH—, —CF=CF—, —C≡C—, —CH=CH—COO—, —OCO—CH=CH—, $C^{0'}R^{00'}$ or a single bond, $R^{0'}$ and $R^{00'}$ are each, independently of one another, H or alkyl having 1 to 4 C atoms, and m1 is 0, 1, 2, 3 or 4.

23. A liquid crystal display according to claim 6, wherein one or more of the radicals $Y^{1-4}$ in the compounds of the formulae I1a and I1b is —W—$(Z^1-A^1)_{m1}$-Sp-P or —W—$(Z^1-A^1)_{m1}$-$R^y$, in which W is O, S, $CH_2$ or a single bond, Sp is a spacer group or a single bond, P is a polymerisable group, $R^y$ on each occurrence, identically or differently, is H, L, straight-chain or branched alkyl having 1 to 25 C atoms, which is unsubstituted or mono- or polysubstituted by F, Cl, Br, I, CN or P-Sp- and in which one or more non-adjacent $CH_2$ groups are each optionally, independently of one another, replaced by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another, $A^1$ is on each occurrence, identically or differently, aryl, heteroaryl or fully or partially saturated cycloalkyl having 4 to 20 C atoms, which is optionally substituted and in which, in addition, one or more CH groups are each optionally replaced by N, and one or more $CH_2$ groups are each optionally replaced by O or S in such a way that O and/or S atoms are not linked directly to one another, $Z^1$ is on each occurrence, identically or differently, —O—, —S—, —CO—, —COO—, —OCO—, —O-COO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=CH—, —CF=CF—, —C≡C—, —CH=CH—COO—, —OCO—CH=CH—, $CR^{0'}R^{00'}$ or a single bond, $R^{0'}$ and $R^{00'}$ are each, independently of one another, H or alkyl having 1 to 4 C atoms, and m1 is 0, 1, 2, 3 or 4.

24. A liquid crystal display according to claim 7, wherein one or more of the radicals $Y^{1-4}$ in the compounds of the formulae I1a1 and I1b1 is —W—$(Z^1-A^1)_{m1}$-Sp-P or —W—$(Z^1-A^1)_{m1}$-$R^y$, in which W is O, S, $CH_2$ or a single bond, Sp is a spacer group or a single bond, P is a polymerisable group, $R^y$ on each occurrence, identically or differently, is H, L, straight-chain or branched alkyl having 1 to 25 C atoms, which is unsubstituted or mono- or polysubstituted by F, Cl, Br, I, CN or P-Sp- and in which one or more non-adjacent $CH_2$ groups are each optionally, independently of one another, replaced by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another, $A^1$ is on each occurrence, identically or differently, aryl, heteroaryl or fully or partially saturated cycloalkyl having 4 to 20 C atoms, which is optionally substituted and in which, in addition, one or more CH groups are each optionally replaced by N, and one or more $CH_2$ groups are each optionally replaced by O or S in such a way that O and/or S atoms are not linked directly to one another, $Z^1$ is on each occurrence, identically or differently, —O—, —S—, —CO—, —COO—, —OCO—, —O—COO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=CH—, —CF=CF—, —C≡C—, —CH=CH—COO—, —OCO—CH=CH—, $CR^{0'}R^{00'}$ or a single bond, $R^{0'}$ and $R^{00'}$ are each, independently of one another, H or alkyl having 1 to 4 C atoms, and m1 is 0, 1, 2, 3 or 4.

25. A liquid crystal display according to claim 22, wherein $Y^1$ and $Y^2$ are each, independently of one another, —W—$(Z^1-A^1)_{m1}$-Sp-P or —W—$(Z^1-A^1)_{m1}$-$R^y$.

26. A liquid crystal display according to claim 22, wherein $Y^3$ and $Y^4$ are each, independently of one another, —W—$(Z^1-A^1)_{m1}$-Sp-P or —W—$(Z^1-A^1)_{m1}$-$R^y$.

27. A liquid crystal display according to claim 25, wherein $Y^1$ and $Y^2$ are each, P-Sp-, P—, or $R^y$.

28. A liquid crystal display according to claim 25, wherein $Y^3$ and/or $Y^4$ is H.

29. A liquid crystal display according to claim 1, wherein said LC medium contains <5% of polymerisable compound with a structural element of Formula I.

30. A liquid crystal display according to claim 10, wherein said at least one polymerisable compound is (are) selected from formulae I1a1a, I1a1b, I1a1c, I1a1d, I1a1e, I1a1f, I1b1a, I1b1b, I1b1c, and I1b1d.

31. A compound according to claim 21, wherein said compound is a racemate.

32. A liquid crystal display according to claim 10, wherein said at least one polymerisable compound is (are) from the following formulae:

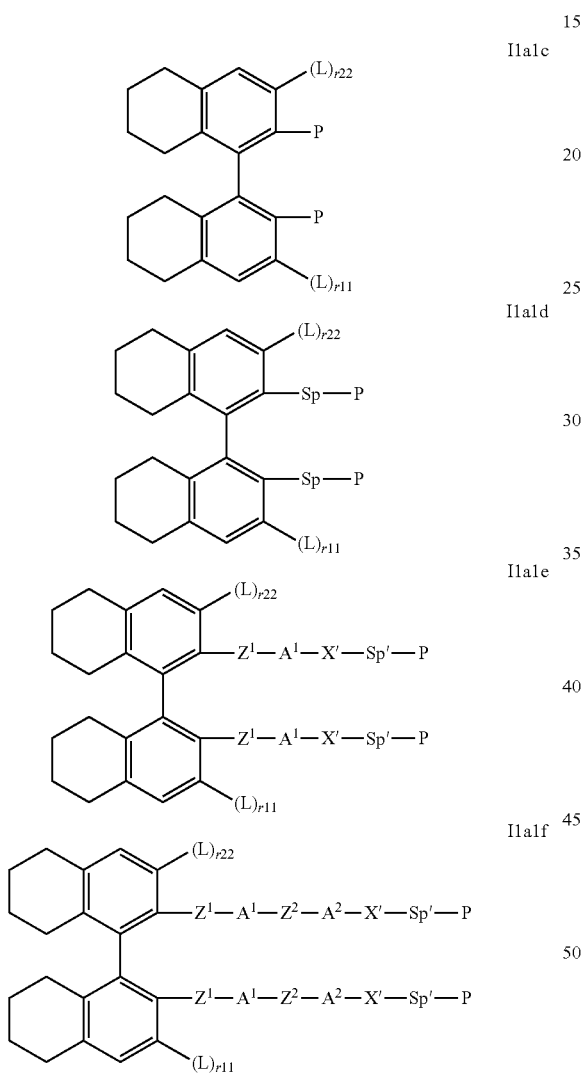

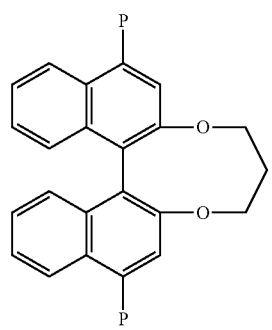

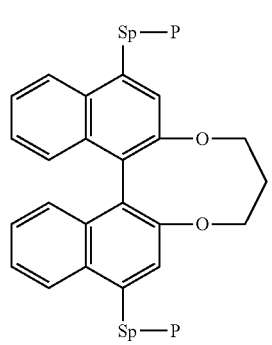

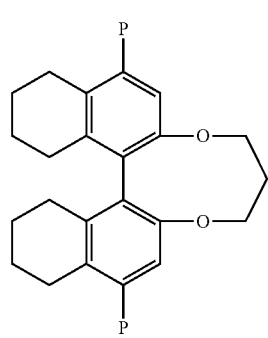

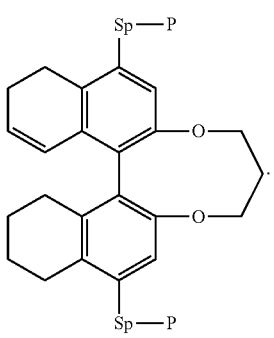

* * * * *

UNITED STATES PATENT AND TRADEMARK OFFICE
CERTIFICATE OF CORRECTION

PATENT NO. : 8,778,466 B2  
APPLICATION NO. : 11/907325  
DATED : July 15, 2014  
INVENTOR(S) : Bernatz et al.

Page 1 of 1

It is certified that error appears in the above-identified patent and that said Letters Patent is hereby corrected as shown below:

In the Claims

Column 115, line 7 reads "$(O)_{k2}$-, $CH_2=CH-(CO)_u$-Phe-$(O)_{k2}$-, Phe-CH=CH-," should read
-- $(O)_{k2}$-, $CH_2=CH-(CO)_{k1}$-Phe-$(O)_{k2}$-, Phe-CH=CH-, --

Column 115, line 37 reads "-$CF_2CF_2$-, -CH=N-N=CH-N=N-," should read
-- -$CF_2CF_2$-, -CH=N,-N=CH,-N=N-, --

Column 117, line 30 reads "of one another replaced by -C($R^x$)=($R^x$)-," should read
-- of one another replaced by -C($R^x$)=C($R^x$)-, --

Signed and Sealed this
Seventh Day of April, 2015

Michelle K. Lee
*Director of the United States Patent and Trademark Office*